United States Patent
Rafique et al.

(10) Patent No.: US 11,158,940 B2
(45) Date of Patent: Oct. 26, 2021

(54) SELF-CALIBRATION OF ANTENNA ARRAY SYSTEM

(71) Applicant: Telefonaktiebolaget LM Ericsson (publ), Stockholm (SE)

(72) Inventors: Raihan Rafique, Lund (SE); Jacob Mannerstråle, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 16/486,416

(22) PCT Filed: Mar. 13, 2017

(86) PCT No.: PCT/EP2017/055818
§ 371 (c)(1),
(2) Date: Aug. 15, 2019

(87) PCT Pub. No.: WO2018/166575
PCT Pub. Date: Sep. 20, 2018

(65) Prior Publication Data
US 2020/0266535 A1    Aug. 20, 2020

(51) Int. Cl.
*H01Q 3/26*        (2006.01)
*H04B 17/13*      (2015.01)
(Continued)

(52) U.S. Cl.
CPC ............ *H01Q 3/267* (2013.01); *H04B 17/13* (2015.01); *H04B 17/14* (2015.01); *H04B 17/19* (2015.01); *H04B 17/21* (2015.01)

(58) Field of Classification Search
CPC combination set(s) only.
See application file for complete search history.

(56) References Cited

U.S. PATENT DOCUMENTS

| 5,107,273 A * | 4/1992 | Roberts | H01Q 3/2611 |
| | | | 342/375 |
| 5,657,023 A * | 8/1997 | Lewis | H01Q 3/2652 |
| | | | 342/174 |

(Continued)

FOREIGN PATENT DOCUMENTS

| CN | 106707250 A | 5/2017 |
| CN | 107085202 A | 8/2017 |

(Continued)

OTHER PUBLICATIONS

Shipley, Charles, et al., "Mutual Coupling-Based Calibration of Phased Array Antennas," IEEE International Conference on Phased Array Systems and Technology, Dana Point, CA, 2000, pp. 529-532.

(Continued)

*Primary Examiner* — Junpeng Chen
(74) *Attorney, Agent, or Firm* — Withrow & Terranova, PLLC

(57) ABSTRACT

Systems and methods relating to self-calibration of an antenna array of a transceiver are disclosed. In some embodiments, a method of operation of a transceiver to perform self-calibration for transmit (Tx) antenna elements and receive (Rx) antenna elements in an antenna array comprises performing gain measurements and phase measurements for pairs of Tx and Rx antenna elements in the antenna array. The method further comprises processing the gain measurements and the phase measurements based on combinations of Tx and Rx antenna elements having symmetrical coupling properties to obtain gain and phase calibration values for the plurality of Tx antenna elements and the plurality of Rx antenna elements in the antenna array and applying the gain and phase calibration values at the transceiver. In this manner, self-calibration can be performed at the transceiver dynamically with low complexity.

28 Claims, 15 Drawing Sheets

(51) Int. Cl.
  *H04B 17/14* (2015.01)
  *H04B 17/19* (2015.01)
  *H04B 17/21* (2015.01)

(56) References Cited

U.S. PATENT DOCUMENTS

| | | | |
|---|---|---|---|
| 6,295,027 | B1 | 9/2001 | Wixforth et al. |
| 8,154,452 | B2 | 4/2012 | Webb |
| 8,199,048 | B1 | 6/2012 | Medina Sanchez |
| 8,891,598 | B1 | 11/2014 | Wang et al. |
| 2003/0179137 | A1 | 9/2003 | White et al. |
| 2005/0239506 | A1 | 10/2005 | Li |
| 2006/0119511 | A1 | 6/2006 | Collinson |
| 2011/0006949 | A1* | 1/2011 | Webb ............... H01Q 3/267 342/372 |
| 2011/0133740 | A1* | 6/2011 | Seydoux ............ G01V 3/28 324/338 |
| 2012/0001810 | A1 | 1/2012 | Soualle et al. |
| 2012/0146841 | A1 | 6/2012 | Ookawa |
| 2012/0154206 | A1 | 6/2012 | Medina Sanchez |
| 2013/0077708 | A1* | 3/2013 | Sorrells ............. H04B 1/0483 375/295 |
| 2013/0301487 | A1* | 11/2013 | Khandani .......... H04B 7/0413 370/278 |
| 2014/0022125 | A1 | 1/2014 | Zhu et al. |
| 2014/0269554 | A1 | 9/2014 | Shapira et al. |
| 2015/0092621 | A1 | 4/2015 | Jalloul et al. |
| 2016/0043465 | A1* | 2/2016 | McDevitt ........... G01S 13/74 342/368 |
| 2016/0049995 | A1 | 2/2016 | André et al. |
| 2018/0198537 | A1 | 7/2018 | Rexberg et al. |
| 2020/0145033 | A1 | 5/2020 | Rafique |

FOREIGN PATENT DOCUMENTS

| | | |
|---|---|---|
| EP | 2173010 A1 | 4/2010 |
| EP | 2911323 A1 | 8/2015 |
| KR | 20170011906 A | 2/2017 |
| WO | 2012038783 A1 | 3/2012 |
| WO | 2012074446 A1 | 6/2012 |
| WO | 2013124762 A1 | 8/2013 |
| WO | 2017001013 A1 | 1/2017 |
| WO | 2017202453 A1 | 11/2017 |
| WO | 2017202469 A1 | 11/2017 |
| WO | 2017211408 A1 | 12/2017 |
| WO | 2019052655 A1 | 3/2019 |
| WO | 2020064128 A1 | 4/2020 |

OTHER PUBLICATIONS

Vieira, Joao, et al., "A Receive/Transmit Calibration Technique based on Mutual Coupling for Massive MIMO Base Stations," IEEE International Symposium on Personal, Indoor and Mobile Radio Communications (PIMRC): Fundamentals and PHY, Valencia, Jan. 1, 2016, pp. 1-6.

International Search Report and Written Opinion for International Patent Application No. PCT/EP2017/055818, dated Nov. 10, 2017, 13 pages.

Author Unknown, "Broadband Radio Access Networks (BRAN); 5 GHz high performance RLAN; Harmonized EN covering the essential requirements of article 3.2 of the R&TTE Directive," ETSI EN 301 893, Version 1.8.1, Mar. 2015, 93 pages.

Author Unknown, "Technical Specification Group Radio Access Network; Evolved Universal Terrestrial Radio Access (E-UTRA); Physical channels and modulation (Release 14)," 3GPP TS 36.211, Sep. 2016, 170 pages.

Author Unknown, "Technical Specification Group Radio Access Network; Evolved Universal Terrestrial Radio Access (E-UTRA); Physical layer procedures (Release 14)," 3GPP TS 36.213, Sep. 2016, 406 pages.

Author Unknown, "Technical Specification Group Radio Access Network; Evolved Universal Terrestrial Radio Access (E-UTRA); Radio Resource Control (RRC); Protocol specification (Release 14)," 3GPP TS 36.331, Sep. 2016, 644 pages.

Goossens, R., et al., "Optimal beam forming in the presence of mutual coupling," Proceedings of the 2006 Symposium on Communications and Vehicular Technology, Nov. 23, 2006, Liege, Belgium, pp. 13-18.

International Search Report and Written Opinion for International Patent Application No. PCT/EP2017/073299, dated Jun. 12, 2018, 14 pages.

International Search Report and Written Opinion for International Patent Application No. PCT/EP2018/076476, dated Apr. 25, 2019, 19 pages.

\* cited by examiner

SELF-CALIBRATION OF ANTENNA ARRAY SYSTEM

This application is a 35 U.S.C. § 371 national phase filing of International Application No. PCT/EP2017/055818, filed Mar. 13, 2017, the disclosure of which is incorporated herein by reference in its entirety.

TECHNICAL FIELD

The present disclosure relates to self-calibration of an antenna array system.

BACKGROUND

An Advanced Antenna System (AAS) includes multiple antenna elements in a matrix, or antenna array. Each antenna element is connected to a radio front-end of a transceiver. A phase tuner and gain stage is connected between the radio front-end and the AAS to enable phase and gain tuning for, e.g., analog beamforming. Specifically, phase and gain adjustments for the AAS can be made to direct a beam of the AAS in a desired direction. For example, phase and gain adjustments can be made to direct a transmission towards a desired receiver.

One issue that arises with an AAS and, in particular, with an analog beamforming transceiver including an AAS, is that there are variations in gain and phase between different antenna elements due to, e.g., manufacturing tolerances for the various components in the associated transmit or receive path, temperature gradients, etc. These variations result in undesired errors in analog beamforming. Therefore, there is a need for systems and methods for calibrating the gain and phase of the antenna elements in an AAS.

Conventional self-calibration techniques used by an analog beamforming transceiver to perform self-calibration of the gain and phase of each antenna element in the AAS are time consuming and need many measurements. Further, even after calibration, there is some residual error due to coupling between antenna elements. This residual error is particularly problematic for self-calibration because the coupling between antenna elements is asymmetrical (i.e., the coupling between one pair of antenna elements may be substantially different than the coupling between a different pair of antenna elements). For a digital beamforming AAS, there is direct access to individual antenna elements and, as such, the analog beamforming transceiver can measure or calculate this error for each individual antenna element and then use the measurement or calculated values to compensate for this error. In contrast, for an analog beamforming AAS, this error is difficult to distinguish as all antenna elements are merged with splitter/combiner networks. One way of compensating for this error in an analog beamforming AAS is to store a coupling matrix in a Look Up Table (LUT), but generating the coupling matrix requires a very large number of measurements. Additionally, overall coupling will vary as the antenna structure may change with temperature variation and power amplifier loading.

Thus, when it comes to self-calibration of an analog beamforming AAS utilizing coupling, there is a need for systems and methods for efficient and accurate calibration that compensates for errors due to asymmetrical coupling properties between antenna elements in the AAS.

SUMMARY

Systems and methods relating to self-calibration of an antenna array of a transceiver are disclosed. In some embodiments, a method of operation of a transceiver to perform self-calibration for transmit (Tx) antenna elements and receive (Rx) antenna elements in an antenna array comprises performing gain measurements ($G_{MTx_iRx_j}$) and phase measurements ($\phi_{MTx_iRx_j}$) for pairs of Tx and Rx antenna elements in the antenna array. The gain measurement ($G_{MTx_iRx_j}$) is a measured gain at an output of a receiver coupled to a j-th Rx antenna element during reception of a signal transmitted by a transmitter coupled to an i-th Tx antenna element. The method further comprises processing the gain measurements ($G_{MTx_iRx_j}$) and the phase measurements ($\phi_{MTx_iRx_j}$) based on combinations of Tx and Rx antenna elements having symmetrical coupling properties to obtain gain and phase calibration values for the plurality of Tx antenna elements and the plurality of Rx antenna elements in the antenna array. The method further comprises applying the gain and phase calibration values at the transceiver. In this manner, self-calibration can be performed at the transceiver dynamically with only a small amount of hardware modification, if any, and with only a small amount of processing.

In some embodiments, processing the gain measurements ($G_{MTx_iRx_j}$) and the phase measurements ($\phi_{MTx_iRx_j}$) comprises selecting a pair of Tx antenna elements ($Tx_i$ and $Tx_k$ where i≠k), determining a first pair of Rx antenna elements ($Rx_n$ and $Rx_m$) having symmetrical coupling properties with respect to the pair of Tx antenna elements ($Tx_i$ and $Tx_k$), and computing at least one relative gain value and at least one relative phase value for the Tx antenna element $Tx_i$ relative to the Tx antenna element $Tx_k$ based on at least two of: the gain measurement ($G_{MTx_iRx_n}$) and the phase measurement ($\phi_{MTx_iRx_n}$) for the pair of Tx and Rx antenna elements ($Tx_i$ and $Rx_n$); the gain measurement ($G_{MTx_iRx_m}$) and the phase measurement ($\phi_{MTx_iRx_m}$) for the pair of Tx and Rx antenna elements ($Tx_i$ and $Rx_m$); the gain measurement ($G_{MTx_kRx_n}$) and the phase measurement ($\phi_{MTx_kRx_n}$) for the pair of Tx and Rx antenna elements ($Tx_k$ and $Rx_n$); and the gain measurement ($G_{MTx_kRx_m}$) and the phase measurement ($\phi_{MTx_kRx_m}$) for the pair of Tx and Rx antenna elements ($Tx_k$ and $Rx_m$). The method further comprises repeating the steps of determining and computing for at least one second pair of Rx antenna elements ($Rx_n$ and $Rx_m$) having symmetrical coupling properties with respect to the pair of Tx antenna elements ($Tx_i$ and $Tx_k$) and averaging the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$. The method further comprises repeating the steps of selecting, determining, computing, repeating, and averaging for at least one second pair of Tx antenna elements ($Tx_i$ and $Tx_k$) and normalizing the average relative gain values and the average relative phase values relative to a defined reference Tx antenna element to thereby provide gain and phase calibration values for the plurality of Tx antenna elements.

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_n$, a mutual coupling between the Tx antenna element $Tx_i$ and the Rx antenna element $Rx_m$ is approximately the same as a mutual coupling between the Tx antenna element $Tx_k$ and the Rx antenna element $Rx_m$, and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2}$$

and a relative phase value defined as:

$$\Delta\phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}.$$

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_m$, a mutual coupling between the Tx antenna element $Tx_i$ and the Rx antenna element $Rx_m$ is approximately the same as a mutual coupling between the Tx antenna element $Tx_k$ and the Rx antenna element $Rx_n$, and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2}.$$

In some embodiments, averaging the relative gain values and the relative phase values for the Tx antenna element $Tx_i$ relative to the Tx antenna element $Tx_k$ across the first pair of Rx antenna elements and the at least one second pair of Rx antenna elements comprises performing a weighted average of the relative gain values and the relative phase values for the Tx antenna element $Tx_i$ relative to the Tx antenna element $Tx_k$ across the first pair of Rx antenna elements and the at least one second pair of Rx antenna elements.

In some embodiments, processing the gain measurements ($G_{MTx_iRx_j}$) and the phase measurements ($\phi_{MTx_iRx_j}$) comprises selecting a pair of Rx antenna elements ($Rx_n$ and $Rx_m$, where $n \neq m$), determining a first pair of Tx antenna elements ($Tx_i$ and $Tx_k$) having symmetrical coupling properties with respect to the pair of Rx antenna elements ($Rx_n$ and $Rx_m$); and computing at least one relative gain value and at least one relative phase value for the Rx antenna element $Rx_n$ relative to the Rx antenna element $Rx_m$ based on at least two of: the gain measurement ($G_{MTx_iRx_n}$) and the phase measurement ($\phi_{MTx_iRx_n}$) for the pair of Tx and Rx antenna elements ($Tx_i$ and $Rx_n$); the gain measurement ($G_{MTx_iRx_m}$) and the phase measurement ($\phi_{MTx_iRx_m}$) for the pair of Tx and Rx antenna elements ($Tx_i$ and $Rx_m$); the gain measurement ($G_{MTx_kRx_n}$) and the phase measurement ($\phi_{MTx_kRx_n}$) for the pair of Tx and Rx antenna elements ($Tx_k$ and $Rx_n$); and the gain measurement ($G_{MTx_kRx_m}$) and the phase measurement ($\phi_{MTx_kRx_m}$) for the pair of Tx and Rx antenna elements ($Tx_k$ and $Rx_m$). The method further comprises repeating the steps of determining and computing for at least one second pair of Tx antenna elements ($Tx_i$ and $Tx_k$) having symmetrical coupling properties with respect to the pair of Rx antenna elements ($Rx_n$ and $Rx_m$) and averaging the relative gain values and the relative phase values for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$. The method further comprises repeating the steps of selecting, determining, computing, repeating, and averaging for at least one second pair of Rx antenna elements and normalizing the average relative gain values and the average relative phase values relative to a defined reference Rx antenna element to thereby provide gain and phase calibration values for the plurality of Rx antenna elements.

In some embodiments, a mutual coupling between the Tx antenna element $Tx_i$ and the Rx antenna element $Rx_n$ is approximately the same as a mutual coupling between the Tx antenna element $Tx_i$ and the Rx antenna element $Rx_m$, a mutual coupling between the Tx antenna element $Tx_k$ and the Rx antenna element $Rx_n$ is approximately the same as a mutual coupling between the Tx antenna element $Tx_k$ and the Rx antenna element $Rx_m$, and the at least one relative gain value and the at least one relative phase value for the Rx antenna element $Rx_n$ relative to the Rx antenna element $Rx_m$ comprises a relative gain defined as:

$$\Delta G_{Rx_nRx_m}(3) = \frac{(G_{MTx_iRx_n} - G_{MTx_iRx_m}) + (G_{MTx_kRx_n} - G_{MTx_kRx_m})}{2}$$

and a relative phase value defined as:

$$\Delta\phi_{Rx_nRx_m}(3) = \frac{(\phi_{MTx_iRx_n} - \phi_{MTx_iRx_m}) + (\phi_{MTx_kRx_n} - \phi_{MTx_kRx_m})}{2}.$$

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_m$, a mutual coupling between the Tx antenna element $Tx_i$ and the Rx antenna element $Rx_m$ is approximately the same as a mutual coupling between the Tx antenna element $Tx_k$ and the Rx antenna element $Rx_n$, and the at least one relative gain value and the at least one relative phase value for the Rx antenna element $Rx_n$ relative to the Rx antenna element $Rx_m$ comprises a relative gain value defined as:

$$\Delta G_{Rx_nRx_m}(4) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Rx_nRx_m}(4) = \frac{(\phi_{MTx_iRx_n} - \phi_{MTx_kRx_m}) + (\phi_{MTx_iRx_m} - \phi_{MTx_kRx_n})}{2}.$$

In some embodiments, averaging the relative gain values and the relative phase values for the Rx antenna element $Rx_n$ relative to the Rx antenna element $Rx_m$ across the first pair of Tx antenna elements and the at least one second pair of Tx antenna elements comprises performing a weighted average of the relative gain values and the relative phase values for the Rx antenna element $Rx_n$ relative to the Rx antenna element $Rx_m$ across the first pair of Tx antenna elements and the at least one second pair of Tx antenna elements.

In some embodiments, performing the gain measurements ($G_{MTx_iRx_j}$) and the phase measurements ($\phi_{MTx_iRx_j}$) for the pairs of Tx and Rx antenna elements in the antenna array comprises, for each pair of Tx and Rx antenna elements ($Tx_i$, $Rx_j$), transmitting a pseudo random IQ signal of a desired bandwidth while the transmit antenna element $Tx_i$ and the Rx antenna element $Rx_j$ are active, cross-correlating the transmitted pseudo random IQ signal and a received IQ signal received via the Rx antenna element $Rx_j$, and computing the gain measurement ($G_{MTx_iRx_j}$) and the phase measurement ($\phi_{MTx_iRx_j}$) for the pairs of Tx and Rx antenna elements ($Tx_i$, $Rx_j$) based on results of the cross-correlating.

Embodiments of a transceiver are also disclosed. In some embodiments, a transceiver enabled to perform self-calibration for a plurality of Tx antenna elements and a plurality of Rx antenna elements in an antenna array comprises the antenna array comprising the plurality of Tx antenna elements and the plurality of Rx antenna elements, gain and phase adjustment circuitry, one or more transmitters and one or more receivers coupled to the plurality of Tx antenna elements and the plurality of Rx antenna elements, and a baseband processing system. The baseband processing system is adapted to perform gain measurements ($G_{MTx_iRx_j}$) and phase measurements ($\phi_{MTx_iRx_j}$) for pairs of Tx and Rx antenna elements in the antenna array. The gain measurement ($G_{MTx_iRx_j}$) is a measured gain at an output of a receiver coupled to a j-th Rx antenna element during reception of a signal transmitted by a transmitter coupled to an i-th Tx antenna element. The baseband processing system is further adapted to process the gain measurements ($G_{MTx_iRx_j}$) and the phase measurements ($\phi_{MTx_iRx_j}$) based on combinations of Tx and Rx antenna elements having symmetrical coupling properties to obtain gain and phase calibration values for the plurality of Tx antenna elements and the plurality of Rx antenna elements in the antenna array and apply the gain and phase calibration values at the transceiver via the gain and phase adjustment circuitry.

In some embodiments, in order to process the gain measurements, ($G_{MTx_iRx_j}$) and the phase measurements ($\phi_{MTx_iRx_j}$), the baseband processing system is further operable to select a pair of Tx antenna elements ($Tx_i$ and $Tx_k$, where i≠k), determine a first pair of Rx antenna elements ($Rx_n$ and $Rx_m$) having symmetrical coupling properties with respect to the pair of Tx antenna elements ($Tx_i$ and $Tx_k$), and compute at least one relative gain value and at least one relative phase value for the Tx antenna element $Tx_i$ relative to the Tx antenna element $Tx_k$ based on at least two of: the gain measurement ($G_{MTx_iRx_n}$) and the phase measurement ($\phi_{MTx_iRx_n}$) for the pair of Tx and Rx antenna elements ($Tx_i$ and $Rx_n$); the gain measurement ($G_{MTx_iRx_m}$) and the phase measurement ($\phi_{MTx_iRx_m}$) for the pair of Tx and Rx antenna elements ($Tx_i$ and $Rx_m$); the gain measurement ($G_{MTx_kRx_n}$) and the phase measurement ($\phi_{MTx_kRx_n}$) for the pair of Tx and Rx antenna elements ($Tx_k$ and $Rx_n$); and the gain measurement ($G_{MTx_kRx_m}$) and the phase measurement ($\phi_{MTx_kRx_m}$) for the pair of Tx and Rx antenna elements ($Tx_k$ and $Rx_m$). The baseband processing system is further adapted to repeat the steps of determining and computing for at least one second pair of Rx antenna elements ($Rx_n$ and $Rx_m$) having symmetrical coupling properties with respect to the pair of Tx antenna elements ($Tx_i$ and $Tx_k$) and average the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$. The baseband processing system is further adapted to repeat the steps of selecting, determining, computing, repeating, and averaging for at least one second pair of Tx antenna elements and normalize the average relative gain values and the average relative phase values relative to a defined reference Tx antenna element to thereby provide gain and phase calibration values for the plurality of Tx antenna elements.

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_n$, a mutual coupling between the Tx antenna element $Tx_i$ and the Rx antenna element $Rx_m$ is approximately the same as a mutual coupling between the Tx antenna element $Tx_k$ and the Rx antenna element $Rx_m$, and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2}$$

and a relative phase value defined as:

$$\Delta \phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}.$$

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_m$, a mutual coupling between the Tx antenna element $Tx_i$ and the Rx antenna element $Rx_m$ is approximately the same as a mutual coupling between the Tx antenna element $Tx_k$ and the Rx antenna element $Rx_n$, and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2}$$

and a relative phase value defined as:

$$\Delta \phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2}.$$

In some embodiments, in order to average the relative gain values and the relative phase values for the Tx antenna element $Tx_i$ relative to the Tx antenna element $Tx_k$ across the first pair of Rx antenna elements and the at least one second pair of Rx antenna elements, the baseband processing system is further operable to perform a weighted average of the relative gain values and the relative phase values for the Tx antenna element $Tx_i$ relative to the Tx antenna element $Tx_k$ across the first pair of Rx antenna elements and the at least one second pair of Rx antenna elements.

In some embodiments, in order to process the gain measurements ($G_{MTx_iRx_j}$) and the phase measurements ($\phi_{MTx_iRx_j}$), the baseband processing system is further operable to: select a pair of Rx antenna elements ($Rx_n$ and $Rx_m$, where $n \neq m$), determine a first pair of Tx antenna elements ($Tx_i$ and $Tx_k$) having symmetrical coupling properties with respect to the pair of Rx antenna elements, $Rx_n$ and $Rx_m$, and compute at least one relative gain value and at least one relative phase value for the Rx antenna element $Rx_n$ relative to the Rx antenna element $Rx_m$ based on at least two of: the gain measurement ($G_{MTx_iRx_n}$) and the phase measurement ($\phi_{MTx_iRx_n}$) for the pair of Tx and Rx antenna elements ($Tx_i$ and $Rx_n$); the gain measurement ($G_{MTx_iRx_m}$) and the phase measurement ($\phi_{MTx_iRx_m}$) for the pair of Tx and Rx antenna elements ($Tx_i$ and $Rx_m$); the gain measurement ($G_{MTx_kRx_n}$) and the phase measurement ($\phi_{MTx_kRx_n}$) for the pair of Tx and Rx antenna elements ($Tx_k$ and $Rx_n$); and the gain measurement ($G_{MTx_kRx_m}$) and the phase measurement ($\phi_{MTx_kRx_m}$) for the pair of Tx and Rx elements antenna ($Tx_k$ and $Rx_m$). The baseband processing system is further operable to repeat the steps of determining and computing for at least one second pair of Tx antenna elements ($Tx_i$ and $Tx_k$) having symmetrical coupling properties with respect to the pair of Rx antenna elements ($Rx_n$ and $Rx_m$) and average the relative gain values and the relative phase values for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$. The baseband processing system is further operable to repeat the steps of selecting, determining, computing, repeating, and averaging for at least one second pair of Rx antenna elements and normalize the average relative gain values and the average relative phase values relative to a defined reference Rx antenna element to thereby provide gain and phase calibration values for the plurality of Rx antenna elements.

In some embodiments, a mutual coupling between the Tx antenna element $Tx_i$ and the Rx antenna element $Rx_n$ is approximately the same as a mutual coupling between the Tx antenna element $Tx_i$ and the Rx antenna element $Rx_m$, a mutual coupling between the Tx antenna element $Tx_k$ and the Rx antenna element $Rx_n$ is approximately the same as a mutual coupling between the Tx antenna element $Tx_k$ and the Rx antenna element $Rx_m$, and the at least one relative gain value and the at least one relative phase value for the Rx antenna element $Rx_n$ relative to the Rx antenna element $Rx_m$ comprises a relative gain defined as:

$$\Delta G_{Rx_nRx_m}(3) = \frac{(G_{MTx_iRx_n} - G_{MTx_iRx_m}) + (G_{MTx_kRx_n} - G_{MTx_kRx_m})}{2}$$

and a relative phase value defined as:

$$\Delta \phi_{Rx_nRx_m}(3) = \frac{(\phi_{MTx_iRx_n} - \phi_{MTx_iRx_m}) + (\phi_{MTx_kRx_n} - \phi_{MTx_kRx_m})}{2}.$$

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_m$, a mutual coupling between the Tx antenna element $Tx_i$ and the Rx antenna element $Rx_m$ is approximately the same as a mutual coupling between the Tx antenna element $Tx_k$ and the Rx antenna element $Rx_n$, and the at least one relative gain value and the at least one relative phase value for the Rx antenna element $Rx_n$ relative to the Rx antenna element $Rx_m$ comprises a relative gain value defined as:

$$\Delta G_{Rx_nRx_m}(4) = \frac{(G_{MTx_iRx_n} - G_{MTx_iRx_m}) + (G_{MTx_kRx_m} - G_{MTx_kRx_n})}{2}$$

and a relative phase value defined as:

$$\Delta \phi_{Rx_nRx_m}(4) = \frac{(\phi_{MTx_iRx_n} - \phi_{MTx_iRx_m}) + (\phi_{MTx_kRx_m} - \phi_{MTx_kRx_n})}{2}.$$

In some embodiments, in order to average the relative gain values and the relative phase values for the Rx antenna element $Rx_n$ relative to the Rx antenna element $Rx_m$ across the first pair of Tx antenna elements and the at least one second pair of Tx antenna elements, the baseband processing system is further operable to perform a weighted average of the relative gain values and the relative phase values for the Rx antenna element $Rx_n$ relative to the Rx antenna element $Rx_m$ across the first pair of Tx antenna elements and the at least one second pair of Tx antenna elements.

In some embodiments, in order to perform the gain measurements, ($G_{MTx_iRx_j}$) and the phase measurements ($\phi_{MTx_iRx_j}$) for the pairs of Tx and Rx antenna elements in the antenna array, the baseband processing system is further operable to, for each pair of Tx and Rx antenna elements $Tx_i$, $Rx_j$: transmit a pseudo random IQ signal of a desired bandwidth while the Tx antenna element $Tx_i$ and the Rx antenna element $Rx_j$ are active; cross-correlate the transmitted pseudo random IQ signal and a received IQ signal received via the Rx antenna element $Rx_j$; and compute the gain measurement ($G_{MTx_iRx_j}$) and the phase measurement ($\phi_{MTx_iRx_j}$) for the pairs of Tx and Rx antenna elements $Tx_i$, $Rx_j$ based on results of the cross-correlating.

Embodiments related to remote post-processing of measurements made at a transceiver in order to provide self-calibration are also disclosed. In some embodiments, a method of operation of a processing system to provide self-calibration for a plurality of Tx antenna elements and a plurality of Rx antenna elements in an antenna array of a remote transceiver comprises obtaining, from the transceiver, gain measurements ($G_{MTx_iRx_j}$) and phase measurements ($\phi_{MTx_iRx_j}$) for pairs of Tx and Rx antenna elements in the antenna array of the transceiver. Gain measurement $G_{MTx_iRx_j}$ is a measured gain at an output of a receiver coupled to a j-th Rx antenna element during reception of a signal transmitted by a transmitter coupled to an i-th Tx antenna element. The method further comprises processing the gain measurements ($G_{MTx_iRx_j}$) and the phase measurements ($\phi_{MTx_iRx_j}$) based on combinations of Tx and Rx antenna elements having symmetrical coupling properties to obtain gain and phase calibration values for the plurality of Tx antenna elements and the plurality of Rx antenna elements in the antenna array. The method further comprises providing the gain and phase calibration values to the transceiver.

In some embodiments, processing the gain measurements ($G_{MTx_iRx_j}$) and the phase measurements ($\phi_{MTx_iRx_j}$) comprises selecting a pair of Tx antenna elements ($Tx_i$ and $Tx_k$, where $i \neq k$), determining a first pair of Rx antenna elements ($Rx_n$ and $Rx_m$) having symmetrical coupling properties with respect to the pair of Tx antenna elements ($Tx_i$ and $Tx_k$), and computing at least one relative gain value and at least one relative phase value for the Tx antenna element $Tx_i$ relative to the Tx antenna element $Tx_k$ based on at least two of: the gain measurement ($G_{MTx_iRx_n}$) and the phase measurement ($\phi_{MTx_iRx_n}$) for the pair of Tx and Rx antenna elements $Tx_i$ and $Rx_n$; the gain measurement ($G_{MTx_iRx_m}$) and the phase measurement ($\phi_{MTx_iRx_m}$) for the pair of Tx and Rx antenna elements $Tx_i$ and $Rx_m$; the gain measurement ($G_{MTx_kRx_n}$) and the phase measurement ($\phi_{MTx_kRx_n}$) for the pair of Tx and Rx antenna elements $Tx_k$ and $Rx_n$; and the gain measurement ($G_{MTx_kRx_m}$) and the phase measurement ($\phi_{MTx_kRx_m}$) for the pair of Tx and Rx antenna elements $Tx_k$ and $Rx_m$. Processing the gain measurements ($G_{MTx_iRx_j}$) and the phase measurements ($\phi_{MTx_iRx_j}$) further comprises repeating the steps of determining and computing for at least one second pair of Rx antenna elements ($Rx_n$ and $Rx_m$) having symmetrical coupling properties with respect to the pair of Tx antenna elements ($Tx_i$ and $Tx_k$). Processing the gain measurements ($G_{MTx_iRx_j}$) and the phase measurements ($\phi_{MTx_iRx_j}$) further comprises averaging the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$; repeating the steps of selecting, determining, computing, repeating, and averaging for at least one second pair of Tx antenna elements; and normalizing the average relative gain values and the average relative phase values relative to a defined reference Tx antenna element to thereby provide gain and phase calibration values for the plurality of Tx antenna elements.

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_n$, a mutual coupling between the Tx antenna element $Tx_i$ and the Rx antenna element $Rx_m$ is approximately the same as a mutual coupling between the Tx antenna element $Tx_k$ and the Rx antenna element $Rx_m$, and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2}$$

and a relative phase value defined as:

$$\Delta \phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}.$$

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_m$, a mutual coupling between the Tx antenna element $Tx_i$ and the Rx antenna element $Rx_m$ is approximately the same as a mutual coupling between the Tx antenna element $Tx_k$ and the Rx antenna element $Rx_n$, and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2}$$

and a relative phase value defined as:

$$\Delta \phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2}.$$

In some embodiments, averaging the relative gain values and the relative phase values for the Tx antenna element $Tx_i$ relative to the Tx antenna element $Tx_k$ across the first pair of Rx antenna elements and the at least one second pair of Rx antenna elements comprises performing a weighted average of the relative gain values and the relative phase values for the Tx antenna element $Tx_i$ relative to the Tx antenna element $Tx_k$ across the first pair of Rx antenna elements and the at least one second pair of Rx antenna elements.

In some embodiments, processing the gain measurements ($G_{MTx_iRx_j}$) and the phase measurements ($\phi_{MTx_iRx_j}$) comprises selecting a pair of Rx antenna elements ($Rx_n$ and $Rx_m$, where $n \neq m$), determining a first pair of Tx antenna elements ($Tx_i$ and $Tx_k$) having symmetrical coupling properties with respect to the pair of Rx antenna elements ($Rx_n$ and $Rx_m$), and computing at least one relative gain value and at least one relative phase value for the Rx antenna element $Rx_n$ relative to the Rx antenna element $Rx_m$ based on at least two of: the gain measurement ($G_{MTx_iRx_n}$) and the phase measurement ($\phi_{MTx_iRx_n}$) for the pair of Tx and Rx antenna elements $Tx_i$ and $Rx_n$; the gain measurement ($G_{MTx_iRx_m}$) and the phase measurement ($\phi_{MTx_iRx_m}$) for the pair of Tx and Rx antenna elements $Tx_i$ and $Rx_m$; the gain measurement ($G_{MTx_kRx_n}$) and the phase measurement ($\phi_{MTx_kRx_n}$) for the pair of Tx and Rx antenna elements $Tx_k$ and $Rx_n$; and the gain measurement ($G_{MTx_kRx_m}$) and the phase measurement ($\phi_{MTx_kRx_m}$) for the pair of Tx and Rx antenna elements $Tx_k$ and $Rx_m$. Processing the gain measurements ($G_{MTx_iRx_j}$) and the phase measurements ($\phi_{MTx_iRx_j}$) further comprises repeating the steps of determining and computing for at least one second pair of Tx antenna elements ($Tx_i$ and $Tx_k$) having symmetrical coupling properties with respect to the pair of Rx antenna elements ($Rx_n$ and $Rx_m$) and averaging the relative gain values and the relative phase values for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$. Processing the gain measurements ($G_{MTx_iRx_j}$) and the phase measurements ($\phi_{MTx_iRx_j}$) further comprises repeating the steps of selecting, determining, computing, repeating, and averaging for at least one second pair of Rx antenna elements and normalizing the average relative gain values and the average relative phase values relative to a defined reference Rx antenna element to thereby provide gain and phase calibration values for the plurality of Rx antenna elements.

In some embodiments, a mutual coupling between the Tx antenna element $Tx_i$ and the Rx antenna element $Rx_n$ is approximately the same as a mutual coupling between the Tx antenna element $Tx_i$ and the Rx antenna element $Rx_m$, a mutual coupling between the Tx antenna element $Tx_k$ and the Rx antenna element $Rx_n$ is approximately the same as a mutual coupling between the Tx antenna element $Tx_k$ and the Rx antenna element $Rx_m$, and the at least one relative gain value and the at least one relative phase value for the Rx antenna element $Rx_n$ relative to the Rx antenna element $Rx_m$ comprises a relative gain defined as:

$$\Delta G_{Rx_n Rx_m}(3) = \frac{(G_{MTx_i Rx_n} - G_{MTx_i Rx_m}) + (G_{MTx_k Rx_n} - G_{MTx_k Rx_m})}{2}$$

and a relative phase value defined as:

$$\Delta \phi_{Rx_n Rx_m}(3) = \frac{(\phi_{MTx_i Rx_n} - \phi_{MTx_i Rx_m}) + (\phi_{MTx_k Rx_n} - \phi_{MTx_k Rx_m})}{2}.$$

In some embodiments, a mutual coupling between the Tx antenna element $Tx_i$ and the Rx antenna element $Rx_n$ is approximately the same as a mutual coupling between the Tx antenna element $Tx_k$ and the Rx antenna element $Rx_m$, a mutual coupling between the Tx antenna element $Tx_i$ and the Rx antenna element $Rx_m$ is approximately the same as a mutual coupling between the Tx antenna element $Tx_k$ and the Rx antenna element $Rx_n$, and the at least one relative gain value and the at least one relative phase value for the Rx antenna element $Rx_n$ relative to the Rx antenna element $Rx_m$ comprises a relative gain value defined as:

$$\Delta G_{Rx_n Rx_m}(4) = \frac{(G_{MTx_i Rx_n} - G_{MTx_k Rx_m}) + (G_{MTx_i Rx_m} - G_{MTx_k Rx_n})}{2}$$

and a relative phase value defined as:

$$\Delta \phi_{Rx_n Rx_m}(4) = \frac{(\phi_{MTx_i Rx_n} - \phi_{MTx_k Rx_m}) + (\phi_{MTx_i Rx_m} - \phi_{MTx_k Rx_n})}{2}.$$

In some embodiments, averaging the relative gain values and the relative phase values for the Rx antenna element $Rx_n$ relative to the Rx antenna element $Rx_m$ across the first pair of Tx antenna elements and the at least one second pair of Tx antenna elements comprises performing a weighted average of the relative gain values and the relative phase values for the Rx antenna element $Rx_n$ relative to the Rx antenna element $Rx_m$ across the first pair of Tx antenna elements and the at least one second pair of Tx antenna elements.

Embodiments of a processing system enabled to perform self-calibration for a plurality of Tx antenna elements and a plurality of Rx antenna elements in an antenna array of a remote transceiver are also disclosed. In some embodiments, the processing system comprises a communication interface, at least one processor, and memory comprising instructions executable by the at least one processor whereby the processing system is operable to perform the method of operation of the processing system according to any one of the embodiments disclosed herein.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
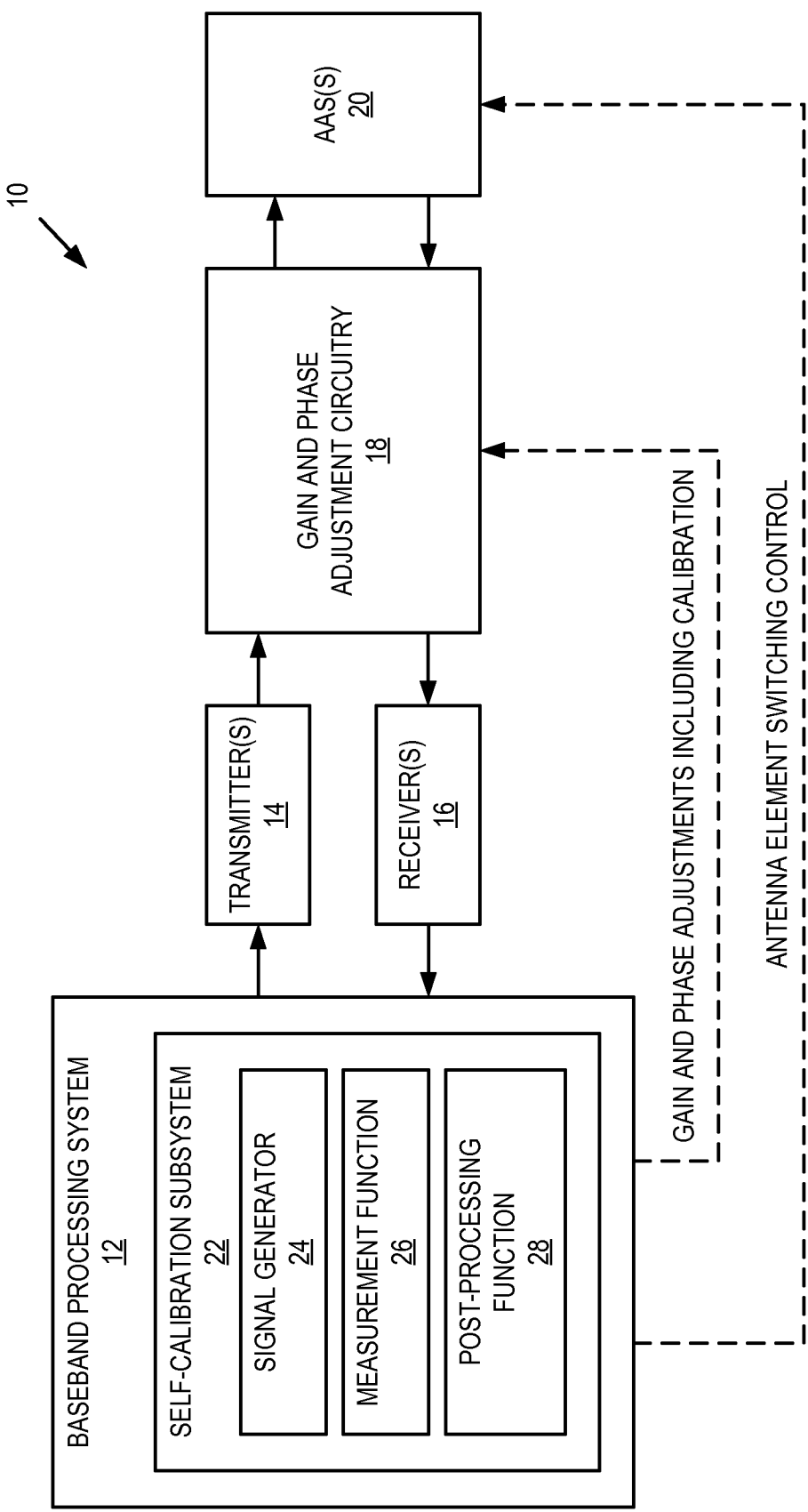
FIG. 1 illustrates an example embodiment of a transceiver (e.g., an analog beamforming transceiver) that provides self-calibration for an antenna array of the transceiver according to embodiments of the present disclosure.

FIG. 1 illustrates an example embodiment of a transceiver 10 that provides self-calibration for an antenna array of the transceiver 10 according to embodiments of the present disclosure. In some preferred embodiments, the transceiver 10 is an analog beamforming transceiver and, as such, the transceiver 10 is sometimes referred to herein as an analog beamforming transceiver 10. However, it should be appreciated that, in some other embodiments, the transceiver 10 may, e.g., be partly digital. The analog beamforming transceiver 10 may be, for example, a radio access node in a cellular communications network (e.g., a Third Generation Partnership Project (3GPP) Long Term Evolution (LTE) or Fifth Generation (5G) New Radio (NR) network), an access point in a local wireless network (e.g., an access point in a WiFi network), a wireless communication device (e.g., a User Equipment device (UE) in a 3GPP LTE or Third Generation (3G) NR network), or the like. As illustrated, the analog beamforming transceiver 10 includes a baseband processing system 12, one or more transmitters 14 and one or more receivers 16 coupled to the baseband processing system 12, gain and phase adjustment circuitry 18, and an antenna array that, in this example, is implemented as one or more Advanced Antenna Systems (AASs) 20. The baseband processing system 12 is implemented in hardware or a combination of hardware and software. For example, the baseband processing system 12 may include one or more processors (e.g., Central Processing Units (CPUs), Digital Signal Processors (DSPs), Application Specific Integrated Circuits (ASICs), Field Programmable Gate Arrays (FPGAs), and/or the like). In some embodiments, at least some of the functionality of the baseband processing system 12 described herein is implemented in software that is executed by the processor(s).

The antenna array implemented by the one or more AASs 20 includes multiple antenna elements and, in some implementations, many antenna elements (e.g., tens or hundreds of antenna elements). When an antenna element is used for transmission from the transmitter(s) 14, the antenna element is referred to herein as a Transmit (Tx) antenna element. Likewise when an antenna element is used for reception via the receiver(s) 16, the antenna element is referred to herein as a Receive (Rx) antenna element. In some implementations, a single antenna element may operate as both a Tx antenna element and a Rx antenna element. Due to various parameters (e.g., manufacturing tolerances of the various components in the transmit and receive paths, temperature, etc.), there may be variations in gain and/or phase between different Tx antenna elements and/or variations in gain and/or phase between different Rx antenna elements. In particular, the gain and phase of a first transmit path from the output of the baseband processing system 12 to a first Tx antenna element may differ from that of a second transmit path from the output of the baseband processing system 12 to a second Tx antenna element. Likewise, the gain and phase of a first receive path from a first Rx antenna element to the input of the baseband processing system 12 may differ from that of a second receive path from a second Rx antenna element to the input of the baseband processing system 12.

The baseband processing system 12 includes a self-calibration subsystem 22 that operates to provide self-calibration at the analog beamforming transceiver 10 for the variations in gain and/or phase for different Tx and/or Rx antenna elements. The self-calibration subsystem 22 is implemented in hardware or a combination of hardware and software. For example, the self-calibration subsystem 22 may include one or more processors (e.g., CPUs, DSPs, ASICs, FPGAs, and/or the like). In some embodiments, at least some of the functionality of the self-calibration subsystem 22 described herein is implemented in software that is executed by the processor(s). In this example, the self-calibration subsystem 22 includes a signal generator 24, a measurement function 26, and a post-processing function 28, the operation of which is described below in detail. Note that, in some embodiments, some or all of the components used for self-calibration can be dedicated for that purpose (i.e., not used for transmission or reception of normal uplink and downlink signals).

Coupling between the antenna elements is generally asymmetrical. Specifically, for a particular Tx antenna element, the coupling between the Tx antenna element and some Rx antenna elements is symmetrical whereas the coupling between the Tx antenna element and some other Rx antenna elements is asymmetrical. Likewise, for a particular Rx antenna element, the coupling between the Rx antenna element and some Tx antenna elements is symmetrical whereas the coupling between the Rx antenna element and some other Tx antenna elements is asymmetrical. As discussed below, embodiments of the present disclosure provide self-calibration at the analog beamforming transceiver 10 based on measurements between pairs of Tx antenna elements and pairs of Rx antenna elements having symmetrical coupling properties with respect to one another.

Figure 2A:
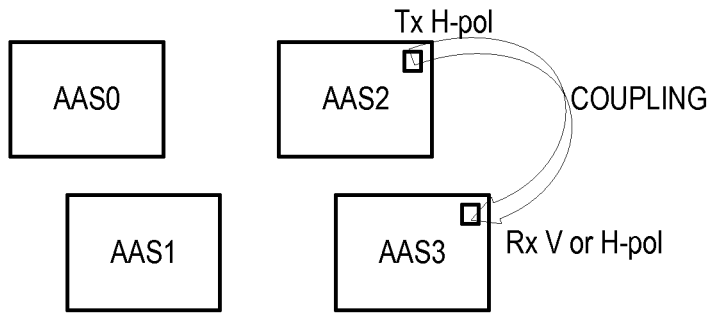
FIGS. 2A through 2C illustrate examples of a measurement arrangement that may be used when providing self-calibration according to some embodiments of the present disclosure.
Figure 2B:
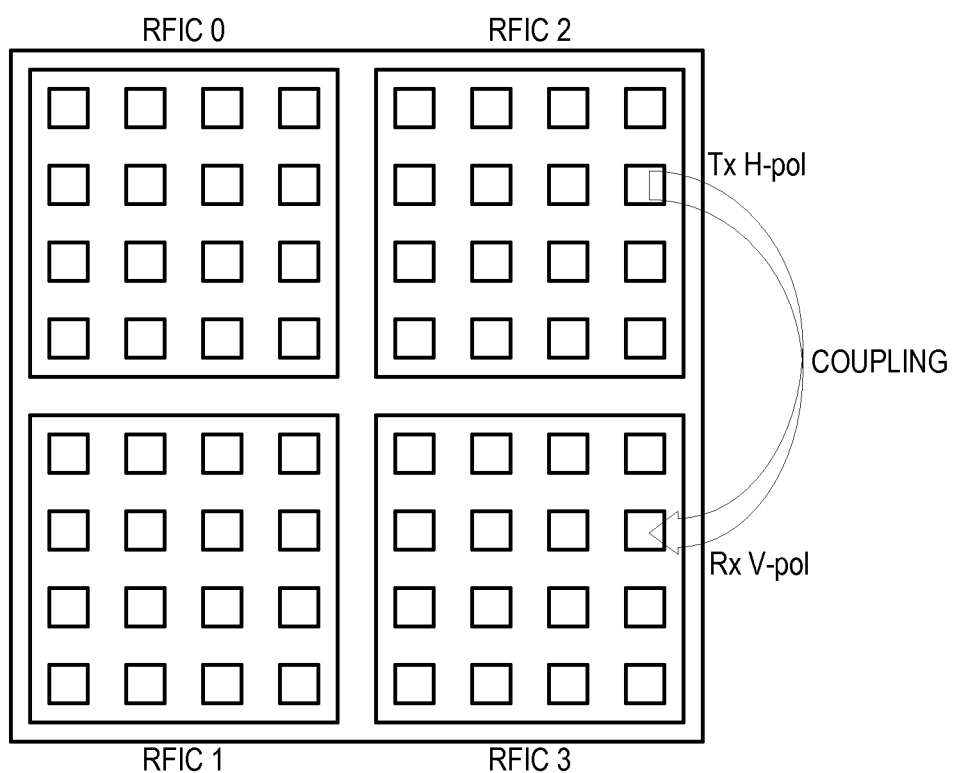
Figure 2C:
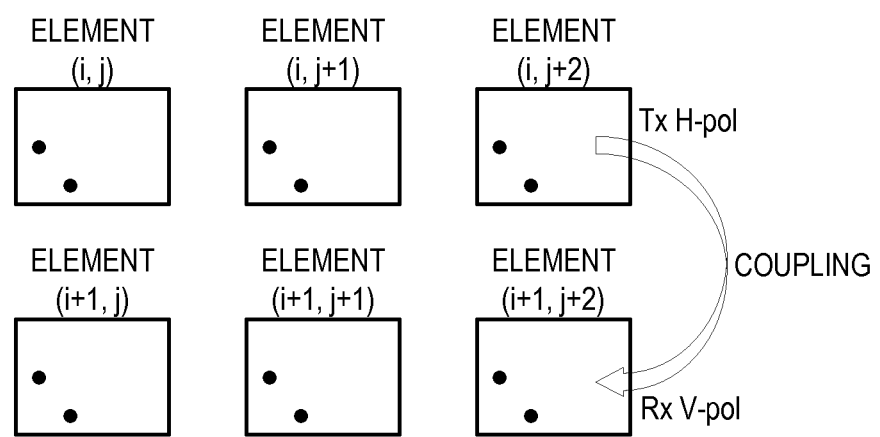

The measurement arrangement for obtaining the measurements used for the self-calibration process may vary. As illustrated in FIG. 2A, in some example embodiments, measurements can be performed between individual Tx antenna elements and individual Rx antenna elements between two AASs 20 in a same unit with the same or different polarization. FIG. 2B illustrates an example in which measurements can be performed between individual Tx antenna elements and individual Rx antenna elements on different Radio Frequency Integrated Circuits (RFICs) of a same AAS 20. However, in this case, the polarization should be different because of analog beamforming setup where a Tx antenna element and a Rx antenna element of the same polarization are using the same channel in Time Domain Duplexing (TDD). FIG. 2C illustrates an example in which any Tx antenna element and Rx antenna element can be selected for measurement if there is scope to operate the Tx antenna element in Horizontal polarization and the Rx antenna element in Vertical polarization and vice versa. This is one preferred measurement scenario as the Tx antenna element and the Rx antenna element are in proximity and differences in coupling values will be minimal with better symmetry. However, note that FIGS. 2A through 2C are only examples.

Figure 3:
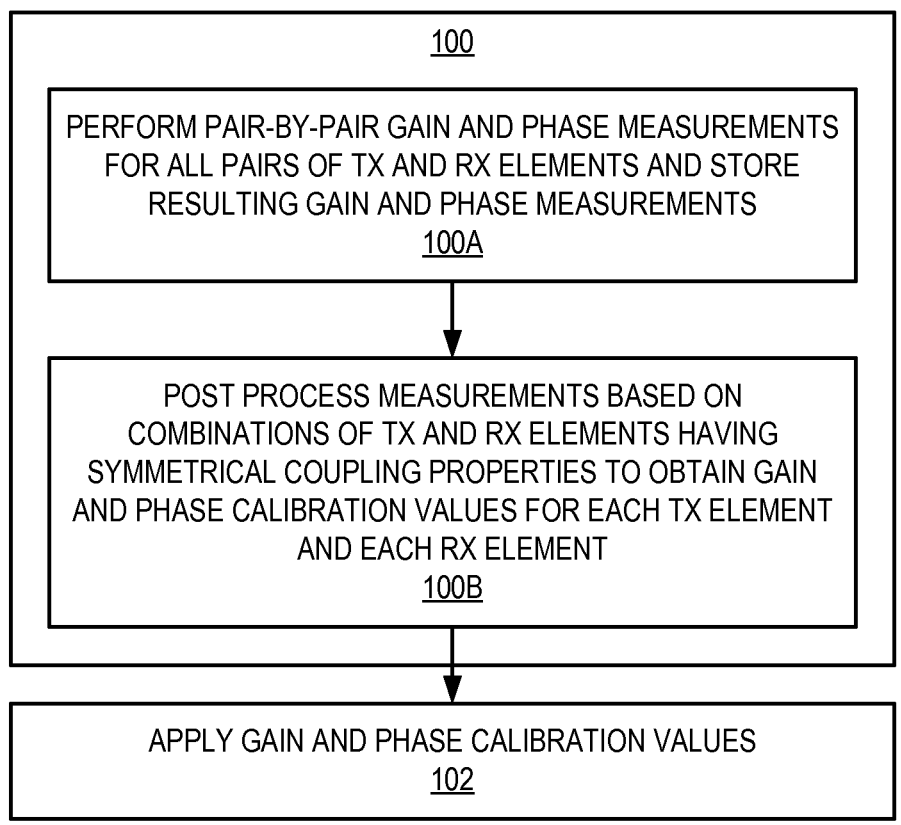
FIG. 3 is a flow chart that illustrates the operation of a transceiver (e.g., an analog beamforming transceiver) to perform self-calibration of an antenna array according to some embodiments of the present disclosure.

FIG. 3 is a flow chart that illustrates the operation of the analog beamforming transceiver 10, and in particular the self-calibration subsystem 22 of the analog beamforming transceiver 10, to perform self-calibration of the antenna array formed by the one or more AASs 20 according to some embodiments of the present disclosure. In operation, the analog beamforming transceiver 10, and in particular the measurement function 26 of the self-calibration subsystem 22, performs a self-calibration procedure (step 100). In particular, the analog beamforming transceiver 10 performs pair-by-pair gain and phase measurements for all pairs of Tx and Rx antenna elements in the antenna array formed by the one or more AASs 20 and stores the resulting measurements (step 100A). In other words, for each pair of Tx and Rx antenna elements $Tx_i$ and $Rx_j$, where $I=1 \ldots N_{Tx}$ and $j=1 \ldots N_{Rx}$ and $N_{Tx}$ is the number of Tx antenna elements in the antenna array and $N_{Rx}$ is the number of Rx antenna elements in the antenna array, the analog beamforming transceiver 10 performs a gain measurement ($G_{MTx_iRx_j}$) and a phase measurement ($G_{MTx_iRx_j}$). The details of how the gain and phase measurements $G_{MTx_iRx_j}$ and $\phi_{MTx_iRx_j}$ are performed is provided below with respect to FIG. 4. However, in general, an IQ signal (e.g., a pseudo-random IQ signal having a desired bandwidth for the measurement) is generated by the signal generator 24 and provided to the transmitter(s) 14 for transmission via the Tx antenna element $Tx_i$. The measurement function 26 measures the gain and phase of a received signal that is received via the receiver(s) 16 and the Rx antenna element $Rx_j$ during transmission of the IQ signal from the Tx antenna element $Tx_i$. The measured gain and phase are the gain and phase measurement values $G_{MTx_iRx_j}$ and $\phi_{MTx_iRx_j}$. This process is performed for each pair of Tx and Rx antenna elements.

The analog beamforming transceiver 10, and in particular the post-processing function 28 of the self-calibration subsystem 22, performs post-processing of the gain and phase measurements $G_{MTx_iRx_j}$ and $\phi_{MTx_iRx_j}$ for all i and j to compute gain and phase calibration values for the Tx and Rx antenna elements of the antenna array (step 100B). The details of step 100B are provided below with respect to FIGS. 5A and 5B and FIGS. 7A and 7B. In general, the post-processing function 28 computes the gain and phase calibration values based on the gain and phase measurements $G_{MTx_iRx_j}$ and $\phi_{MTx_iRx_j}$ and combinations of Tx and Rx antenna elements having symmetrical coupling properties. The combinations of Tx and Rx antenna elements having symmetrical coupling properties are, e.g., predefined or predetermined based on, e.g., a known layout of the antenna elements in the antenna array or computed by the analog beamforming transceiver 10 based on, e.g., a known layout of the antenna elements in the antenna array.

The analog beamforming transceiver 10 applies the computed gain and phase calibration values at the analog beamforming transceiver 10 to thereby compensate for gain and phase variations between the different Tx antenna elements (referred to herein as Tx calibration) and between the different Rx antenna elements (referred to herein as Rx calibration) (step 102). The gain and phase calibration values are applied by the gain and phase adjustment circuitry 18.

Figure 4:
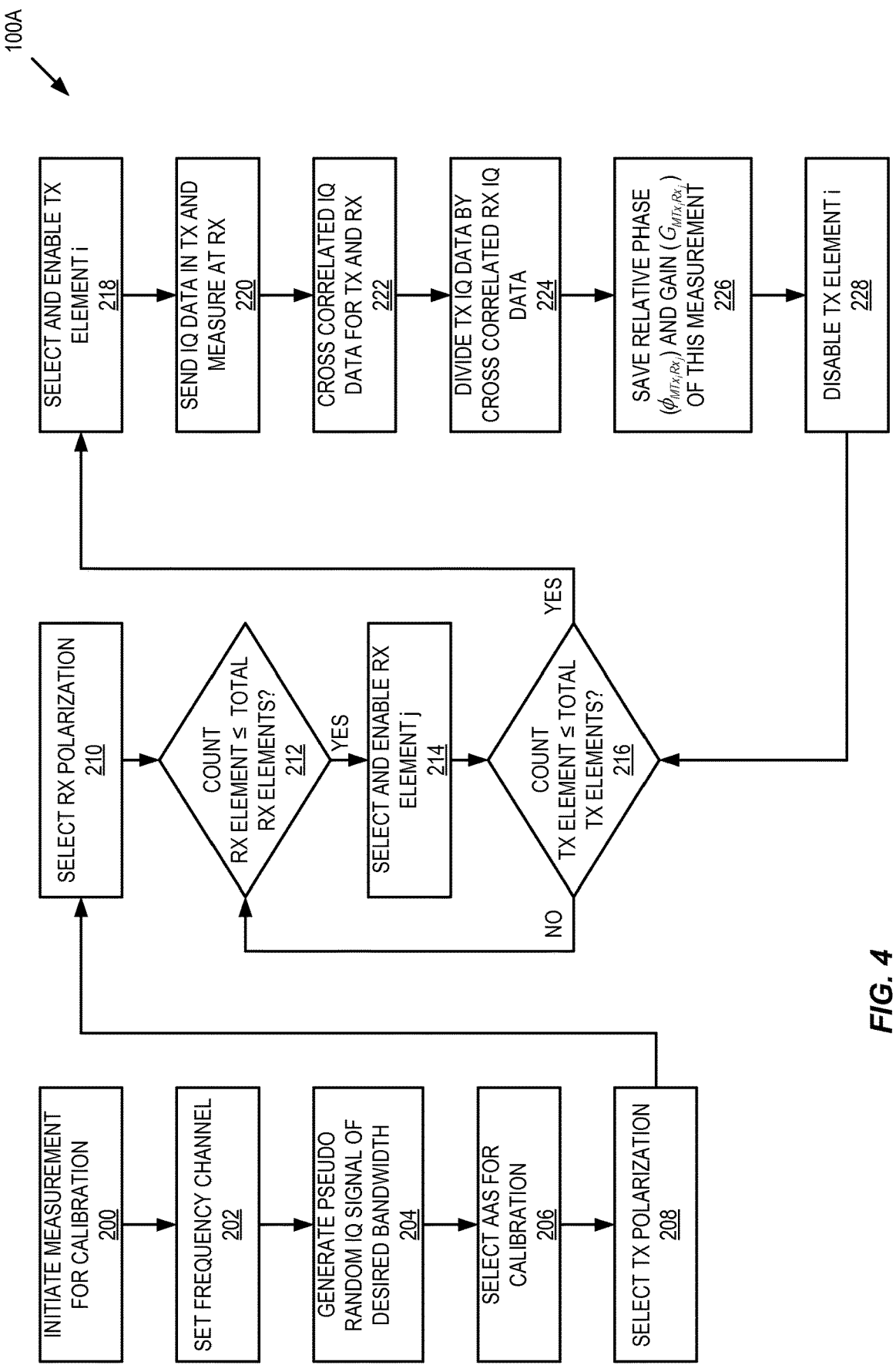
FIG. 4 is a flow chart that illustrates the operation of a transceiver (e.g., an analog beamforming transceiver) to perform gain and phase measurements for different pairs of transmit (Tx) and receive (Rx) antenna elements according to some embodiments of the present disclosure.

FIG. 4 illustrates step 100A of FIG. 3 in more detail according to some embodiments of the present disclosure. As illustrated, the self-calibration subsystem 22 initiates measurement for self-calibration (step 200). The self-calibration subsystem 22 sets a frequency channel for the measurements (step 202). The signal generator 24 generates a pseudo-random IQ signal of a desired bandwidth for the measurements (step 204). The measurement function 26 selects the AAS(s) 20 for calibration (step 206), selects a TX polarization (step 208), and selects an Rx polarization (step 210). For the first iteration, the measurement function 26 initializes a Rx antenna element counter i and a Rx antenna element counter j to, in this example, a value of 0. The measurement function 26 increments (i.e., counts) the Rx antenna element counter j and then determines whether the Rx antenna element counter j is less than or equal to the total number of Rx antenna elements in the antenna array (step 212). If not, the measurement process ends (not shown). If the Rx antenna element counter j is less than or equal to the total number of Rx antenna elements in the antenna array, the measurement function 26 selects and enables the j-th Rx antenna element $Rx_j$ (step 214). For the first iteration, j=1. The Rx antenna element counter j is incremented in subsequent iterations. The measurement function 26 increments (i.e., counts) the Tx antenna element counter i and then determines whether the Tx antenna element counter i is less than or equal to the total number of Tx antenna elements in the antenna array (step 216). If the Tx antenna element counter i is less than or equal to the total number of Tx antenna elements in the antenna array, the measurement function 26 selects and enables the i-th Tx antenna element $Tx_i$ (step 218). For the first iteration, i=1. The Tx antenna element counter i is incremented in subsequent iterations.

The measurement function 26 causes the baseband processing system 12 to send the IQ signal generated by the signal generator 24 in step 204 to the transmitter(s) 14 for transmission via the enabled Tx antenna element $Tx_i$ and reception via the enabled Rx antenna element $Rx_j$ (step 220). The resulting received signal received by the baseband processing system 12 via the enabled Rx antenna element $Rx_j$ is measured by the measurement function 26. More specifically, the measurement function 26 cross-correlates the transmitted IQ signal and the received IQ signal (step 222) and divides (or subtracts in dB scale) the transmitted IQ signal by the cross-correlated received IQ signal (step 224). In other words, the relative phase measurement can be obtained from the cross-correlation (e.g., by looking for the peak in the cross-correlation to determine the relative delay, or phase, between the Tx IQ signal and the Rx IQ signal. The relative gain measurement can be obtained by division in normal scale or by subtraction in dB scale. The relative phase and relative gain for this measurement are stored as a relative phase measurement $\phi_{MTx_iRx_j}$ and a relative gain measurement for $G_{MTx_iRx_j}$ for the Tx antenna element $Tx_i$ relative to the Rx antenna element $Rx_j$ (step 226).

The measurement function 26 then disables the Tx antenna element $Tx_i$ (step 228), and the process returns to step 216 such that gain and phase measurements are performed for all Tx antenna elements relative to the Rx antenna element $Rx_j$. Once gain and phase measurements are performed for all Tx antenna elements relative to the Rx antenna element $Rx_j$, the measurement function 26 disables the Rx antenna element $Rx_j$ (not shown), and the process returns to step 212 to be repeated for the next Rx antenna element. Once phase and gain measurements have been performed (and stored) for all Tx, Rx antenna element pairs, the measurement process ends.

Figure 5A:
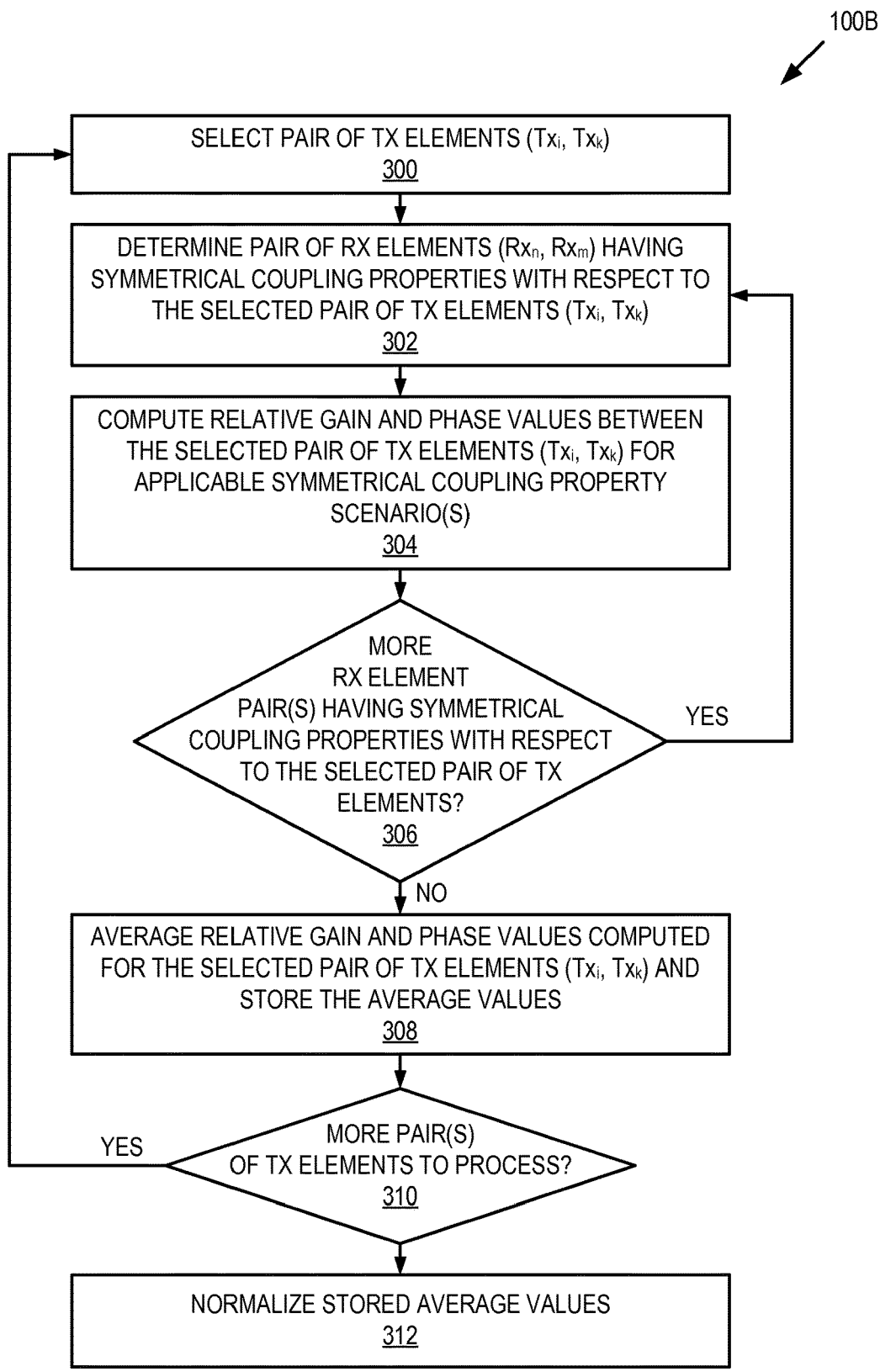
FIGS. 5A and 5B are flow charts that illustrate the operation of a transceiver (e.g., an analog beamforming transceiver) to post-process gain and phase measurements for pairs of Tx antenna elements and pairs of Rx antenna elements having symmetrical coupling properties to obtain gain and phase calibration values for Tx and Rx calibration, respectively, according to some embodiments of the present disclosure.
Figure 5B:
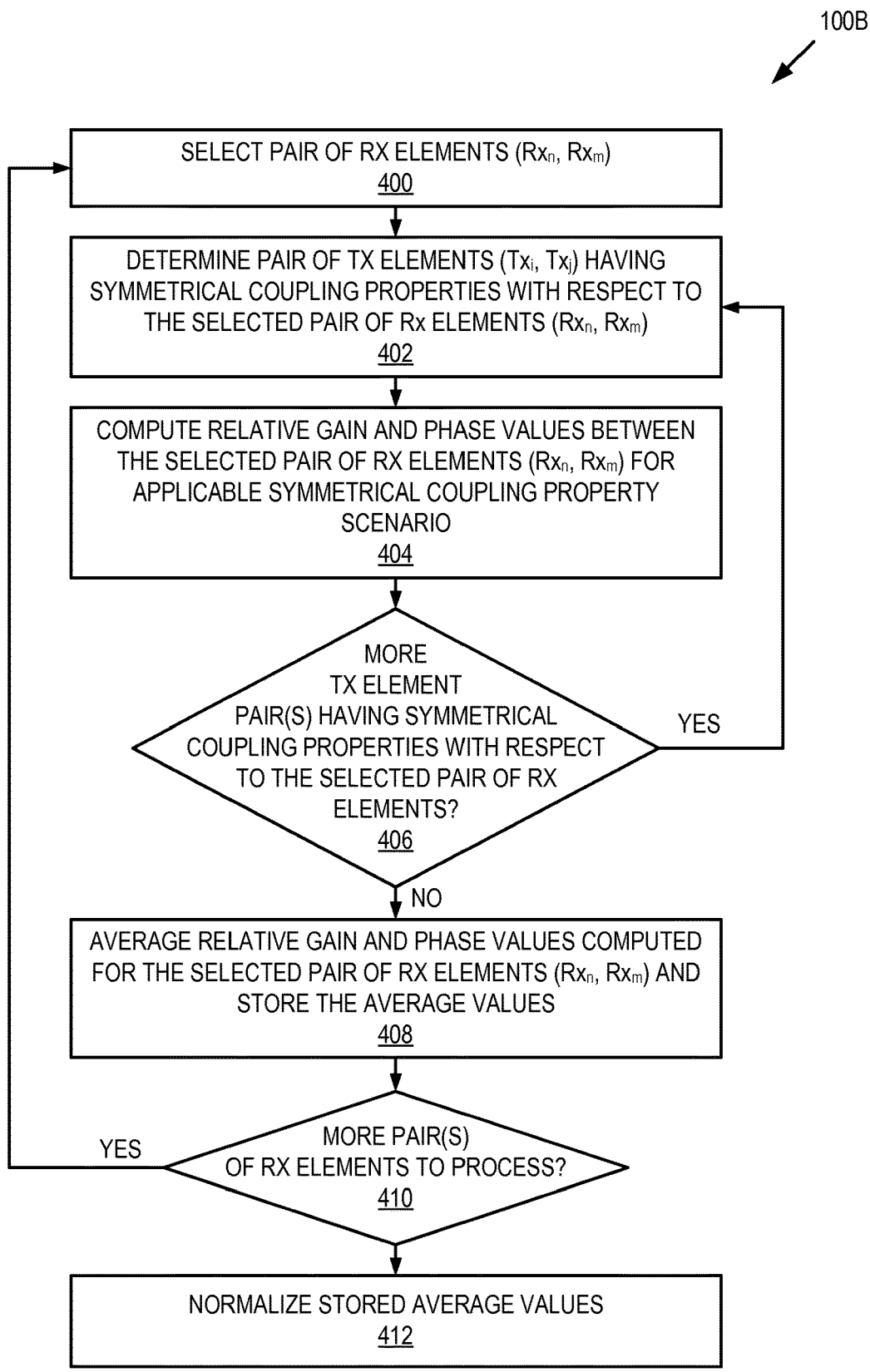

FIGS. 5A and 5B illustrate step 100B of FIG. 3 in more detail according to some embodiments of the present disclosure. In particular, FIG. 5A illustrates the operation of the post-processing function 28 to compute gain and phase calibration values for Tx calibration, and FIG. 5B illustrates the operation of the post-processing function 28 to compute gain and phase calibration for Rx calibration. In some embodiments, both Tx and Rx calibration are performed. However, in some other embodiments, only Tx calibration or only Rx calibration may be performed.

First, as shown in FIG. 5A, the post-processing function 28 selects a pair of Tx antenna elements, $Tx_i$ and $Tx_k$, where i≠k (step 300). The post-processing function 28 determines a pair of Rx antenna elements, $Rx_n$ and $Rx_m$ where n≠m, having symmetrical coupling properties with respect to the selected pair of Tx antenna elements $Tx_i$ and $Tx_k$ (step 302).

In some embodiments, pairs of Rx antenna elements that have symmetrical coupling properties with respect to the pair of Tx antenna elements $Tx_i$ and $Tx_k$ are known (e.g., predefined or predetermined based on, e.g., the layout of the Tx and Rx antenna elements in the antenna array and, e.g., stored in a Look Up Table (LUT), computed based on, e.g., the layout of the Tx and Rx antenna elements in the antenna array, or the like). For Tx calibration, the pair of Rx antenna elements $Rx_n$ and $Rx_m$ that have symmetrical coupling properties with respect to the pair of Tx antenna elements $Tx_i$ and $Tx_k$ satisfy either or both of the following two symmetrical coupling scenarios:

1. $CTx_iRx_n \to CTx_kRx_n$ and $CTx_iRx_m \to CTx_kRx_m$
2. $CTx_iRx_n \to CTx_kRx_m$ and $CTx_iRx_m \to CTx_kRx_n$ where $CTx_iRx_n$ is the coupling between Tx antenna element $Tx_i$ and Rx antenna element $Rx_n$, $CTx_iRx_m$ is the coupling between Tx antenna element $Tx_i$ and Rx antenna element $Rx_m$, $CTx_kRx_n$ is the coupling between Tx antenna element $Tx_k$ and Rx antenna element $Rx_n$, and $CTx_kRx_m$ is the coupling between Tx antenna element $Tx_k$ and Rx antenna element $Rx_m$. Further, in this context, the symbol "$\to$" means "approximately equal to" or "approaches." Thus, coupling scenario (1) is where: (a) the coupling between Tx antenna element $Tx_i$ and Rx antenna element $Rx_n$ is approximately equal to the coupling between Tx antenna element $Tx_k$ and Rx antenna element $Rx_n$ and the coupling between Tx antenna element $Tx_i$ and Rx antenna element $Rx_m$ is approximately equal to the coupling between Tx antenna element $Tx_k$ and Rx antenna element $Rx_m$. Similarly, coupling scenario (2) is where: (a) the coupling between Tx antenna element $Tx_i$ and Rx antenna element $Rx_n$ is approximately equal to the coupling between Tx antenna element $Tx_k$ and Rx antenna element $Rx_m$ and the coupling between Tx antenna element $Tx_i$ and Rx antenna element $Rx_m$ is approximately equal to the coupling between Tx antenna element $Tx_k$ and Rx antenna element $Rx_n$.

The post-processing function 28 computes a relative gain value(s) and a relative phase value(s) between the pair of Tx antenna elements $Tx_i$ and $Tx_k$ for the applicable symmetrical coupling scenario(s) based on the gain and phase measurements obtained in step 100A (step 304). Specifically, for the pair of Tx antenna elements $Tx_i$ and $Tx_k$ and the pair of Rx antenna elements $Rx_n$ and $Rx_m$ having symmetrical coupling properties, the gain measurements previously obtained are $G_{MTx_iRx_n}$, $G_{MTx_iRx_m}$, $G_{MTx_kRx_n}$, and $G_{MTx_kRx_m}$, and the phase measurements previously obtained are $\phi_{MTx_iRx_n}$, $\phi_{MTx_iRx_m}$, $\phi_{MTx_kRx_n}$, and $\phi_{MTx_kRx_m}$.

The gain measurements may be defined as follows:

$$G_{MTx_iRx_n} = G_{Tx_i} + G_{CTx_iRx_n} + G_{Rx_n} \tag{1a}$$

$$G_{MTx_iRx_m} = G_{Tx_i} + G_{CTx_iRx_m} + G_{Rx_n} \tag{1b}$$

$$G_{MTx_kRx_n} = G_{Tx_k} + G_{CTx_kRx_n} + G_{Rx_n} \tag{1c}$$

$$G_{MTx_kRx_m} = G_{Tx_k} + G_{CTx_kRx_m} + G_{Rx_n}$$

where $G_{Tx_i}$ is a gain of the i-th transmit branch (i.e., a gain for the path from an output of the baseband processing system 12 to the Tx antenna element $Tx_i$, $G_{Tx_k}$ is a gain of the k-th transmit branch (i.e., a gain for the path from an output of the baseband processing system 12 to the Tx antenna element $Tx_k$, $G_{Rx_n}$ is a gain of the n-th receive branch (i.e., a gain for the path from the Rx antenna element $Rx_n$ to an input of the baseband processing system 12, $G_{Rx_m}$ is a gain of the m-th receive branch (i.e., a gain for the path from the Rx antenna element $Rx_m$ to an input of the baseband processing system 12, $G_{CTx_iRx_n}$ is a gain resulting from coupling between the Tx antenna element $Tx_i$ and the Rx antenna element $Rx_n$, $G_{CTx_iRx_m}$ is a gain resulting from coupling between the Tx antenna element $Tx_i$ and the Rx antenna element $Rx_m$, $G_{CTx_kRx_n}$ is a gain resulting from coupling between the Tx antenna element $Tx_k$ and the Rx antenna element $Rx_n$, and $G_{CTx_kRx_m}$ is a gain resulting from coupling between the Tx antenna element $Tx_k$ and the Rx antenna element $Rx_m$. Note that for all of the equations provided herein, gain is represented in decibels (dB) (i.e., $G_{dB} = 20 \log_{10}(G_{LINEAR})$. As one of skill in the art will appreciate upon reading this disclosure, the equations can easily be rewritten in terms of linear gain.

Based on symmetrical coupling scenario (1) for Tx calibration given above, a first relative gain value $\Delta G_{Tx_iTx_k}(1)$ for the gain of $Tx_i$ relative to the gain of $Tx_k$ can be computed as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2} \tag{2}$$

By substituting Equations (1a) through (1d) above into Equation (2), it can be seen that:

$$\frac{(G_{MTx_iRx_n} - G_{MTx_kRx_n}) + (G_{MTx_iRx_m} - G_{MTx_kRx_m})}{2} = (G_{Tx_i} - G_{Tx_k}) + e_{CG,Tx}(1) \tag{3}$$

where $e_{CG,Tx}(1)$ is an error term defined as:

$$e_{CG,Tx}(1) = \frac{(G_{CTx_iRx_n} - G_{CTx_kRx_n})}{2} + \frac{(G_{CTx_iRx_m} - G_{CTx_kRx_m})}{2}. \tag{4}$$

Note that, due to the symmetrical coupling properties, the error term $e_{CG,Tx}(1)$ is small. In other words, the term $(G_{CTx_iRx_n} - G_{CTx_kRx_n})$ will be small since $CTx_iRx_n \to CTx_kRx_n$, and the term $(G_{CTx_iRx_m}, G_{CTx_kRx_m})$ will be small since $CTx_iRx_m \to CTx_kRx_m$. However, there is still some error. As discussed below, this error is mitigated by averaging the computed relative gain values across multiple different pairs of Rx antenna elements having symmetrical coupling properties with respect to the same pair of Tx antenna elements.

Based on symmetrical coupling scenario (2) for Tx calibration given above, a second relative gain value $\Delta G_{Tx_iTx_k}(2)$ for the gain of $Tx_i$ relative to the gain of $Tx_k$ can be computed as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2} \tag{5}$$

By substituting Equations (1a) through (1d) above into Equation (5), it can be seen that:

$$\frac{(G_{MTx_iRx_n} - G_{MTx_kRx_m}) + (G_{MTx_iRx_m} - G_{MTx_kRx_n})}{2} = \quad (6)$$

$$(G_{Tx_i} - G_{Tx_k}) + e_{CG,Tx}(2)$$

where $e_{CG,Tx}(2)$ is an error term defined as:

$$e_{CG,Tx}(2) = \frac{(G_{CTx_iRx_n} - G_{CTx_kRx_m})}{2} + \frac{(G_{CTx_iRx_m} - G_{CTx_kRx_n})}{2}. \quad (7)$$

Note that, due to the symmetrical coupling properties, the error term $e_{CG,Tx}(2)$ is small. In other words, the term $(G_{CTx_iRx_n} - G_{CTx_kRx_m})$ will be small since $CTx_iRx_n \to CTx_kRx_m$, and the term $(G_{CTx_iRx_m} - G_{CTx_kRx_n})$ will be small since $CTx_iRx_m \to CTx_kRx_n$. However, there is still some error. Again, as discussed below, this error is mitigated by averaging the computed relative gain values across multiple different pairs of Rx antenna elements having symmetrical coupling properties with respect to the same pair of Tx antenna elements.

In a similar manner, the phase measurements may be defined as follows:

$$\phi_{MTx_iRx_n} = \phi_{Tx_i} + \phi_{CTx_iRx_n} + \phi_{Rx_n} \quad (8a)$$

$$\phi_{MTx_iRx_m} = \phi_{Tx_i} + \phi_{CTx_iRx_m} + \phi_{Rx_m} \quad (8b)$$

$$\phi_{MTx_kRx_n} = \phi_{Tx_k} + \phi_{CTx_kRx_n} + \phi_{Rx_n} \quad (8c)$$

$$\phi_{MTx_kRx_m} = \phi_{Tx_k} + \phi_{CTx_kRx_m} + \phi_{Rx_m} \quad (8d)$$

where $\phi_{Tx_i}$ is a phase of the i-th transmit branch (i.e., a phase for the path from an output of the baseband processing system 12 to the Tx antenna element $Tx_i$, $\phi_{Tx_k}$ is a phase of the k-th transmit branch (i.e., a phase for the path from an output of the baseband processing system 12 to the Tx antenna element $Tx_k$, $\phi_{Rx_n}$ is a phase of the n-th receive branch (i.e., a phase for the path from the Rx antenna element $Rx_n$ to an input of the baseband processing system 12, $\phi_{Rx_m}$ is a phase of the m-th receive branch (i.e., a phase for the path from the Rx antenna element $Rx_m$ to an input of the baseband processing system 12, $\phi_{CTx_iRx_n}$ is a phase resulting from coupling between the Tx antenna element $Tx_i$ and the Rx antenna element $Rx_n$, $\phi_{CTx_iRx_m}$ is a phase resulting from coupling between the Tx antenna element $Tx_i$ and the Rx antenna element $Rx_m$, $\phi_{CTx_kRx_n}$ is a phase resulting from coupling between the Tx antenna element $Tx_k$ and the Rx antenna element $Rx_n$, and $\phi_{CTx_kRx_m}$ is a phase resulting from coupling between the Tx antenna element $Tx_k$ and the Rx antenna element $Rx_m$.

Based on symmetrical coupling scenario (1) for Tx calibration given above, a first relative phase value $\Delta\phi_{Tx_iTx_k}(1)$ for the phase of $Tx_i$ relative to the phase of $Tx_k$ can be computed as:

$$\Delta\phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}. \quad (9)$$

Note that in the term $\Delta\phi_{Tx_iTx_k}(1)$ and similar terms described herein, the parenthetical "(x)" is used to refer to coupling scenario "x" (e.g., $\Delta\phi_{Tx_iTx_k}(1)$ refers to a relative phase value computed for coupling scenario (1) whereas $\Delta\phi_{Tx_iTx_k}(2)$ refers to a relative phase value computed for coupling scenario (2)). By substituting Equations (8a) through (8d) above into Equation (9), it can be seen that:

$$\frac{(\phi_{MTx_iRx_n} - \phi_{MTx_kRx_n}) + (\phi_{MTx_iRx_m} - \phi_{MTx_kRx_m})}{2} = \quad (10)$$

$$(\phi_{Tx_i} - \phi_{Tx_k}) + e_{C\phi,Tx}(1)$$

where $e_{C\phi,Tx}(1)$ is an error term defined as:

$$e_{C\phi,Tx}(1) = \frac{(\phi_{CTx_iRx_n} - \phi_{CTx_kRx_n})}{2} + \frac{(\phi_{CTx_iRx_m} - \phi_{CTx_kRx_m})}{2}. \quad (11)$$

Note that, due to the symmetrical coupling properties, the error term $e_{C\phi,Tx}(1)$ is small. In other words, the term $(\Delta\phi_{Tx_iTx_n} - \Delta\phi_{Tx_kTx_n})$ will be small since $CTx_iRx_n \to CTx_kRx_n$, and the term $(\Delta\phi_{Tx_iTx_m} - \Delta\phi_{Tx_kTx_m})$ will be small since $CTx_iRx_m \to CTx_kRx_m$. However, there is still some error. As discussed below, this error is mitigated by averaging the computed relative phase values across multiple different pairs of Rx antenna elements having symmetrical coupling properties with respect to the same pair of Tx antenna elements.

Based on symmetrical coupling scenario (2) for Tx calibration given above, a second relative phase value $\Delta\phi_{Tx_iTx_k}(2)$ for the phase of $Tx_i$ relative to the phase of $Tx_k$ can be computed as:

$$\Delta\phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2} \quad (12)$$

By substituting Equations (8a) through (8d) above into Equation (12), it can be seen that:

$$\frac{(\phi_{MTx_iRx_n} - \phi_{MTx_kRx_m}) + (\phi_{MTx_iRx_m} - \phi_{MTx_kRx_n})}{2} = \quad (13)$$

$$(\phi_{Tx_i} - \phi_{Tx_k}) + e_{C\phi,Tx}(2)$$

where $e_{C\phi,Tx}(2)$ is an error term defined as:

$$e_{C\phi,Tx}(2) = \frac{(\phi_{CTx_iRx_n} - \phi_{CTx_kRx_m})}{2} + \frac{(\phi_{CTx_iRx_m} - \phi_{CTx_kRx_n})}{2}. \quad (14)$$

Note that, due to the symmetrical coupling properties, the error term $e_{C\phi,Tx}(2)$ is small. In other words, the term $(\Delta\phi_{Tx_iTx_n} - \Delta\phi_{Tx_kTx_m})$ will be small since $CTx_iRx_n \to CTx_kRx_m$, and the term $(\Delta\phi_{Tx_iTx_m} - \Delta\phi_{Tx_kTx_n})$ will be small since $CTx_iRx_m \to CTx_kRx_n$. However, there is still some error. Again, as discussed below, this error is mitigated by averaging the computed relative phase values across multiple different pairs of Rx antenna elements having symmetrical coupling properties with respect to the same pair of Tx antenna elements.

The post-processing function 28 determines whether there are more Rx pairs that have symmetrical coupling properties with respect to the selected pair of Tx antenna elements $Tx_i$ and $Tx_k$ (step 306). Preferably, there are two or more different Rx pairs that have symmetrical coupling properties with respect to the same pair of Tx antenna elements $Tx_i$ and $Tx_k$ such that, for each pair of Rx antenna elements, separate gain and phase values are computed in accordance with Equations (2), (5), (9), and (12) above. In this manner, multiple relative gain values $\Delta G_{Tx_iTx_k}(1, p)$ and $\Delta G_{Tx_iTx_k}(2, p)$ and multiple relative phase values $\Delta \phi_{Tx_iTx_k}(1, p)$ and $\Delta \phi_{Tx_iTx_k}(2, p)$ are determined for the same pair of Tx antenna elements $Tx_i$ and $Tx_k$, where "p" is an index for the Rx pair such that p=1 for the first Rx pair. Thus, for example, $\Delta G_{Tx_iTx_k}(1, p)$ is the relative gain value $\Delta G_{Tx_iTx_k}(1)$ for the p-th Rx pair.

The post-processing function 28 averages the relative gain values $\Delta G_{Tx_iTx_k}(1, p)$ and $\Delta G_{Tx_iTx_k}(2, p)$ for the pair of Tx antenna elements $Tx_i$ and $Tx_k$ across all pairs of Rx antenna elements $Rx_n$, $Rx_m$ having symmetrical coupling properties with respect to the pair of Tx antenna elements $Tx_i$ and $Tx_k$ to provide an average relative gain value $\overline{\Delta G_{Tx_iTx_k}}$ for the pair of Tx antenna elements $Tx_i$ and $Tx_k$. Similarly, the post-processing function 28 averages the relative phase values $\Delta \phi_{Tx_iTx_k}(1, p)$ and $\Delta \phi_{Tx_iTx_k}(2, p)$ for the pair of Tx antenna elements $Tx_i$ and $Tx_k$ across all pairs of Rx antenna elements $Rx_n$, $Rx_m$ having symmetrical coupling properties with respect to the pair of Tx antenna elements $Tx_i$ and $Tx_k$ to provide an average relative phase value $\overline{\Delta \phi_{Tx_iTx_k}}$ for the pair of Tx antenna elements $Tx_i$ and $Tx_k$ (step 308). The average values are stored.

In some embodiments, the average values are computed as linear average values. However, in some other embodiments, the average values are computed as weighted average values. As one example implementation of weighted averaging, the larger the (average) distance of Rx elements from Tx elements (in Tx calibration), the smaller the weight. In other words, the weight (W1) applied to the measurement for a particular pair of Tx antenna elements $Tx_i$ and $Tx_k$ is inversely proportional to the distance (e.g., average distance) of the corresponding Rx antenna elements $Rx_n$ and $Rx_m$ from the Tx antenna elements $Tx_i$ and $Tx_k$. As another example implementation, the closer the Rx elements $Rx_n$ and $Rx_m$ to the center of the AAS, the higher the weighting factor. In other words, the weight (W2) applied to the measurement for a particular pair of Tx antenna elements $Tx_i$ and $Tx_k$ is inversely proportional to the distance (e.g., average distance) of the corresponding Rx antenna elements $Rx_n$ and $Rx_m$ from the center of the AAS. In some embodiments, the weight applied to the measurement for a particular pair of Tx antenna elements $Tx_i$ and $Tx_k$ is equal to W1*W2.

In some other embodiments, a statistical distribution analysis may be used in lieu of averaging. More specifically, in some embodiments, a statistical distribution analysis is performed on the gain and phase values for the pairs of Tx antenna elements such that extreme results are filtered out and the remaining values are averaged (linear or weighted average). As an example, the extreme results may be gain values that are more than a defined threshold amount from the mean of all of the gain values and phase values that are more than a defined threshold amount from the mean of all of the phase values.

The post-processing function 28 determines whether there are more TX antenna element pairs to be processed (step 310). If so, the process returns to step 300 and is repeated for the next Tx antenna element pair. Once all of the Tx antenna element pairs have been processed, the post-processing function 28 normalizes the average relative gain values $\overline{\Delta G_{Tx_iTx_k}}$ and the average relative phase value $\overline{\Delta \phi_{Tx_iTx_k}}$ with respect to a single Tx antenna element, which is referred to as a reference Tx antenna element (step 312). The normalized gain values are the gain calibration values $G_{Tx_i}$, and the normalized phase values are the phase calibration values $\phi_{Tx_i}$.

It is important to note that, in the example above, it is assumed that all Rx pairs for all Tx pairs satisfy both symmetrical coupling scenario (1) and symmetrical coupling scenario (2) and that both $\Delta G_{Tx_iTx_k}(1)$ and $\Delta G_{Tx_iTx_k}(2)$ and $\Delta \phi_{Tx_iTx_k}(1)$ and $\Delta \phi_{Tx_iTx_k}(2)$ are computed for each Rx pair. However, the present disclosure is not limited thereto. In some alternative embodiments, for a particular Tx pair $Tx_i$ and $Tx_k$, each Rx pair having symmetrical coupling properties with respect to the Tx pair $Tx_i$ and $Tx_k$ may satisfy only symmetrical coupling scenario (1) in which case only $\Delta G_{Tx_iTx_k}(1)$ and $\Delta \phi_{Tx_iTx_k}(1)$ are computed for that Rx pair, satisfy only symmetrical coupling scenario (2) in which case only $\Delta G_{Tx_iTx_k}(2)$ and $\Delta \phi_{Tx_iTx_k}(2)$ are computed for that Rx pair, or satisfy both symmetrical coupling scenarios (1) and (2) in which both $\Delta G_{Tx_iTx_k}(1)$ and $\Delta \phi_{Tx_iTx_k}(1)$ and $G_{Tx_iTx_k}(2)$ and $\Delta \phi_{Tx_iTx_k}(2)$ are computed for that Rx pair. In some other alternative embodiments, the post-processing function 28 may consider only symmetrical coupling scenario (1) in which case only $\Delta G_{Tx_iTx_k}(1)$ and $\Delta \phi_{Tx_iTx_k}(1)$ are computed. In some other alternative embodiments, the post-processing function 28 may consider only symmetrical coupling scenario (2) in which case only $\Delta G_{Tx_iTx_k}(2)$ and $\Delta \phi_{Tx_iTx_k}(2)$ are computed.

FIG. 5B illustrates the operation of the post-processing function 28 to compute gain and phase calibration for Rx calibration according to some embodiments of the present disclosure. First, the post-processing function 28 selects a pair of Rx antenna elements, $Rx_n$ and $Rx_m$ where n≠m (step 400). The post-processing function 28 determines a pair of Tx antenna elements, $Tx_i$ and $Tx_k$ where i≠k, having symmetrical coupling properties with respect to the selected pair of Rx antenna elements $Rx_n$ and $Rx_m$ (step 402). In some embodiments, pairs of Tx antenna elements that have symmetrical coupling properties with respect to the pair of Rx antenna elements $Rx_n$ and $Rx_m$ are known (e.g., predefined or predetermined based on, e.g., the layout of the Tx and Rx antenna elements in the antenna array and, e.g., stored in a LUT, computed based on, e.g., the layout of the Tx and Rx antenna elements in the antenna array, or the like). For Rx calibration, the pair of Tx antenna elements $Tx_i$ and $Tx_k$ that have symmetrical coupling properties with respect to the pair of Rx antenna elements $Rx_n$ and $Rx_m$ satisfy either or both of the following two symmetrical coupling scenarios:

3. $CTx_iRx_n \rightarrow CTx_iRx_m$ and $CTx_kRx_n \rightarrow CTx_kRx_m$
4. $CTx_iRx_n \rightarrow CTx_kRx_m$ and $CTx_iRx_m \rightarrow CTx_kRx_n$ where $CTx_kRx_n$ is the coupling between Tx antenna element $Tx_i$ and Rx antenna element $Rx_n$, $CTx_kRx_m$ is the coupling between Tx antenna element $Tx_i$ and Rx antenna element $Rx_m$, $CTx_kRx_n$ is the coupling between Tx antenna element $Tx_k$ and Rx antenna element $Rx_n$, and $CTx_kRx_m$ is the coupling between Tx antenna element $Tx_k$ and Rx antenna element $Rx_m$. Further, in this context, the symbol "→" means "approximately equal to" or "approaches." Thus, coupling scenario (3) is where: (a) the coupling between Tx antenna element $Tx_i$ and Rx antenna element $Rx_n$ is approximately equal to the coupling between Tx antenna element $Tx_i$ and Rx antenna element $Rx_m$ and the coupling between Tx antenna element $Tx_k$ and Rx antenna element $Rx_n$ is approximately equal to the coupling between Tx antenna element $Tx_k$ and Rx antenna element $Rx_m$. Similarly, coupling scenario (4) is where: (a) the coupling between Tx antenna element $Tx_i$ and Rx antenna element $Rx_n$ is approximately equal to the coupling between Tx antenna element $Tx_k$ and Rx antenna element $Rx_m$ and the coupling between Tx antenna element $Tx_i$ and Rx antenna element $Rx_m$ is approximately equal to the coupling between Tx antenna element $Tx_k$ and Rx antenna element $Rx_n$. Note that coupling scenario (4) is the same as coupling scenario (2) above.

The post-processing function 28 computes a relative gain value(s) and a relative phase value(s) between the pair of Rx antenna elements $Rx_n$ and $Rx_m$ for the applicable symmetrical coupling scenario(s) based on the gain and phase measurements obtained in step 100A (step 404). Specifically, for the pair of Rx antenna elements $Rx_n$ and $Rx_m$ and the pair of Tx antenna elements $Tx_i$ and $Tx_k$ having symmetrical coupling properties, the gain measurements previously obtained are $G_{MTx_iRx_n}$, $G_{MTx_iRx_m}$, $G_{MTx_kRx_n}$, and $G_{MTx_kRx_m}$, and the phase measurements previously obtained are $\phi_{MTx_iRx_n}$, $\phi_{MTx_iRx_m}$, $\phi_{MTx_kRx_n}$, and $\phi_{MTx_kRx_m}$.

The gain measurements may be defined as follows:

$$G_{MTx_iRx_n} = G_{Tx_i} + G_{CTx_iRx_n} + G_{Rx_n} \tag{15a}$$

$$G_{MTx_iRx_m} = G_{Tx_i} + G_{CTx_iRx_m} + G_{Rx_m} \tag{15b}$$

$$G_{MTx_kRx_n} = G_{Tx_k} + G_{CTx_kRx_n} + G_{Rx_n} \tag{15c}$$

$$G_{MTx_kRx_m} = G_{Tx_k} + G_{CTx_kRx_m} + G_{Rx_m} \tag{15d}$$

where $G_{Tx_i}$ is a gain of the i-th transmit branch (i.e., a gain for the path from an output of the baseband processing system 12 to the Tx antenna element $Tx_i$, $G_{Tx_k}$ is a gain of the k-th transmit branch (i.e., a gain for the path from an output of the baseband processing system 12 to the Tx antenna element $Tx_k$, $G_{Rx_n}$ is a gain of the n-th receive branch (i.e., a gain for the path from the Rx antenna element $Rx_n$ to an input of the baseband processing system 12, $G_{Rx_m}$ is a gain of the m-th receive branch (i.e., a gain for the path from the Rx antenna element $Rx_m$ to an input of the baseband processing system 12, $G_{CTx_iRx_n}$ is a gain resulting from coupling between the Tx antenna element $Tx_i$ and the Rx antenna element $Rx_n$, $G_{CTx_iRx_m}$ is a gain resulting from coupling between the Tx antenna element $Tx_i$ and the Rx antenna element $Rx_m$, $G_{CTx_kRx_n}$ is a gain resulting from coupling between the Tx antenna element $Tx_k$ and the Rx antenna element $Rx_n$, and $G_{CTx_kRx_m}$ is a gain resulting from coupling between the Tx antenna element $Tx_k$ and the Rx antenna element $Rx_m$. Note that for all of the equations provided herein, gain is represented in dB. As one of skill in the art will appreciate upon reading this disclosure, the equations can easily be rewritten in terms of linear gain.

Based on symmetrical coupling scenario (3) for Rx calibration given above, a first relative gain value $\Delta G_{Rx_nRx_m}(3)$ for the gain of $Rx_n$ relative to the gain of $Rx_m$ can be computed as:

$$\Delta G_{Rx_nRx_m}(3) = \frac{(G_{MTx_iRx_n} - G_{MTx_iRx_m}) + (G_{MTx_kRx_n} - G_{MTx_kRx_m})}{2} \tag{16}$$

By substituting Equations (15a) through (15d) above into Equation (16), it can be seen that:

$$\frac{(G_{MTx_iRx_n} - G_{MTx_iRx_m}) + (G_{MTx_kRx_n} - G_{MTx_kRx_m})}{2} = \tag{17}$$

$$(G_{Rx_n} - G_{Rx_m}) + e_{CG,Rx}(3)$$

where $e_{CG,Rx}(3)$ is an error term defined as:

$$e_{CG,Rx}(3) = \frac{(G_{CTx_iRx_n} - G_{CTx_iRx_m})}{2} + \frac{(G_{CTx_kRx_n} - G_{CTx_kRx_m})}{2}. \tag{18}$$

Note that, due to the symmetrical coupling properties, the error term $e_{CG,Rx}(3)$ is small. In other words, the term $(G_{CTx_iRx_n} - G_{CTx_iRx_m})$ will be small since $CTx_iRx_n \rightarrow CTx_iRx_m$, and the term $(G_{CTx_kRx_n} - G_{CTx_kRx_m})$ will be small since $CTx_kRx_n \rightarrow CTx_kRx_m$. However, there is still some error. As discussed below, this error is mitigated by averaging the computed relative gain values across multiple different pairs of Tx antenna elements having symmetrical coupling properties with respect to the same pair of Rx antenna elements.

Based on symmetrical coupling scenario (4) for Rx calibration given above, a second relative gain value $\Delta G_{Rx_nRx_m}(4)$ for the gain of $Rx_n$ relative to the gain of $Rx_m$ can be computed as:

$$\Delta G_{Rx_nRx_m}(4) = \frac{(G_{MTx_iRx_n} - G_{MTx_kRx_m}) + (G_{MTx_iRx_m} - G_{MTx_kRx_n})}{2} \tag{19}$$

By substituting Equations (15a) through (15d) above into Equation (19), it can be seen that:

$$\frac{(G_{MTx_iRx_n} - G_{MTx_kRx_m}) + (G_{MTx_iRx_m} - G_{MTx_kRx_n})}{2} = \tag{20}$$

$$(G_{Rx_n} - G_{Rx_m}) + e_{CG,Rx}(4)$$

where $e_{CG,Rx}(4)$ is an error term defined as:

$$e_{CG,Rx}(4) = \frac{(G_{CTx_iRx_n} - G_{CTx_kRx_m})}{2} + \frac{(G_{CTx_iRx_m} - G_{CTx_kRx_n})}{2}. \tag{21}$$

Note that, due to the symmetrical coupling properties, the error term $e_{CG,Rx}(4)$ is small. In other words, the term $(G_{CTx_iRx_n} - G_{CTx_kRx_m})$ will be small since $CTx_kRx_n \rightarrow CTx_kRx_m$, and the term $(G_{CTx_iRx_m}\ G_{CTx_kRx_n})$ will be small since $CTx_kRx_m \rightarrow CTx_kRx_n$. However, there is still some error. Again, as discussed below, this error is mitigated by averaging the computed relative gain values across multiple different pairs of Tx antenna elements having symmetrical coupling properties with respect to the same pair of Rx antenna elements.

In a similar manner, the phase measurements may be defined as follows:

$$\phi_{MTx_iRx_n} = \phi_{Tx_i} + \phi_{CTx_iRx_n} + \phi_{Rx_n} \tag{22a}$$

$$\phi_{MTx_iRx_m} = \phi_{Tx_i} + \phi_{CTx_iRx_m} + \phi_{Rx_m} \tag{22b}$$

$$\phi_{MTx_kRx_n} = \phi_{Tx_k} + \phi_{CTx_kRx_n} + \phi_{Rx_n} \tag{22c}$$

$$\phi_{MTx_kRx_m} = \phi_{Tx_k} + \phi_{CTx_kRx_m} + \phi_{Rx_m} \tag{22d}$$

where $\phi_{Tx_i}$ is a phase of the i-th transmit branch (i.e., a phase for the path from an output of the baseband processing system 12 to the Tx antenna element $Tx_i$, $\phi_{Tx_i}$ is a phase of the k-th transmit branch (i.e., a phase for the path from an output of the baseband processing system 12 to the Tx antenna element $Tx_k$, $\phi_{Rx_n}$ is a phase of the n-th receive branch (i.e., a phase for the path from the Rx antenna element $Rx_n$ to an input of the baseband processing system 12, $\phi_{Rx_m}$ is a phase of the m-th receive branch (i.e., a phase for the path from the Rx antenna element $Rx_m$ to an input of the baseband processing system 12, $\phi_{CTx_iRx_n}$ is a phase resulting from coupling between the Tx antenna element $Tx_i$ and the Rx antenna element $Rx_n$, $\phi_{CTx_iRx_m}$ is a phase resulting from coupling between the Tx antenna element $Tx_i$ and the Rx antenna element $Rx_m$, $\phi_{CTx_kRx_n}$ is a phase resulting from coupling between the Tx antenna element $Tx_k$ and the Rx antenna element $Rx_n$, and $\phi_{CTx_kRx_m}$ is a phase resulting from coupling between the Tx antenna element $Tx_k$ and the Rx antenna element $Rx_m$.

Based on symmetrical coupling scenario (3) for Rx calibration given above, a first relative phase value $\Delta\phi_{Rx_nRx_m}(3)$ for the phase of $Rx_n$ relative to the phase of $Rx_m$ can be computed as:

$$\Delta\phi_{Rx_nRx_m}(3) = \frac{(\phi_{MTx_iRx_n} - \phi_{MTx_iRx_m}) + (\phi_{MTx_kRx_n} - \phi_{MTx_kRx_m})}{2} \quad (23)$$

By substituting Equations (22a) through (22d) above into Equation (23), it can be seen that:

$$\frac{(\phi_{MTx_iRx_n} - \phi_{MTx_iRx_m}) + (\phi_{MTx_kRx_n} - \phi_{MTx_kRx_m})}{2} = \quad (24)$$
$$(\phi_{Rx_n} - \phi_{Rx_m}) + e_{C\phi,Rx}(3)$$

where $e_{C\phi,Rx}(3)$ is an error term defined as:

$$e_{C\phi,Rx}(3) = \frac{(\phi_{CTx_iRx_n} - \phi_{CTx_iRx_m})}{2} + \frac{(\phi_{CTx_kRx_n} - \phi_{CTx_kRx_m})}{2}. \quad (25)$$

Note that, due to the symmetrical coupling properties, the error term $e_{C\phi,Rx}(3)$ is small. In other words, the term $(\phi_{CTx_iRx_n}-\phi_{CTx_iRx_m})$ will be small since $CTx_iRx_n \rightarrow CTx_iRx_m$, and the term $(\phi_{CTx_kRx_n}-\phi_{CTx_kRx_m})$ will be small since $CTx_kRx_n \rightarrow CTx_kRx_m$. However, there is still some error. As discussed below, this error is mitigated by averaging the computed relative phase values across multiple different pairs of Tx antenna elements having symmetrical coupling properties with respect to the same pair of Rx antenna elements.

Based on symmetrical coupling scenario (4) for Rx calibration given above, a second relative phase value $\Delta\phi_{Rx_nRx_m}(4)$ for the phase of $Rx_n$ relative to the phase of $Rx_m$ can be computed as:

$$\Delta\phi_{Rx_nRx_m}(4) = \frac{(\phi_{MTx_iRx_n} - \phi_{MTx_kRx_m}) + (\phi_{MTx_iRx_m} - \phi_{MTx_kRx_n})}{2} \quad (26)$$

By substituting Equations (22a) through (22d) above into Equation (26), it can be seen that:

$$\frac{(\phi_{MTx_iRx_n} - \phi_{MTx_kRx_m}) + (\phi_{MTx_iRx_m} - \phi_{MTx_kRx_n})}{2} = \quad (27)$$
$$(\phi_{Rx_n} - \phi_{Rx_m}) + e_{C\phi,Rx}(4)$$

where $e_{C\phi,Rx}(4)$ is an error term defined as:

$$e_{C\phi,Rx}(4) = \frac{(\phi_{CTx_iRx_n} - \phi_{CTx_kRx_m})}{2} + \frac{(\phi_{CTx_iRx_m} - \phi_{CTx_kRx_n})}{2}. \quad (28)$$

Note that, due to the symmetrical coupling properties, the error term $e_{C\phi,Rx}(4)$ is small. In other words, the term $(\phi_{CTx_iRx_n}-\phi_{CTx_kRx_m})$ will be small since $CTx_iRx_n \rightarrow CTx_kRx_m$, and the term $(\phi_{CTx_iRx_m}-\phi_{CTx_kRx_n})$ will be small since $CTx_kRx_m \rightarrow CTx_kRx_n$. However, there is still some error. Again, as discussed below, this error is mitigated by averaging the computed relative phase values across multiple different pairs of Tx antenna elements having symmetrical coupling properties with respect to the same pair of Rx antenna elements.

The post-processing function 28 determines whether there are more Tx pairs that have symmetrical coupling properties with respect to the selected pair of Rx antenna elements $Rx_n$ and $Rx_m$ (step 406). Preferably, there are two or more different Tx pairs that have symmetrical coupling properties with respect to the same pair of Rx antenna elements $Rx_n$ and $Rx_m$ such that, for each pair of Tx antenna elements, separate gain and phase values are computed in accordance with Equations (16), (19), (23), and (26) above. In this manner, multiple relative gain values $\Delta G_{Rx_nRx_m}(3, p)$ and $\Delta G_{Rx_nRx_m}(4, p)$ and multiple relative phase values $\Delta\phi_{Rx_nRx_m}(3, p)$ and $\Delta\phi_{Rx_nRx_m}(4, p)$ for the same pair of Rx antenna elements $Rx_n$ and $Rx_m$, where "p" is an index for the Tx pair such that p=1 for the first Tx pair, p=2 for the second Tx pair, and so on. Thus, for example, $\Delta G_{Rx_nRx_m}(3, p)$ is the relative gain value $\Delta G_{Rx_nRx_m}(3)$ for the p-th Tx pair.

The post-processing function 28 averages the relative gain values $\Delta G_{Rx_nRx_m}(3, p)$ and $\Delta G_{Rx_nRx_m}(4, p)$ for the pair of Rx antenna elements $Rx_n$ and $Rx_m$ across all pairs of Tx antenna elements $Tx_i$, $Tx_k$ having symmetrical coupling properties with respect to the pair of Rx antenna elements $Rx_n$ and $Rx_m$ to provide an average relative gain value $\overline{\Delta G_{Rx_nRx_m}}$ for the pair of Rx antenna elements $Rx_n$ and $Rx_m$. Similarly, the post-processing function 28 averages the relative phase values $\Delta\phi_{Rx_nRx_m}(3, p)$ and $\Delta\phi_{Rx_nRx_m}(4, p)$ for the pair of Rx antenna elements $Rx_n$ and $Rx_m$ across all pairs of Tx antenna elements $Tx_i$, $Tx_k$ having symmetrical coupling properties with respect to the pair of Rx antenna elements $Rx_n$ and $Rx_m$ to provide an average relative phase value $\overline{\Delta\phi_{Rx_nRx_m}}$ for the pair of Rx antenna elements $Rx_n$ and $Rx_m$ (step 408). The average values are stored.

In some embodiments, the average values are computed as linear average values. However, in some other embodiments, the average values are computed as weighted average values. As one example implementation of weighted averaging, the larger the (average) distance of Rx elements from Tx elements, the smaller the weight. In other words, the weight (W1) applied to the measurement for a particular pair of Rx antenna elements $Rx_n$ and $Rx_m$ is inversely proportional to the distance (e.g., average distance) of the corresponding Tx antenna elements $Tx_i$ and $Tx_k$ from the Rx antenna elements $Rx_n$ and $Rx_m$. As another example implementation, the closer the Rx elements $Rx_n$ and $Rx_m$ to the center of the AAS, the higher the weighting factor. In other words, the weight (W2) applied to the measurement for a particular pair of Rx antenna elements $Rx_n$ and $Rx_m$ is inversely proportional to the distance (e.g., average distance) of the Rx antenna elements $Rx_n$ and $Rx_m$ from the center of the AAS. In some embodiments, the weight applied to the measurement for a particular pair of Rx antenna elements $Rx_n$ and $Rx_m$ is equal to W1*W2.

In some other embodiments, a statistical distribution analysis may be used in lieu of averaging. More specifically, in some embodiments, a statistical distribution analysis is performed on the gain and phase values for the pairs of Rx antenna elements such that extreme results are filtered out and the remaining values are averaged (linear or weighted average). As an example, the extreme results may be gain values that are more than a defined threshold amount from the mean of all of the gain values and phase values that are more than a defined threshold amount from the mean of all of the phase values.

The post-processing function 28 determines whether there are more Rx antenna element pairs to be processed (step 410). If so, the processes returns to step 400 and is repeated for the next Rx antenna pair. Once all of the Rx antenna element pairs have been processed, the post-processing function 28 normalizes the average relative gain values $\overline{\Delta G_{Rx_n Rx_m}}$ and the average relative phase value $\overline{\Delta \phi_{Rx_n Rx_m}}$ with respect to a single Rx antenna element, which is referred to as a reference Rx antenna element (step 412). The normalized gain values are the gain calibration values $G_{Rx_n}$, and the normalized phase values are the phase calibration values $\phi_{Rx_n}$.

It is important to note that, in the example above, it is assumed that all Tx pairs for all Rx pairs satisfy both symmetrical coupling scenario (3) and symmetrical coupling scenario (4) and that both $\Delta G_{Rx_n} Rx_m(3)$ and $\Delta \phi_{Rx_n Rx_m}(3)$ and $\Delta G_{Rx_n Rx_m}(4)$ and $\Delta \phi_{Rx_n Rx_m}(4)$ are computed for each Tx pair. However, the present disclosure is not limited thereto. In some alternative embodiments, for a particular Rx pair $Rx_n$ and $Rx_m$, each Tx pair having symmetrical coupling properties with respect to the Rx pair $Rx_n$ and $Rx_m$ may satisfy only symmetrical coupling scenario (3) in which case only $\Delta G_{Rx_n} Rx_m$ and $\Delta \phi_{Rx_n} Rx_m(3)$ are computed for that Tx pair, satisfy only symmetrical coupling scenario (4) in which case only $\Delta G_{Rx_n Rx_m}(4)$ and $\Delta \phi_{Rx_n Rx_m}(4)$ are computed for that Tx pair, or satisfy both symmetrical coupling scenario (3) and (4) in which case both $\Delta G_{Rx_n Rx_m}(3)$ and $\Delta \phi_{Rx_n Rx_m}(3)$ and $G_{Rx_n Rx_m}(4)$ and $\Delta \phi_{Rx_n Rx_m}(4)$ are computed for that Tx pair. In some other alternative embodiments, the post-processing function 28 may consider only symmetrical coupling scenario (3) in which case only $\Delta G_{Rx_n Rx_m}(3)$ and $\Delta \phi_{Rx_n Rx_m}(3)$ are computed. In some other alternative embodiments, the post-processing function 28 may consider only symmetrical coupling scenario (4) in which case only $\Delta G_{Rx_n Rx_m}(4)$ and $\Delta \phi_{Rx_n Rx_m}(4)$ are computed.

Note that in addition to or as an alternative to computing and storing the phase calibration values $\phi_{Tx_i}$ and the gain calibration values $G_{Tx_i}$ for Tx calibration and the phase calibration values $\phi_{Rx_n}$ and the gain calibration values $G_{Rx_n}$ for Rx calibration, the self-calibration subsystem 22 may compute and store a coupling matrix. The coupling matrix stores the phase coupling value $\phi_{CTx_i Rx_j}$ and gain $G_{CTx_i Rx_j}$ for each pair of Tx and Rx antenna elements $Tx_i$ and $Rx_j$. Specifically, the values $\phi_{Tx_i}$ and $G_{Tx_i}$ are known from Tx calibration and the values $\phi_{Rx_j}$ and $G_{Rx_j}$ are known from Rx calibration as performed above. Then, the coupling values $\phi CTx_i Rx_j$ and $G_{CTx_i Rx_j}$ can be computed as:

$$\phi_{CTx_i Rx_j} = \phi_{MTx_i Rx_j} - \phi_{Tx_i} - \phi_{Rx_j}$$

$$G_{CTx_i Rx_j} = G_{MTx_i Rx_j} - G_{Tx_i} - G_{Rx_j}$$

These coupling values can be stored and thereafter used by the transceiver 10 for, e.g., self-calibration.

Figure 6A:
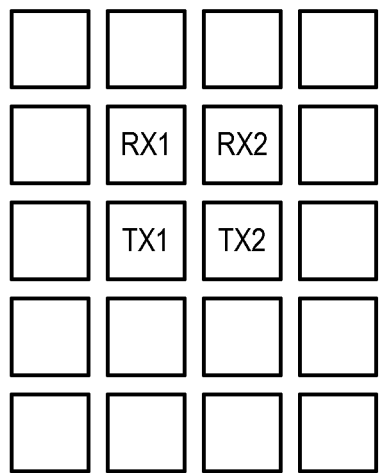
FIGS. 6A and 6B illustrate one example of multiple different Rx pairs having symmetrical coupling properties with respect to a particular Tx antenna element pair that can be used for Tx calibration in accordance with the process of FIG. 5A.
Figure 6A:
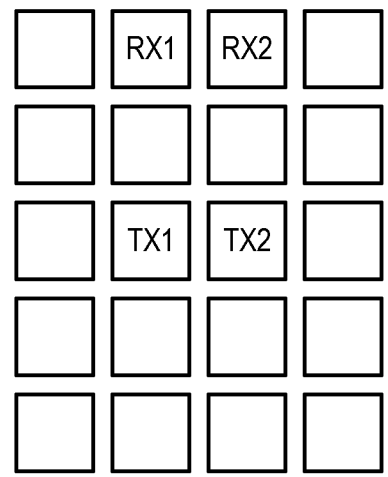
Figure 6A:
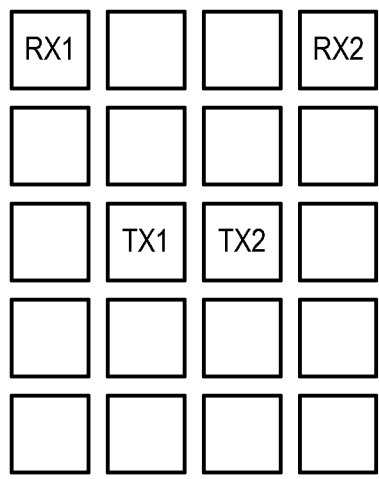
Figure 6A:
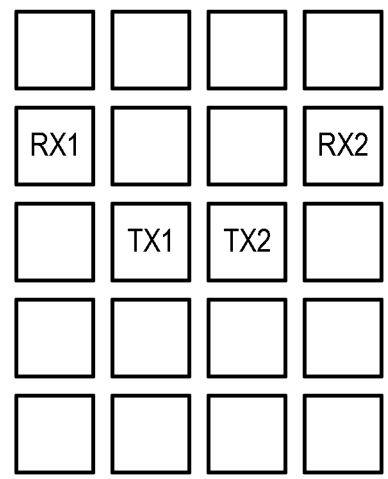
Figure 6B:
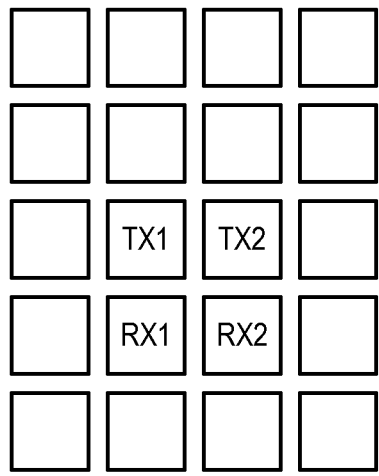
Figure 6B:
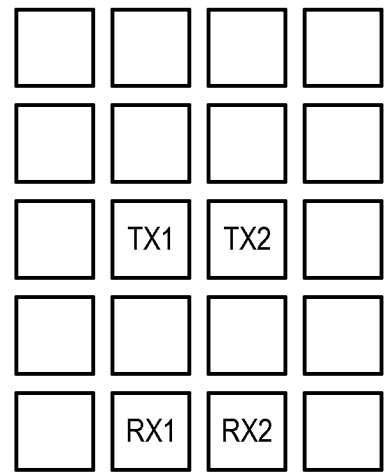
Figure 6B:
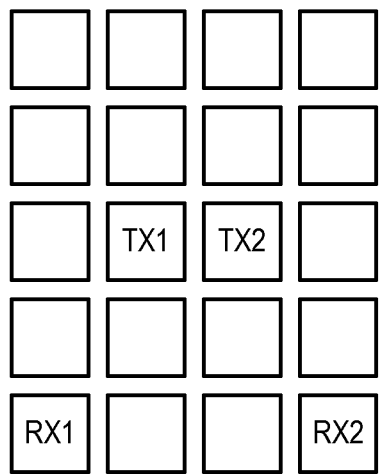
Figure 6B:
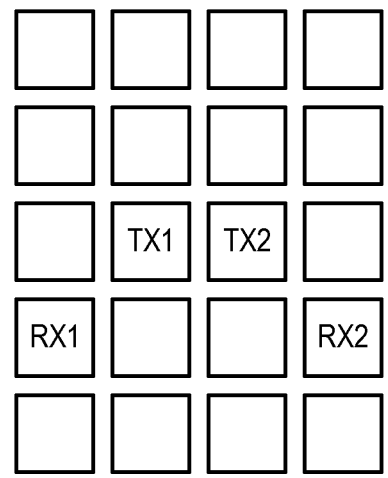

FIGS. 6A and 6B illustrate one example of multiple different Rx pairs having symmetrical coupling properties with respect to a particular Tx antenna element pair that can be used for Tx calibration in accordance with the process of FIG. 5A. In a similar manner, multiple different Tx pairs having symmetrical coupling properties with respect to a particular Rx antenna element pair that can be used for Rx calibration in accordance with the process of FIG. 5B can be determined.

While any suitable process can be used to determine pairs of antenna elements having symmetrical coupling properties, one example is as follows. For Tx calibration, assume a square array of antenna elements where all antenna elements are the same distance from their neighboring antenna elements in the x and y direction. Let $Tx_j$ be at a known position a on the x-axis and b on the y-axis (referred to as position (ax,by)). Let $Tx_k$ be at a known position c on the x-axis and d on the y-axis (referred to as position (cx,dy)). If $Rx_n$ is at a known position p on the x-axis and q on the y-axis (referred to as position (px,qy)), then the position for $Rx_m$ (referred to as rx, sy) to provide symmetrical coupling properties can be computed as:

$$rx = cx + ax - px,$$

$$sy = dy + by - qy$$

where rx is the position of $Rx_m$ on the x-axis and sy is the position of $Rx_m$ on the y-axis and all values of x and y should be within the range of possible values considering the square array of antenna elements. Additional Rx pairs for the same Tx pair can be computed by first selecting a new position for $Rx_n$ and then computing the position for $Rx_m$.

Note that the example above considers distance between a pair of Tx antenna elements and a pair of Rx antenna elements when determining a pair of Rx antenna elements having symmetrical coupling properties with respect to a pair of Tx antenna elements (and vice versa). However, in some embodiments, other factors may additionally or alternatively be considered. For example, for co-polarized coupling, the coupling is stronger in one direction than the other and the coupling in the diagonal direction is low. As another example, for cross-polarization, the coupling in the diagonal direction is stronger than for co-polarized coupling.

Figure 7A:
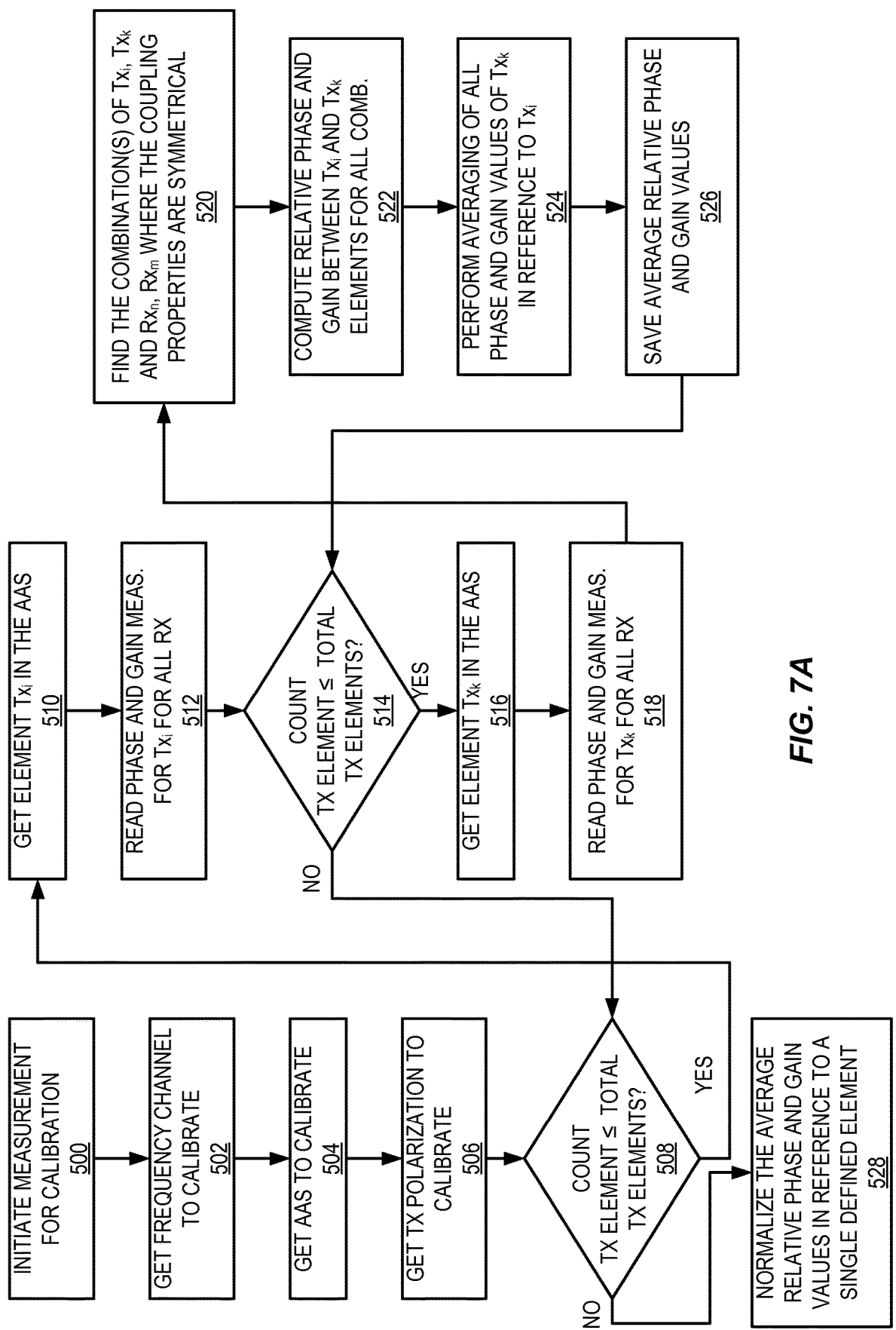
FIGS. 7A and 7B are flow charts that illustrate the operation of a transceiver (e.g., an analog beamforming transceiver) to post-process gain and phase measurements for pairs of Tx antenna elements and pairs of Rx antenna elements having symmetrical coupling properties to obtain gain and phase calibration values for Tx and Rx calibration, respectively, according to some other embodiments of the present disclosure.
Figure 7B:
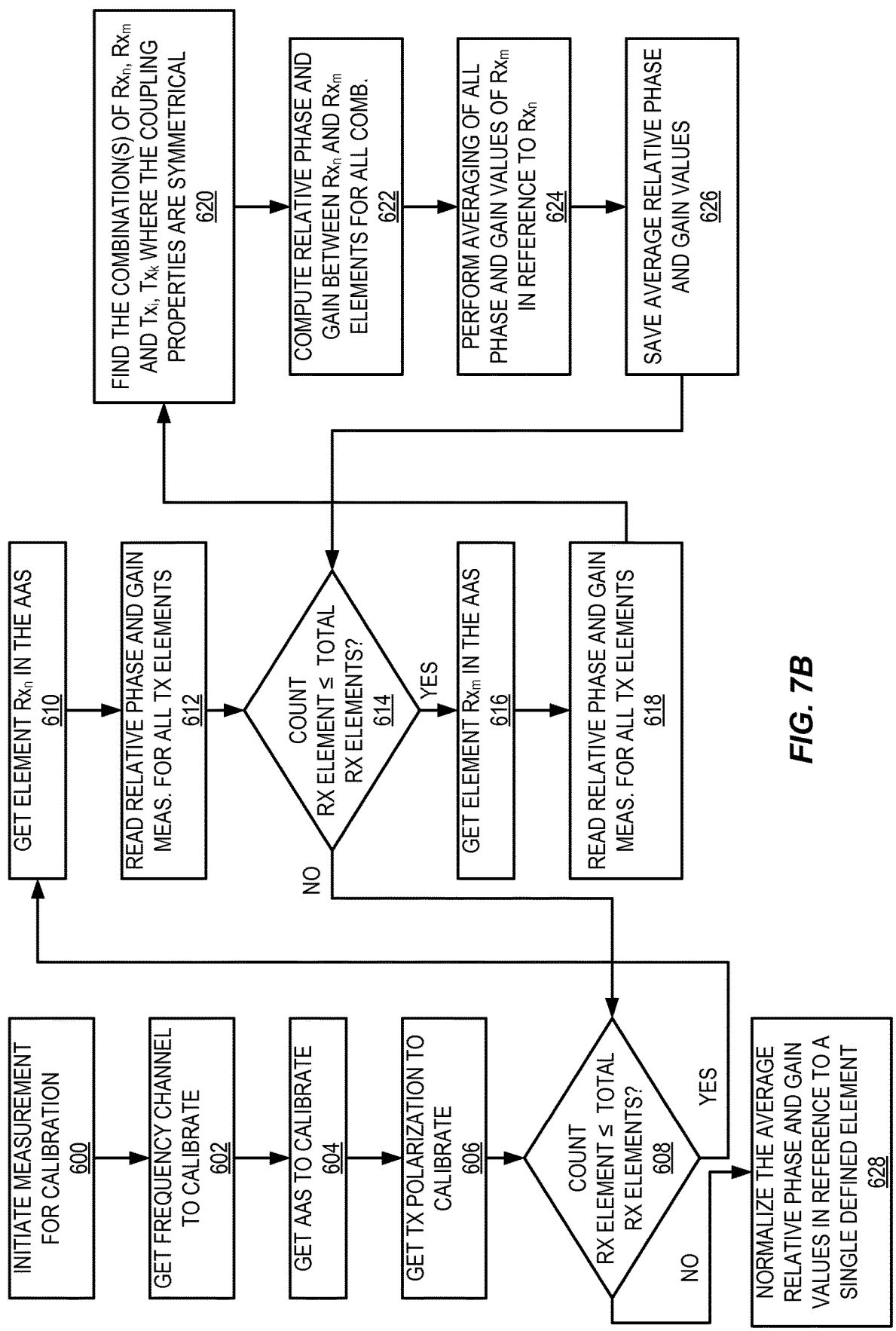

FIGS. 7A and 7B are example implementations of the processes of FIGS. 5A and 5B, respectively. As illustrated in FIG. 7A, for Tx calibration, the self-calibration subsystem 22 initiates measurement for self-calibration, e.g., selects a subarray of the antenna array (step 500). The self-calibration subsystem 22 gets a frequency channel, AAS(s) 20, and TX polarization to calibrate (steps 502 through 506). For the first iteration, the post-processing function 28 initializes a first Tx antenna element counter i and a second Tx antenna element counter k to, in this example, a value of 0. The post-processing function 28 increments (i.e., counts) the first Tx antenna element counter i and then determines whether the first Tx antenna element counter i is less than or equal to the total number of Tx antenna elements in the antenna array (step 508). If not, the process proceeds to step 528, as discussed below. If the first Tx antenna element counter i is less than or equal to the total number of Tx antenna elements in the antenna array, the post-processing function 28 gets the i-th Tx antenna element $Tx_i$ and reads the gain measurements $G_{MTx_iRx_j}$ and the phase measurements $\phi_{MTx_iRx_j}$ for the i-th Tx antenna element $Tx_i$ for all Rx antenna elements $Rx_j$ (for $j \in 1 \ldots N_{Rx}$ where $N_{Rx}$ is the number of Rx antenna elements) (steps 510 and 512).

The post-processing function 28 increments (i.e., counts) the second Tx antenna element counter k and then determines whether the second Tx antenna element counter k is less than or equal to the total number of Tx antenna elements in the antenna array (step 514). If not, the process returns to step 508 where the first Tx antenna element counter i is incremented and the process is repeated. If the second Tx antenna element counter k is less than or equal to the total number of Tx antenna elements in the antenna array, the post-processing function 28 gets the k-th Tx antenna element $Tx_k$ and reads the gain measurements $G_{MTx_kRx_j}$ and the phase measurements $\phi_{MTx_kRx_j}$ for the k-th Tx antenna element $Tx_k$ for all Rx antenna elements $Rx_j$ (for $j \in 1 \ldots N_{Rx}$ where $N_{Rx}$ is the number of Rx antenna elements) (steps 516 and 518).

The post-processing function 28 then finds, or determines, one or more pairs of Rx antenna elements $Rx_n$ and $Rx_m$, but preferably multiple pairs of Rx antenna elements $Rx_n$ and $Rx_m$, having symmetrical coupling properties with respect to the pair of Tx antenna elements $Tx_i$ and $Tx_k$, as discussed above (step 520). As discussed above, for Tx calibration, the pairs(s) of Rx antenna elements $Rx_n$ and $Rx_m$ having symmetrical coupling properties are those Rx antenna pairs for which one or both of the following coupling scenarios are satisfied:

$CTx_kRx_n \rightarrow CTx_kRx_n$ and $CTx_iRx_m \rightarrow CTx_kRx_m$ (referred to as coupling scenario (1) above)

$CTx_iRx_n \rightarrow CTx_kRx_m$ and $CTx_iRx_m \rightarrow CTx_kRx_n$ (referred to as coupling scenario (2) above).

As discussed above, for each determined pair of Rx antenna elements $Rx_n$ and $Rx_m$, the post-processing function 28 computes:

relative gain value $\Delta G_{Tx_iTx_k}(1)$ in accordance with Equation (2) above and/or relative gain value $\Delta G_{Tx_iTx_k}(2)$ in accordance with Equation (5) above, and relative phase value $\Delta \phi_{Tx_iTx_k}(1)$ in accordance with Equation (9) above and/or relative phase value $\Delta G_{Tx_iTx_k}(2)$ in accordance with Equation (12) above, assuming both gain and phase Tx calibration (step 522).

As also discussed above, the post-processing function 28 performs averaging of the relative gain values and the relative phase values for the pair of Tx antenna elements $Tx_i$ and $Tx_k$ across all of the determined pairs of Rx antenna elements $Rx_n$ and $Rx_m$ (step 524). By doing so, the post-processing function 28 computes an average relative gain $\overline{\Delta G_{Tx_iTx_k}}$ for the gain of Tx antenna element $Tx_i$ relative to the gain of the Tx antenna element $Tx_k$ and an average relative phase value $\overline{\Delta \phi_{Tx_iTx_k}}$ for phase of the Tx antenna element $Tx_i$ relative to the Tx antenna element $Tx_k$. The post-processing function 28 saves the average relative gain $\overline{\Delta G_{Tx_iTx_k}}$ and the average relative phase value $\overline{\Delta \phi_{Tx_iTx_k}}$ for the Tx antenna element $Tx_i$ relative to the gain of the Tx antenna element $Tx_k$ (step 526).

At this point, the process returns to step 514 where the second Tx antenna element counter k is incremented and the process is repeated. In this manner, average relative gain $\overline{\Delta G_{Tx_iTx_k}}$ and average relative phase $\overline{\Delta \phi_{Tx_iTx_k}}$ values are computed for the Tx antenna element $Tx_i$ relative to all other Tx antenna elements (i.e., for all $Tx_k$ for $k \neq i$). Once this is done, the process returns to step 508 and is repeated where the first Tx antenna element counter i is incremented and the process is repeated. In this manner, average relative gain $\overline{\Delta G_{Tx_iTx_k}}$ and average relative phase $\overline{\Delta \phi_{Tx_iTx_k}}$ values are computed for all Tx antenna element combinations.

Once average relative gain $\overline{\Delta G_{Tx_iTx_k}}$ and average relative phase $\overline{\Delta \phi_{Tx_iTx_k}}$ values are computed for all Tx antenna element combinations, the post-processing function 28 normalizes the average relative gain $\overline{\Delta G_{Tx_iTx_k}}$ and the average relative phase $\overline{\Delta \phi_{Tx_iTx_k}}$ values relative to a single reference Tx antenna element (step 528). Normalization results in the gain calibration values $G_{Tx_i}$ and the phase calibration values $\phi_{Tx_i}$ for each Tx antenna element $Tx_i$ (for all $i \in 1 \ldots N_{Tx}$).

As illustrated in FIG. 7B, for Rx calibration, the self-calibration subsystem 22 initiates measurement for self-calibration (step 600). The self-calibration subsystem 22 gets a frequency channel, AAS(s) 20, and TX polarization to calibrate (steps 602 through 606). For the first iteration, the post-processing function 28 initializes a first Rx antenna element counter n and a second Rx antenna element counter m to, in this example, a value of 0. The post-processing function 28 increments (i.e., counts) the first Rx antenna element counter n and then determines whether the first Rx antenna element counter n is less than or equal to the total number of Rx antenna elements in the antenna array (step 608). If not, the process proceeds to step 628, as discussed below. If the first Rx antenna element counter n is less than or equal to the total number of Rx antenna elements in the antenna array, the post-processing function 28 gets the n-th Rx antenna element $Rx_n$ and reads the gain measurements $G_{MTx_iRx_n}$ and the phase measurements $\phi_{MTx_iRx_n}$ for the n-th Rx antenna element $Rx_n$ for all Tx antenna elements $Tx_i$ (for $i \in 1 \ldots N_{Tx}$ where $N_{Tx}$ is the number of Tx antenna elements) (steps 610 and 612).

The post-processing function 28 increments (i.e., counts) the second Rx antenna element counter m and then determines whether the second Rx antenna element counter m is less than or equal to the total number of Rx antenna elements in the antenna array (step 614). If not, the process returns to step 608 where the first Rx antenna element counter n is incremented and the process is repeated. If the second Rx antenna element counter m is less than or equal to the total number of Rx antenna elements in the antenna array, the post-processing function 28 gets the m-th Rx antenna element $Rx_m$ and reads the gain measurements $G_{MTx_iRx_m}$ and the phase measurements $\phi_{MTx_iRx_m}$ for the m-th Rx antenna element $Rx_m$ for all Tx antenna elements $Tx_i$ (for $i \in 1 \ldots N_{Tx}$ where $N_{Tx}$ is the number of Tx antenna elements) (steps 616 and 618).

The post-processing function 28 then finds, or determines, one or more pairs of Tx antenna elements $Tx_i$ and $Tx_k$, but preferably multiple pairs of Tx antenna elements $Tx_i$ and $Tx_k$, having symmetrical coupling properties with respect to the pair of Rx antenna elements $Rx_n$ and $Rx_m$, as discussed above (step 620). As discussed above, for Rx calibration, the pairs(s) of Tx antenna elements $Tx_i$ and $Tx_k$ having symmetrical coupling properties are those Tx antenna pairs for which one or both of the following coupling scenarios are satisfied:

$CTx_kRx_n \rightarrow CTx_kRx_m$ and $CTx_iRx_n \rightarrow CTx_iRx_m$ (referred to as coupling scenario (3) above)

$CTx_kRx_n \rightarrow CTx_iRx_m$ and $CTx_iRx_m \rightarrow CTx_kRx_n$ (referred to as coupling scenario (4) above).

As discussed above, for each determined pair of Tx antenna elements $Tx_i$ and $Tx_k$, the post-processing function 28 computes:

relative gain value $\Delta G_{Rx_n Rx_m}(3)$ in accordance with Equation (16) above and/or relative gain value $\Delta G_{Rx_n Rx_m}(4)$ in accordance with Equation (19) above, and relative phase value $\Delta_{Rx_n Rx_m}(3)$ in accordance with Equation (23) above and/or relative phase value $\Delta_{Rx_n Rx_m}(4)$ in accordance with Equation (26) above, assuming both gain and phase Rx calibration (step 622).

As also discussed above, the post-processing function 28 performs averaging of the relative gain values and the relative phase values for the Rx antenna elements $Rx_n$ and $Rx_m$ across all of the determined pairs of Tx antenna element $Tx_i$ and $Tx_k$ (step 624). By doing so, the post-processing function 28 computes an average relative gain $\overline{\Delta G_{Rx_n Rx_m}}$ for the gain of Rx antenna element $Rx_n$ relative to the gain of the Rx antenna element $Rx_m$ and an average relative phase value $\overline{\Delta \phi_{Rx_n Rx_m}}$ for phase of the Rx antenna element $Rx_n$ relative to the Rx antenna element $Rx_m$. The post-processing function 28 saves the average relative gain $\overline{\Delta G_{Rx_n Rx_m}}$ and the average relative phase value $\overline{\Delta \phi_{Rx_n Rx_m}}$ for the Rx antenna element $Rx_n$ relative to the gain of the Rx antenna element $Rx_m$ (step 626).

At this point, the process returns to step 614 where the second Rx antenna element counter m is incremented and the process is repeated. In this manner, average relative gain $\overline{\Delta G_{Rx_n Rx_m}}$ and average relative phase $\overline{\Delta \phi_{Rx_n Rx_m}}$ values are computed for the Rx antenna element $Rx_n$ relative to all other Rx antenna elements (i.e., for all $Rx_m$ for m≠n). Once this is done, the process returns to step 608 and is repeated where the first Rx antenna element counter n is incremented and the process is repeated. In this manner, average relative gain $\overline{\Delta G_{Rx_n Rx_m}}$ and average relative phase $\overline{\Delta \phi_{Rx_n Rx_m}}$ values are computed for all Rx antenna element combinations.

Once average relative gain $\overline{\Delta G_{Rx_n Rx_m}}$ and average relative phase $\overline{\Delta \phi_{Rx_n Rx_m}}$ values are computed for all Rx antenna element combinations, the post-processing function 28 normalizes the average relative gain $\overline{\Delta \phi_{Rx_n Rx_m}}$ and the average relative phase $\overline{\Delta \phi_{Rx_n Rx_m}}$ values relative to a single reference Rx antenna element (step 628). Normalization results in the gain calibration values $G_{Rx_n}$ and the phase calibration values $\phi_{Rx_n}$ for each Rx antenna element $Rx_n$ (for all n∈1 ... $N_{Rx}$).

Figure 8:
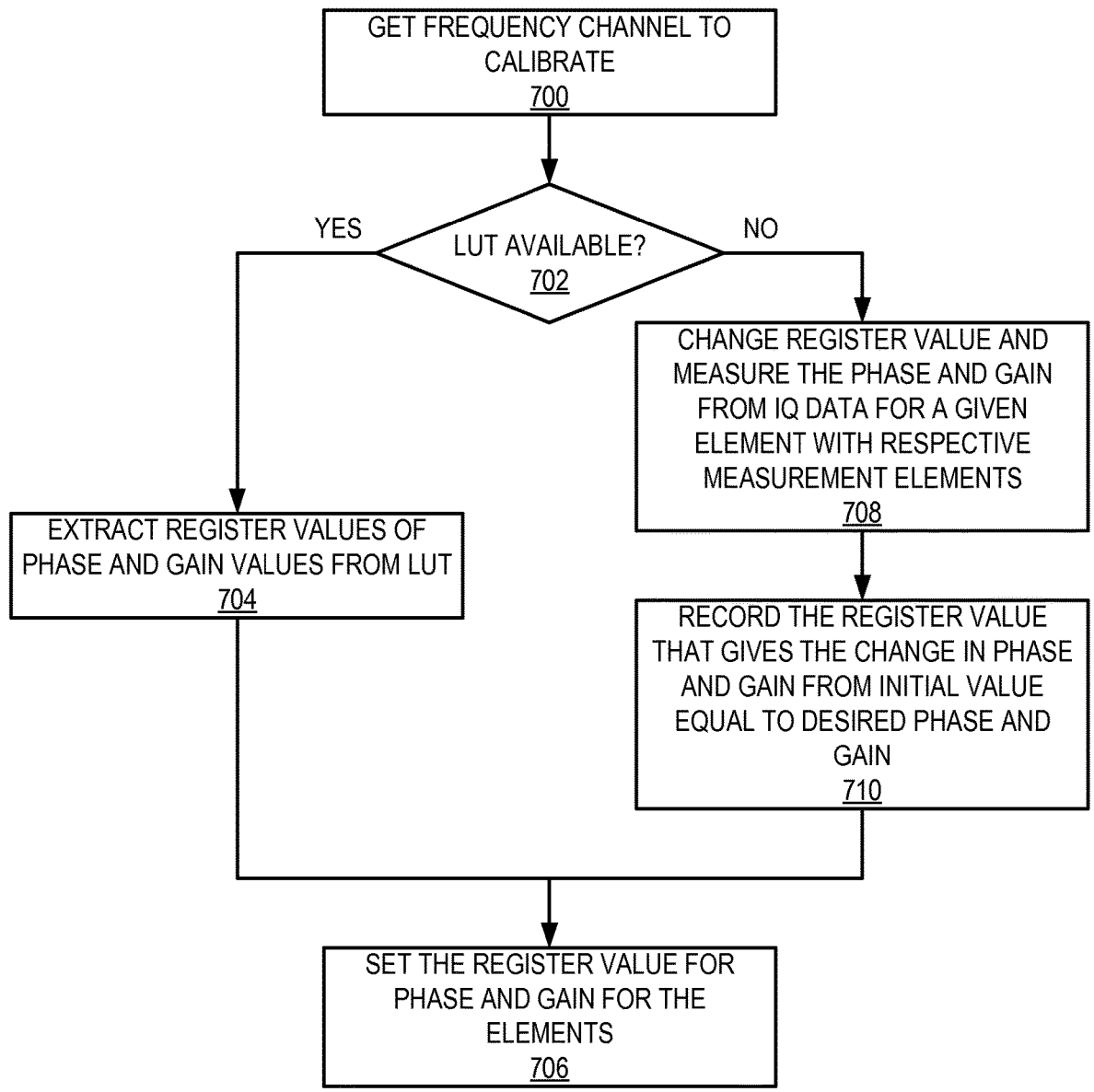
FIG. 8 illustrates the operation of the transceiver to configure the gain and phase adjustment circuitry according to some embodiments of the present disclosure.

FIG. 8 illustrates the operation of the transceiver 10, and in particular the self-calibration subsystem 22, to configure the gain and phase adjustment circuitry 18 according to some embodiments of the present disclosure. More specifically, upon computing the gain and phase calibration values as described above, the self-calibration subsystem 22 configures the gain and phase adjustment circuitry 18 to provide the corresponding gain and phase adjustments. In some embodiments, the self-calibration subsystem 22 configures the gain and phase adjustment circuitry 18 by configuring registers with values that provide the computed gain and phase calibration adjustments. However, in order to do this, the computed gain and phase values must be mapped to the corresponding register values. In this regard, FIG. 8 illustrates a process by which the transceiver 10, and in particular the self-calibration subsystem 22, maps the computed gain and phase calibration values to the corresponding register values and configures the gain and phase adjustment circuitry 18 with those register values.

More specifically, the self-calibration subsystem 22 gets, or obtains, the frequency channel for which calibration is desired (step 700) and determines whether a mapping of the computed gain and phase calibration values for the frequency channel to corresponding register values is available, e.g., in a LUT, in this example (step 702). If available, the self-calibration subsystem 22 gets the register values corresponding to the computed gain and phase calibration values for the Tx and Rx antenna elements from the LUT (step 704). The self-calibration subsystem 22 then configures the gain and phase adjustment circuitry 18 by, in this example, setting respective registers to the register values obtained from the LUT (step 706).

Returning to step 702, if a mapping of the computed gain and phase calibration values for the desired frequency channel to register values is not available, the self-calibration subsystem 22 performs a procedure to determine the mapping between the computed gain and phase calibration values and the corresponding register values. More specifically, in step 708, the self-calibration subsystem 22 selects any Tx element $Tx_j$, selects any Rx element $Rx_m$, and measures $\phi_{MTx_j Rx_m}(1) = \phi_{Tx_j}(1) + \phi_{CTx_j Rx_m} + \phi Rx_m$. The self-calibration subsystem 22 changes the phase of Tx gradually to get new measurements by changing the phase register value (when there is no prior knowledge of register delta phase relation)

$$\phi_{MTx_j Rx_m}(ni) = \phi_{Tx_j}(ni) + \phi_{CTx_j Rx_m} + \phi_{Rx_m}$$

The self-calibration subsystem 22 compares $\phi_{MTx_j Rx_m}(1) - \phi_{MTx_j Rx_m}(ni)$ to $\phi_{Tx_j, REF}$, which is the desired phase calibration value for $Tx_j$. When $\phi_{MTx_j Rx_m}(1) - \phi_{MTx_j Rx_m}(ni) = \phi_{Tx_j, REF}$, the self-calibration subsystem 22 stops changing the phase register value, gets the phase register value, and stores the phase register value (step 710).

In a similar manner, in step 708, the self-calibration subsystem 22 measures $G_{MTx_j Rx_m}(1) = G_{Tx_j}(1) + G_{CTx_j Rx_m} + G_{Rx_m}$. The self-calibration subsystem 22 changes the gain of Tx gradually to get new measurements by changing the gain resistor value (when there is no prior knowledge of resistor delta gain relation)

$$G_{MTx_j Rx_m}(ni) = G_{Tx_j}(ni) + G_{CTx_j Rx_m} + G_{Rx_m}.$$

The self-calibration subsystem 22 compares $G_{MTx_j Rx_m}(1) - G_{MTx_j Rx_m}(ni)$ to $G_{Tx_j, REF}$, which is the computed gain adjustment value for $Tx_j$. When $G_{MTx_j Rx_m}(1) - G_{MTx_j Rx_m}(ni) = G_{Tx_j, REF}$, the self-calibration subsystem 22 stops changing the gain register value, gets the gain register value, and stores the gain register value (step 710). The process of steps 708 and 710 is repeated to compute the gain and phase register values for each Tx and each Rx antenna element.

The self-calibration subsystem 22 then configures the gain and phase adjustment circuitry 18 by, in this example, setting respective register values to the values determined in steps 710 and 712 (step 708).

Figure 9:
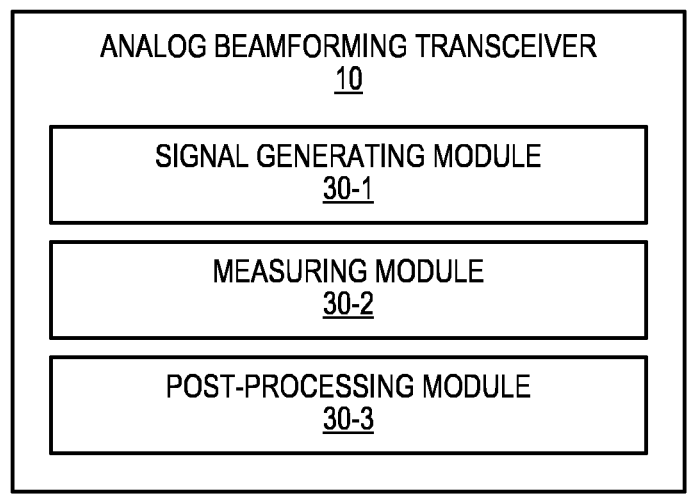
FIG. 9 illustrates a transceiver (e.g., an analog beamforming transceiver) that provides self-calibration for an antenna array of the transceiver according to some other embodiments of the present disclosure.

FIG. 9 illustrates the analog beamforming transceiver 10 according to some other embodiments of the present disclosure. In this embodiment, the analog beamforming transceiver 10 includes a number of modules 30 that operate to provide self-calibration according to any one of the embodiments described herein. In this particular example, the modules 30 include a signal generating module 30-1 that operates to provide the functionality of the signal generator 24 as described herein, a measuring module 30-2 that operates to provide the functionality of the measurement function 26 as described herein, and a post-processing module 30-3 that operates to provide the functionality of the post-processing function 28 as described herein. Each of the modules 30 is implemented in software.

Figure 10:
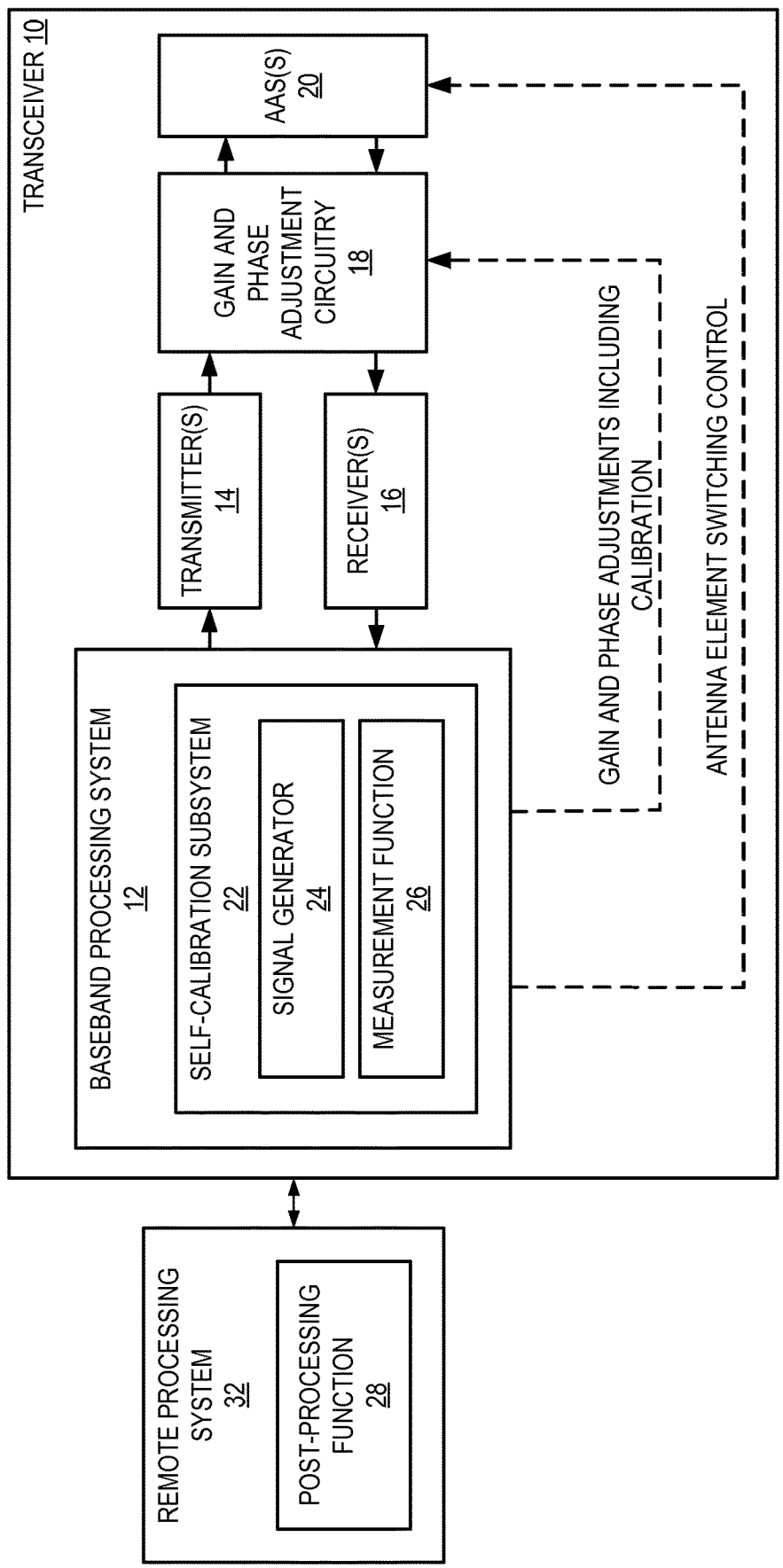
FIG. 10 illustrates a system in which post-processing is performed at a remote processing system according to some other embodiments of the present disclosure.

In the embodiments above, the post-processing of gain and phase measurements is performed locally at the analog beamforming transceiver 10. However, in some alternative embodiments, the post-processing of the measurements is performed remotely by some other processing system. In this regard, FIG. 10 illustrates a system including the transceiver 10 and a remote processing system 32 according to some other embodiments of the present disclosure. The transceiver 10 is the same as that described above other than the post-processing function 28. In this embodiment, the post-processing function 28 is implemented at the remote processing system 32. The remote processing system 32 is implemented in a combination of hardware and software. For example, the remote processing system 32 may include one or more processors (e.g., CPUs, DSPs, ASICs, FPGAs, and/or the like) and memory storing software executed by the processor(s) whereby the remote processing system 32 operates to provide the functionality of the post-processing function 28 as described herein. The remote processing system 32 includes a communication interface (e.g., a wired or wireless network interface) that communicatively couples to the transceiver 10. As one example, the transceiver 10 may be part of a radio access node (e.g., a base station) in a cellular communications system, and the remote processing system 32 may be, e.g., another network node such as, e.g., a core network node in a core network of the cellular communications system.

Figure 11:
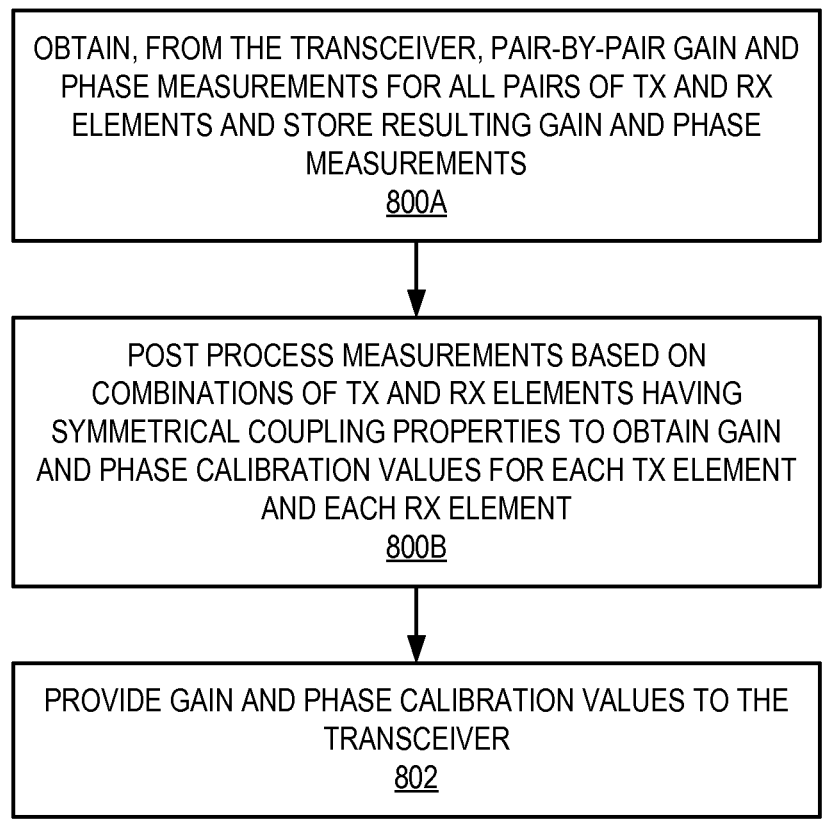
FIG. 11 is a flow chart that illustrates the operation of the remote processing system of FIG. 10 according to some embodiments of the present disclosure.

FIG. 11 is a flow chart that illustrates the operation of the remote processing system 32 and, in particular, the post-processing function 28 of FIG. 10 according to some embodiments of the present disclosure. In general, when implemented at the remote processing system 32, the post-processing function 28 operates in the same manner as described above other than having to obtain the gain and phase measurements from the transceiver 10 via a remote connection and returning the gain and phase calibration values to the transceiver via the remote connection.

More specifically, as illustrated in FIG. 11, the remote processing system 32, and in particular the post-processing function 28 implemented at the remote processing system 32, obtains pair-by-pair gain and phase measurements for all pairs of Tx and Rx antenna elements in the antenna array formed by the one or more AASs 20 at the transceiver 10 and stores the resulting measurements (step 800A). In other words, for each pair of Tx and Rx antenna elements $Tx_i$ and $Rx_j$ where $I=1 \ldots N_{Tx}$ and $j=1 \ldots N_{Rx}$ and $N_{Tx}$ is the number of Tx antenna elements in the antenna array and $N_{Rx}$ is the number of Rx antenna elements in the antenna array, the post-processing function 28 obtains a gain measurement ($G_{MTx_iRx_j}$) and a phase measurement ($\phi_{MTx_iRx_j}$) from the transceiver 10. As discussed above, these gain and phase measurements are performed by the measurement function 26 at the transceiver 10. The details of how the gain and phase measurements $G_{MTx_iRx_j}$ and $\phi_{MTx_iRx_j}$ are performed by the measurement function 26 are provided above with respect to FIG. 4.

The post-processing function 28 performs post-processing of the gain and phase measurements $G_{MTx_iRx_j}$ and $\phi_{MTx_iRx_j}$ for all i and j to compute gain and phase calibration values for the Tx and Rx antenna elements of the antenna array (step 800B), as described above. The details of step 800B are provided above with respect to FIGS. 5A and 5B and FIGS. 7A and 7B. In general, the post-processing function 28 computes the gain and phase calibration values based on the gain and phase measurements $G_{MTx_iRx_j}$ and $\phi_{MTx_iRx_j}$ and combinations of Tx and Rx antenna elements having symmetrical coupling properties. The combinations of Tx and Rx antenna elements having symmetrical coupling properties are, e.g., predefined or predetermined based on, e.g., a known layout of the antenna elements in the antenna array or computed by the post-processing function 28 based on, e.g., a known layout of the antenna elements in the antenna array.

The post-processing function 28 provides the computed gain and phase calibration values to the transceiver 10 (step 802), where the computed gain and phase calibration values are applied at the transceiver 10 as described above. As discussed above, in addition or alternatively, the post-processing function 28 may compute a coupling matrix and provide the coupling matrix to the transceiver 10.

The following acronyms are used throughout this disclosure.

3G Third Generation
3GPP Third Generation Partnership Project
5G Fifth Generation
AAS Advanced Antenna System
ASIC Application Specific Integrated Circuit
CPU Central Processing Unit
dB Decibel
DSP Digital Signal Processor
FPGA Field Programmable Gate Array
LTE Long Term Evolution
LUT Look Up Table
NR New Radio
RFIC Radio Frequency Integrated Circuit
Rx Receive
TDD Time Division Duplexing
Tx Transmit
UE User Equipment Those skilled in the art will recognize improvements and modifications to the embodiments of the present disclosure. All such improvements and modifications are considered within the scope of the concepts disclosed herein.

The invention claimed is:

1. A method of operation of a transceiver to perform self-calibration for a plurality of transmit, Tx, antenna elements and a plurality of receive, Rx, antenna elements in an antenna array, comprising:

performing gain measurements, $G_{MTx_iRx_j}$, and phase measurements, $\phi_{MTx_iRx_j}$, for pairs of Tx and Rx antenna elements in the antenna array, where gain measurement $G_{MTx_iRx_j}$ and phase measurement $\phi_{MTx_iRx_j}$ are measured gain and phase at an output of a receiver compared to the input of a transmitter, when the receiver is coupled to a j-th Rx antenna element during reception of a signal transmitted by a transmitter coupled to an i-th Tx antenna element;

processing the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and applying the gain and phase calibration values at the transceiver;

wherein processing the gain measurements, $G_{MTx_iRx_j}$, and the phase measurements, $\phi_{MTx_iRx_j}$, comprises:

selecting a pair of Tx antenna elements, $Tx_i$ and $Tx_k$, where i≠k;

determining a first pair of Rx antenna elements, $Rx_n$ and $Rx_m$, having symmetrical coupling properties with respect to the pair of Tx antenna elements, $Tx_i$ and $Tx_k$;

computing at least one relative gain value and at least one relative phase value for the Tx antenna element $Tx_i$ relative to the Tx antenna element $Tx_k$ based on at least two of:
  the gain measurement, $G_{MTx_iRx_n}$, and the phase measurement, $\phi_{MTx_iRx_n}$, for the pair of Tx and Rx antenna elements $Tx_i$ and $Rx_n$;
  the gain measurement, $G_{MTx_iRx_m}$, and the phase measurement, $\phi_{MTx_iRx_m}$, for the pair of Tx and Rx antenna elements $Tx_i$ and $Rx_m$;
  the gain measurement, $G_{MTx_kRx_n}$, and the phase measurement, $\phi_{MTx_kRx_n}$, for the pair of Tx and Rx antenna elements $Tx_k$ and $Rx_n$; and
  the gain measurement, $G_{MTx_kRx_m}$, and the phase measurement, $\phi_{MTx_kRx_m}$, for the pair of Tx and Rx antenna elements $Tx_k$ and $Rx_m$;
repeating the steps of determining and computing for at least one second pair of Rx antenna elements, $Rx_n$, and $Rx_m$, having symmetrical coupling properties with respect to the pair of Tx antenna elements, $Tx_i$ and $Tx_k$;
averaging the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$;
repeating the steps of selecting, determining, computing, repeating, and averaging for at least one second pair of Tx antenna elements; and
normalizing the average relative gain values and the average relative phase values relative to a defined reference Tx antenna element to thereby provide gain and phase calibration values for the plurality of Tx antenna elements.

2. The method of claim 1 wherein:
a mutual coupling between the Tx antenna element $Tx_i$ and the Rx antenna element $Rx_n$ is approximately the same as a mutual coupling between the Tx antenna element $Tx_k$ and the Rx antenna element $Rx_n$;
a mutual coupling between the Tx antenna element $Tx_i$ and the Rx antenna element $Rx_m$ is approximately the same as a mutual coupling between the Tx antenna element $Tx_k$ and the Rx antenna element $Rx_m$; and
the at least one relative gain value and the at least one relative phase value for the Tx antenna element $Tx_i$ relative to the Tx antenna element $Tx_k$ comprises a relative gain value defined as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2}$$

and a relative phase value defined as:

$$\Delta \phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}.$$

3. The method of claim 1 wherein:
a mutual coupling between the Tx antenna element $Tx_i$ and the Rx antenna element $Rx_n$ is approximately the same as a mutual coupling between the Tx antenna element $Tx_k$ and the Rx antenna element $Rx_m$;
a mutual coupling between the Tx antenna element $Tx_i$ and the Rx antenna element $Rx_m$ is approximately the same as a mutual coupling between the Tx antenna element $Tx_k$ and the Rx antenna element $Rx_n$; and
the at least one relative gain value and the at least one relative phase value for the Tx antenna element $Tx_i$ relative to the Tx antenna element $Tx_k$ comprises a relative gain value defined as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2}$$

and a relative phase value defined as:

$$\Delta \phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2}.$$

4. The method of claim 1 wherein averaging the relative gain values and the relative phase values for the Tx antenna element $Tx_i$ relative to the Tx antenna element $Tx_k$ across the first pair of Rx antenna elements and the at least one second pair of Rx antenna elements comprises performing a weighted average of the relative gain values and the relative phase values for the Tx antenna element $Tx_i$ relative to the Tx antenna element $Tx_k$ across the first pair of Rx antenna elements and the at least one second pair of Rx antenna elements.

5. The method of claim 1 wherein performing the gain measurements, $G_{MTx_iRx_j}$, and the phase measurements, $\phi_{MTx_iRx_j}$, for the pairs of Tx and Rx antenna elements in the antenna array comprises, for each pair of Tx and Rx antenna elements $Tx_i$, $Rx_j$:
  transmitting a pseudo random IQ signal of a desired bandwidth while the transmit antenna element $Tx_i$ and the Rx antenna element $Rx_j$ are active;
  cross-correlating the transmitted pseudo random IQ signal and a received IQ signal received via the Rx antenna element $Rx_j$; and
  computing the gain measurement, $G_{MTx_iRx_j}$, and the phase measurement, $\phi_{MTx_iRx_j}$, for the pair of Tx and Rx antenna elements $Tx_i$, $Rx_j$ based on results of the cross-correlating.

6. A method of operation of a transceiver to perform self-calibration for a plurality of transmit, Tx, antenna elements and a plurality of receive, Rx, antenna elements in an antenna array, comprising:
  performing gain measurements, $G_{MTx_iRx_j}$, and phase measurements, $\phi_{MTx_iRx_j}$, for pairs of Tx and Rx antenna elements in the antenna array, where gain measurement $G_{MTx_iRx_j}$ and phase measurement $\phi_{MTx_iRx_j}$ are measured gain and phase at an output of a receiver compared to the input of a transmitter, when the receiver is coupled to a j-th Rx antenna element during reception of a signal transmitted by a transmitter coupled to an i-th Tx antenna element;
  processing the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and
  applying the gain and phase calibration values at the transceiver;

wherein processing the gain measurements, $G_{MTx_iRx_j}$, and the phase measurements, $\phi_{MTx_iRx_j}$, comprises:

selecting a pair of Rx antenna elements, $Rx_n$ and $Rx_m$, where $n \neq m$;

determining a first pair of Tx antenna elements, $Tx_i$ and $Tx_k$, having symmetrical coupling properties with respect to the pair of Rx antenna elements, $Rx_n$ and $Rx_m$;

computing at least one relative gain value and at least one relative phase value for the Rx antenna element $Rx_n$ relative to the Rx antenna element $Rx_m$ based on at least two of:

the gain measurement, $G_{MTx_iRx_n}$, and the phase measurement, $\phi_{MTx_iRx_n}$, for the pair of Tx and Rx antenna elements $Tx_i$ and $Rx_n$;

the gain measurement, $G_{MTx_iRx_m}$, and the phase measurement, $\phi_{MTx_iRx_m}$, for the pair of Tx and Rx antenna elements $Tx_i$ and $Rx_m$;

the gain measurement, $G_{MTx_kRx_n}$, and the phase measurement, $\phi_{MTx_kRx_n}$, for the pair of Tx and Rx antenna elements $Tx_k$ and $Rx_n$; and the gain measurement, $G_{MTx_kRx_m}$, and the phase measurement, $\phi_{MTx_kRx_m}$, for the pair of Tx and Rx antenna elements $Tx_k$ and $Rx_m$;

repeating the steps of determining and computing for at least one second pair of Tx antenna elements, $Tx_i$ and $Tx_k$, having symmetrical coupling properties with respect to the pair of Rx antenna elements, $Rx_n$ and $Rx_m$;

averaging the relative gain values and the relative phase values for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$;

repeating the steps of selecting, determining, computing, repeating, and averaging for at least one second pair of Rx antenna elements; and normalizing the average relative gain values and the average relative phase values relative to a defined reference Rx antenna element to thereby provide gain and phase calibration values for the plurality of Rx antenna elements.

7. The method of claim 6 wherein:

a mutual coupling between the Tx antenna element $Tx_i$ and the Rx antenna element $Rx_n$ is approximately the same as a mutual coupling between the Tx antenna element $Tx_i$ and the Rx antenna element $Rx_m$;

a mutual coupling between the Tx antenna element $Tx_k$ and the Rx antenna element $Rx_n$ is approximately the same as a mutual coupling between the Tx antenna element $Tx_k$ and the Rx antenna element $Rx_m$; and the at least one relative gain value and the at least one relative phase value for the Rx antenna element $Rx_n$ relative to the Rx antenna element $Rx_m$ comprises a relative gain defined as:

$$\Delta G_{Rx_nRx_m}(3) = \frac{(G_{MTx_iRx_n} - G_{MTx_iRx_m}) + (G_{MTx_kRx_n} - G_{MTx_kRx_m})}{2}$$

and a relative phase value defined as:

$$\Delta\phi_{Rx_nRx_m}(3) = \frac{(\phi_{MTx_iRx_n} - \phi_{MTx_iRx_m}) + (\phi_{MTx_kRx_n} - \phi_{MTx_kRx_m})}{2}.$$

8. The method of claim 6 wherein:

a mutual coupling between the Tx antenna element $Tx_i$ and the Rx antenna element $Rx_n$ is approximately the same as a mutual coupling between the Tx antenna element $Tx_k$ and the Rx antenna element $Rx_m$;

a mutual coupling between the Tx antenna element $Tx_i$ and the Rx antenna element $Rx_m$ is approximately the same as a mutual coupling between the Tx antenna element $Tx_k$ and the Rx antenna element $Rx_n$; and the at least one relative gain value and the at least one relative phase value for the Rx antenna element $Rx_n$ relative to the Rx antenna element $Rx_m$ comprises a relative gain value defined as:

$$\Delta G_{Rx_nRx_m}(4) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Rx_nRx_m}(4) = \frac{(\phi_{MTx_iRx_n} - \phi_{MTx_kRx_m}) + (\phi_{MTx_iRx_m} - \phi_{MTx_kRx_n})}{2}.$$

9. The method of claim 6 wherein averaging the relative gain values and the relative phase values for the Rx antenna element $Rx_n$ relative to the Rx antenna element $Rx_m$ across the first pair of Tx antenna elements and the at least one second pair of Tx antenna elements comprises performing a weighted average of the relative gain values and the relative phase values for the Rx antenna element $Rx_n$ relative to the Rx antenna element $Rx_m$ across the first pair of Tx antenna elements and the at least one second pair of Tx antenna elements.

10. A transceiver enabled to perform self-calibration for a plurality of transmit, Tx, antenna elements and a plurality of receive, Rx, antenna elements in an antenna array, comprising:

the antenna array comprising the plurality of Tx antenna elements and the plurality of Rx antenna elements;

gain and phase adjustment circuitry;

one or more transmitters and one or more receivers coupled to the plurality of Tx antenna elements and the plurality of Rx antenna elements; and a baseband processing system adapted to:

perform gain measurements, $G_{MTx_iRx_j}$, and phase measurements, $\phi_{MTx_iRx_j}$, for pairs of Tx and Rx antenna elements in the antenna array, where the gain measurement $G_{MTx_iRx_j}$ is a measured gain at an output of a receiver coupled to a j-th Rx antenna element during reception of a signal transmitted by a transmitter coupled to an i-th Tx antenna element;

process the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and apply the gain and phase calibration values at the transceiver via the gain and phase adjustment circuitry;

wherein, in order to process the gain measurements, $G_{MTx_iRx_j}$, and the phase measurements, $\phi_{MTx_iRx_j}$, the baseband processing system is further operable to:

select a pair of Tx antenna elements, $Tx_i$ and $Tx_k$, where i≠k;

determine a first pair of Rx antenna elements, $Rx_n$ and $Rx_m$, having symmetrical coupling properties with respect to the pair of Tx antenna elements, $Tx_i$ and $Tx_k$;

compute at least one relative gain value and at least one relative phase value for the Tx antenna element $Tx_i$ relative to the Tx antenna element $Tx_k$ based on at least two of:
- the gain measurement, $G_{MTx_iRx_n}$, and the phase measurement, $\phi_{MTx_iRx_n}$, for the pair of Tx and Rx antenna elements $Tx_i$ and $Rx_n$;
- the gain measurement, $G_{MTx_iRx_m}$, and the phase measurement, $\phi_{MTx_iRx_m}$, for the pair of Tx and Rx antenna elements $Tx_i$ and $Rx_m$;
- the gain measurement, $G_{MTx_kRx_n}$, and the phase measurement, $\phi_{MTx_kRx_n}$, for the pair of Tx and Rx antenna elements $Tx_k$ and $Rx_n$; and
- the gain measurement, $G_{MTx_kRx_m}$, and the phase measurement, $\phi_{MTx_kRx_m}$, for the pair of Tx and Rx antenna elements $Tx_k$ and $Rx_m$;

repeat the steps of determining and computing for at least one second pair of Rx antenna elements, $Rx_n$ and $Rx_m$, having symmetrical coupling properties with respect to the pair of Tx antenna elements, $Tx_i$ and $Tx_k$;

average the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$;

repeat the steps of selecting, determining, computing, repeating, and averaging for at least one second pair of Tx antenna elements; and normalize the average relative gain values and the average relative phase values relative to a defined reference Tx antenna element to thereby provide gain and phase calibration values for the plurality of Tx antenna elements.

11. The transceiver of claim 10 wherein:

a mutual coupling between the Tx antenna element $Tx_i$ and the Rx antenna element $Rx_n$ is approximately the same as a mutual coupling between the Tx antenna element $Tx_k$ and the Rx antenna element $Rx_n$;

a mutual coupling between the Tx antenna element $Tx_i$ and the Rx antenna element $Rx_m$ is approximately the same as a mutual coupling between the Tx antenna element $Tx_k$ and the Rx antenna element $Rx_m$; and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2}$$

and a relative phase value defined as:

$$\Delta\phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}.$$

12. The transceiver of claim 10 wherein:

a mutual coupling between the Tx antenna element $Tx_i$ and the Rx antenna element $Rx_n$ is approximately the same as a mutual coupling between the Tx antenna element $Tx_k$ and the Rx antenna element $Rx_m$;

a mutual coupling between the Tx antenna element $Tx_i$ and the Rx antenna element $Rx_m$ is approximately the same as a mutual coupling between the Tx antenna element $Tx_k$ and the Rx antenna element $Rx_n$; and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2}.$$

13. The transceiver of claim 10 wherein, in order to average the relative gain values and the relative phase values for the Tx antenna element $Tx_i$ relative to the Tx antenna element $Tx_k$ across the first pair of Rx antenna elements and the at least one second pair of Rx antenna elements, the baseband processing system is further operable to perform a weighted average of the relative gain values and the relative phase values for the Tx antenna element $Tx_i$ relative to the Tx antenna element $Tx_k$ across the first pair of Rx antenna elements and the at least one second pair of Rx antenna elements.

14. The transceiver of claim 10 wherein, in order to perform the gain measurements, $G_{MTx_iRx_j}$, and the phase measurements, $\phi_{MTx_iRx_j}$, for the pairs of Tx and Rx antenna elements in the antenna array, the baseband processing system is further operable to, for each pair of Tx and Rx antenna elements $Tx_i$, $Rx_j$:

transmit a pseudo random IQ signal of a desired bandwidth while the Tx antenna element $Tx_i$ and the Rx antenna element $Rx_j$ are active;

cross-correlate the transmitted pseudo random IQ signal and a received IQ signal received via the Rx antenna element $Rx_j$; and compute the gain measurement, $G_{MTx_iRx_j}$, and the phase measurement, $\phi_{MTx_iRx_j}$, for the pairs of Tx and Rx antenna elements $Tx_i$, $Rx_j$ based on results of the cross-correlating.

15. A transceiver enabled to perform self-calibration for a plurality of transmit, Tx, antenna elements and a plurality of receive, Rx, antenna elements in an antenna array, comprising:
- the antenna array comprising the plurality of Tx antenna elements and the plurality of Rx antenna elements;
- gain and phase adjustment circuitry;
- one or more transmitters and one or more receivers coupled to the plurality of Tx antenna elements and the plurality of Rx antenna elements; and
- a baseband processing system adapted to:
  - perform gain measurements, $G_{MTx_iRx_j}$, and phase measurements, $\phi_{MTx_iRx_j}$, for pairs of Tx and Rx antenna elements in the antenna array, where the gain measurement $G_{MTx_iRx_j}$ is a measured gain at an output of a receiver coupled to a j-th Rx antenna element during reception of a signal transmitted by a transmitter coupled to an i-th Tx antenna element;
  - process the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and
- apply the gain and phase calibration values at the transceiver via the gain and phase adjustment circuitry;
- wherein, in order to process the gain measurements, $G_{MTx_iRx_j}$, and the phase measurements, $\phi_{MTx_iRx_j}$, the baseband processing system is further operable to:
  - select a pair of Rx antenna elements, $Rx_n$ and $Rx_m$, where n≠m;
  - determining a first pair of Tx antenna elements, $Tx_i$ and $Tx_k$, having symmetrical coupling properties with respect to the pair of Rx antenna elements, $Rx_n$ and $Rx_m$;
  - compute at least one relative gain value and at least one relative phase value for the Rx antenna element $Rx_n$ relative to the Rx antenna element $Rx_m$ based on at least two of:
    - the gain measurement, $G_{MTx_iRx_n}$, and the phase measurement, $\phi_{MTx_iRx_n}$, for the pair of Tx and Rx antenna elements $Tx_i$ and $Rx_n$;
    - the gain measurement, $G_{MTx_iRx_m}$, and the phase measurement, $\phi_{MTx_iRx_m}$, for the pair of Tx and Rx antenna elements $Tx_i$ and $Rx_m$;
    - the gain measurement, $G_{MTx_kRx_n}$, and the phase measurement, $\phi_{MTx_kRx_n}$, for the pair of Tx and Rx antenna elements $Tx_k$ and $Rx_n$; and
    - the gain measurement, $G_{MTx_kRx_m}$, and the phase measurement, $\phi_{MTx_kRx_m}$, for the pair of Tx and Rx antenna elements $Tx_k$ and $Rx_m$;
  - repeating the steps of determining and computing for at least one second pair of Tx antenna elements, $Tx_i$ and $Tx_k$, having symmetrical coupling properties with respect to the pair of Rx antenna elements, $Rx_n$ and $Rx_m$;
  - average the relative gain values and the relative phase values for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$;
  - repeat the steps of selecting, determining, computing, repeating, and averaging for at least one second pair of Rx antenna elements; and
  - normalize the average relative gain values and the average relative phase values relative to a defined reference Rx antenna element to thereby provide gain and phase calibration values for the plurality of Rx antenna elements.

16. The transceiver of claim 15 wherein:
- a mutual coupling between the Tx antenna element $Tx_i$ and the Rx antenna element $Rx_n$ is approximately the same as a mutual coupling between the Tx antenna element $Tx_i$ and the Rx antenna element $Rx_m$;
- a mutual coupling between the Tx antenna element $Tx_k$ and the Rx antenna element $Rx_n$ is approximately the same as a mutual coupling between the Tx antenna element $Tx_k$ and the Rx antenna element $Rx_m$; and
- the at least one relative gain value and the at least one relative phase value for the Rx antenna element $Rx_n$ relative to the Rx antenna element $Rx_m$ comprises a relative gain defined as:

$$\Delta G_{Rx_nRx_m}(3) = \frac{(G_{MTx_iRx_n} - G_{MTx_iRx_m}) + (G_{MTx_kRx_n} - G_{MTx_kRx_m})}{2}$$

and a relative phase value defined as:

$$\Delta\phi_{Rx_nRx_m}(3) = \frac{(\phi_{MTx_iRx_n} - \phi_{MTx_iRx_m}) + (\phi_{MTx_kRx_n} - \phi_{MTx_kRx_m})}{2}.$$

17. The transceiver of claim 15 wherein:
- a mutual coupling between the Tx antenna element $Tx_i$ and the Rx antenna element $Rx_n$ is approximately the same as a mutual coupling between the Tx antenna element $Tx_k$ and the Rx antenna element $Rx_m$;
- a mutual coupling between the Tx antenna element $Tx_i$ and the Rx antenna element $Rx_m$ is approximately the same as a mutual coupling between the Tx antenna element $Tx_k$ and the Rx antenna element $Rx_n$; and
- the at least one relative gain value and the at least one relative phase value for the Rx antenna element $Rx_n$ relative to the Rx antenna element $Rx_m$ comprises a relative gain value defined as:

$$\Delta G_{Rx_nRx_m}(4) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Rx_nRx_m}(4) = \frac{(\phi_{MTx_iRx_n} - \phi_{MTx_kRx_m}) + (\phi_{MTx_kRx_n} - \phi_{MTx_iRx_m})}{2}.$$

18. The transceiver of claim 15 wherein, in order to average the relative gain values and the relative phase values for the Rx antenna element $Rx_n$ relative to the Rx antenna element $Rx_m$ across the first pair of Tx antenna elements and the at least one second pair of Tx antenna elements, the baseband processing system is further operable to perform a weighted average of the relative gain values and the relative phase values for the Rx antenna element $Rx_n$ relative to the Rx antenna element $Rx_m$ across the first pair of Tx antenna elements and the at least one second pair of Tx antenna elements.

19. A method of operation of a processing system to provide self-calibration for a plurality of transmit, Tx, antenna elements and a plurality of receive, Rx, antenna elements in an antenna array of a remote transceiver, comprising:

obtaining, from the transceiver, gain measurements, $G_{MTx_iRx_j}$, and phase measurements, $\phi_{MTx_iRx_j}$, for pairs of Tx and Rx antenna elements in the antenna array of the transceiver, where gain measurement $G_{MTx_iRx_j}$ is a measured gain at an output of a receiver coupled to a j-th Rx antenna element during reception of a signal transmitted by a transmitter coupled to an i-th Tx antenna element;

processing the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and providing the gain and phase calibration values to the transceiver;

wherein processing the gain measurements, $G_{MTx_iRx_j}$, and the phase measurements, $\phi_{MTx_iRx_j}$, comprises:

selecting a pair of Tx antenna elements, $Tx_i$ and $Tx_k$, where i≠k;

determining a first pair of Rx antenna elements, $Rx_n$ and $Rx_m$, having symmetrical coupling properties with respect to the pair of Tx antenna elements, $Tx_i$ and $Tx_k$;

computing at least one relative gain value and at least one relative phase value for the Tx antenna element $Tx_i$ relative to the Tx antenna element $Tx_k$ based on at least two of:

the gain measurement, $G_{MTx_iRx_n}$, and the phase measurement, $\phi_{MTx_iRx_n}$, for the pair of Tx and Rx antenna elements $Tx_i$ and $Rx_n$;

the gain measurement, $G_{MTx_iRx_m}$, and the phase measurement, $\phi_{MTx_iRx_m}$, for the pair of Tx and Rx antenna elements $Tx_i$ and $Rx_m$;

the gain measurement, $G_{MTx_kRx_n}$, and the phase measurement, $\phi_{MTx_kRx_n}$, for the pair of Tx and Rx antenna elements $Tx_k$ and $Rx_n$; and the gain measurement, $G_{MTx_kRx_m}$, and the phase measurement, $\phi_{MTx_kRx_m}$, for the pair of Tx and Rx antenna elements $Tx_k$ and $Rx_m$;

repeating the steps of determining and computing for at least one second pair of Rx antenna elements, $Rx_n$ and $Rx_m$, having symmetrical coupling properties with respect to the pair of Tx antenna elements, $Tx_i$ and $Tx_k$;

averaging the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$;

repeating the steps of selecting, determining, computing, repeating, and averaging for at least one second pair of Tx antenna elements; and normalizing the average relative gain values and the average relative phase values relative to a defined reference Tx antenna element to thereby provide gain and phase calibration values for the plurality of Tx antenna elements.

20. The method of claim 19 wherein:

a mutual coupling between the Tx antenna element $Tx_i$ and the Rx antenna element $Rx_n$ is approximately the same as a mutual coupling between the Tx antenna element $Tx_k$ and the Rx antenna element $Rx_n$;

a mutual coupling between the Tx antenna element $Tx_i$ and the Rx antenna element $Rx_m$ is approximately the same as a mutual coupling between the Tx antenna element $Tx_k$ and the Rx antenna element $Rx_m$; and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(1) = \frac{(G_{MTx_iRx_n} - G_{MTx_kRx_n}) + (G_{MTx_iRx_m} - G_{MTx_kRx_m})}{2}$$

and a relative phase value defined as:

$$\Delta\phi_{Tx_iTx_k}(1) = \frac{(\phi_{MTx_iRx_n} - \phi_{MTx_kRx_n}) + (\phi_{MTx_iRx_m} - \phi_{MTx_kRx_m})}{2}.$$

21. The method of claim 15 wherein:

a mutual coupling between the Tx antenna element $Tx_i$ and the Rx antenna element $Rx_n$ is approximately the same as a mutual coupling between the Tx antenna element $Tx_k$ and the Rx antenna element $Rx_m$;

a mutual coupling between the Tx antenna element $Tx_i$ and the Rx antenna element $Rx_m$ is approximately the same as a mutual coupling between the Tx antenna element $Tx_k$ and the Rx antenna element $Rx_n$; and the at least one relative gain value and the at least one relative phase value for the Tx antenna element $Tx_i$ relative to the Tx antenna element $Tx_k$ comprises a relative gain value defined as:

$$\Delta G_{Tx_iTx_k}(2) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Tx_iTx_k}(2) = \frac{(\phi_{MTx_iRx_n} - \phi_{MTx_kRx_m}) + (\phi_{MTx_iRx_m} - \phi_{MTx_kRx_n})}{2}.$$

22. The method of claim 15 wherein averaging the relative gain values and the relative phase values for the Tx antenna element $Tx_i$ relative to the Tx antenna element $Tx_k$ across the first pair of Rx antenna elements and the at least one second pair of Rx antenna elements comprises performing a weighted average of the relative gain values and the relative phase values for the Tx antenna element $Tx_i$ relative to the Tx antenna element $Tx_k$ across the first pair of Rx antenna elements and the at least one second pair of Rx antenna elements.

23. A method of operation of a processing system to provide self-calibration for a plurality of transmit, Tx, antenna elements and a plurality of receive, Rx, antenna elements in an antenna array of a remote transceiver, comprising:
obtaining, from the transceiver, gain measurements, $G_{MTx_iRx_j}$, and phase measurements, $\phi_{MTx_iRx_j}$, for pairs of Tx and Rx antenna elements in the antenna array of the transceiver, where gain measurement $G_{MTx_iRx_j}$ is a measured gain at an output of a receiver coupled to a j-th Rx antenna element during reception of a signal transmitted by a transmitter coupled to an i-th Tx antenna element;
processing the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and
providing the gain and phase calibration values to the transceiver;
wherein processing the gain measurements, $G_{MTx_iRx_j}$, and the phase measurements, $\phi_{MTx_iRx_j}$, comprises:
selecting a pair of Rx antenna elements, $Rx_n$ and $Rx_m$, where n≠m;
determining a first pair of Tx antenna elements, $Tx_i$ and $Tx_k$, having symmetrical coupling properties with respect to the pair of Rx antenna elements, $Rx_n$ and $Rx_m$;
computing at least one relative gain value and at least one relative phase value for the Rx antenna element $Rx_n$ relative to the Rx antenna element $Rx_m$ based on at least two of:
the gain measurement, $G_{MTx_iRx_n}$, and the phase measurement, $\phi_{MTx_iRx_n}$, for the pair of Tx and Rx antenna elements $Tx_i$ and $Rx_n$;
the gain measurement, $G_{MTx_iRx_m}$, and the phase measurement, $\phi_{MTx_iRx_m}$, for the pair of Tx and Rx antenna elements $Tx_i$ and $Rx_m$;
the gain measurement, $G_{MTx_kRx_n}$, and the phase measurement, $\phi_{MTx_kRx_n}$, for the pair of Tx and Rx antenna elements $Tx_k$ and $Rx_n$; and
the gain measurement, $G_{MTx_kRx_m}$, and the phase measurement, $\phi_{MTx_kRx_m}$, for the pair of Tx and Rx antenna elements $Tx_k$ and $Rx_m$;
repeating the steps of determining and computing for at least one second pair of Tx antenna elements, $Tx_i$ and $Tx_k$, having symmetrical coupling properties with respect to the pair of Rx antenna elements, $Rx_n$ and $Rx_m$;
averaging the at least one relative gain value and the at least one relative phase value for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$;
repeating the steps of selecting, determining, computing, repeating, and averaging for at least one second pair of Rx antenna elements; and
normalizing the average relative gain values and the average relative phase values relative to a defined reference Rx antenna element to thereby provide gain and phase calibration values for the plurality of Rx antenna elements.

24. The method of claim 23 wherein:
a mutual coupling between the Tx antenna element $Tx_i$ and the Rx antenna element $Rx_n$ is approximately the same as a mutual coupling between the Tx antenna element $Tx_i$ and the Rx antenna element $Rx_m$;
a mutual coupling between the Tx antenna element $Tx_k$ and the Rx antenna element $Rx_n$ is approximately the same as a mutual coupling between the Tx antenna element $Tx_k$ and the Rx antenna element $Rx_m$; and
the at least one relative gain value and the at least one relative phase value for the Rx antenna element $Rx_n$ relative to the Rx antenna element $Rx_m$ comprises a relative gain defined as:

$$\Delta G_{Rx_nRx_m}(3) = \frac{(G_{MTx_iRx_n} - G_{MTx_iRx_m}) + (G_{MTx_kRx_n} - G_{MTx_kRx_m})}{2}$$

and a relative phase value defined as:

$$\Delta\phi_{Rx_nRx_m}(3) = \frac{(\phi_{MTx_iRx_n} - \phi_{MTx_iRx_m}) + (\phi_{MTx_kRx_n} - \phi_{MTx_kRx_m})}{2}.$$

25. The method of claim 23 wherein:
a mutual coupling between the Tx antenna element $Tx_i$ and the Rx antenna element $Rx_n$ is approximately the same as a mutual coupling between the Tx antenna element $Tx_k$ and the Rx antenna element $Rx_m$;
a mutual coupling between the Tx antenna element $Tx_i$ and the Rx antenna element $Rx_m$ is approximately the same as a mutual coupling between the Tx antenna element $Tx_k$ and the Rx antenna element $Rx_n$; and
the at least one relative gain value and the at least one relative phase value for the Rx antenna element $Rx_n$ relative to the Rx antenna element $Rx_m$ comprises a relative gain value defined as:

$$\Delta G_{Rx_nRx_m}(4) = \frac{(G_{MTx_iRx_n} - G_{MTx_kRx_m}) + (G_{MTx_iRx_m} - G_{MTx_kRx_n})}{2}$$

and a relative phase value defined as:

$$\Delta\phi_{Rx_nRx_m}(4) = \frac{(\phi_{MTx_iRx_n} - \phi_{MTx_kRx_m}) + (\phi_{MTx_iRx_m} - \phi_{MTx_kRx_n})}{2}.$$

26. The method of claim 23 wherein averaging the relative gain values and the relative phase values for the Rx antenna element $Rx_n$ relative to the Rx antenna element $Rx_m$ across the first pair of Tx antenna elements and the at least one second pair of Tx antenna elements comprises performing a weighted average of the relative gain values and the relative phase values for the Rx antenna element $Rx_n$ relative to the Rx antenna element $Rx_m$ across the first pair of Tx antenna elements and the at least one second pair of Tx antenna elements.

27. A processing system enabled to perform self-calibration for a plurality of transmit, Tx, antenna elements and a plurality of receive, Rx, antenna elements in an antenna array of a remote transceiver, comprising:
- a communication interface;
- at least one processor; and
- memory comprising instructions executable by the at least one processor whereby the processing system is operable to:
  - obtain, from the transceiver via the communication interface, gain measurements, $G_{MTx_iRx_j}$, and phase measurements, $\phi_{MTx_iRx_j}$, for pairs of Tx and Rx antenna elements in the antenna array of the transceiver, where the gain measurement $G_{MTx_iRx_j}$ is a measured gain at an output of a receiver coupled to a j-th Rx antenna element during reception of a signal transmitted by a transmitter coupled to an i-th Tx antenna element;
  - process the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and
  - provide, via the communication interface, the gain and phase calibration values to the transceiver;
  - wherein, in order to process the gain measurements, $G_{MTx_iRx_j}$, and the phase measurements, $\phi_{MTx_iRx_j}$, the baseband processing system is further operable to:
  - select a pair of Tx antenna elements, $Tx_i$ and $Tx_k$, where i≠k;
  - determine a first pair of Rx antenna elements, $Rx_n$ and $Rx_m$, having symmetrical coupling properties with respect to the pair of Tx antenna elements, $Tx_i$ and $Tx_k$;
  - compute at least one relative gain value and at least one relative phase value for the Tx antenna element $Tx_i$ relative to the Tx antenna element $Tx_k$ based on at least two of:
    - the gain measurement, $G_{MTx_iRx_n}$, and the phase measurement, $\phi_{MTx_iRx_n}$, for the pair of Tx and Rx antenna elements $Tx_i$ and $Rx_n$;
    - the gain measurement, $G_{MTx_iRx_m}$, and the phase measurement, $\phi_{MTx_iRx_m}$, for the pair of Tx and Rx antenna elements $Tx_i$ and $Rx_m$;
    - the gain measurement, $G_{MTx_kRx_n}$, and the phase measurement, $\phi_{MTx_kRx_n}$, for the pair of Tx and Rx antenna elements $Tx_k$ and $Rx_n$; and
    - the gain measurement, $G_{MTx_kRx_m}$, and the phase measurement, $\phi_{MTx_kRx_m}$, for the pair of Tx and Rx antenna elements $Tx_k$ and $Rx_m$;
  - repeat the steps of determining and computing for at least one second pair of Rx antenna elements, $Rx_n$ and $Rx_m$, having symmetrical coupling properties with respect to the pair of Tx antenna elements, $Tx_i$ and $Tx_k$;
  - average the relative gain values and the relative phase values for the Tx antenna element $Tx_i$ relative to the Tx antenna element $Tx_k$ across the first pair of Rx antenna elements and the at least one second pair of Rx antenna elements to thereby provide an average relative gain value and an average relative phase value for the Tx antenna element $Tx_i$ relative to the Tx antenna element $Tx_k$;
  - repeat the steps of selecting, determining, computing, repeating, and averaging for at least one second pair of Tx antenna elements; and
  - normalize the average relative gain values and the average relative phase values relative to a defined reference Tx antenna element to thereby provide gain and phase calibration values for the plurality of Tx antenna elements.

28. A processing system enabled to perform self-calibration for a plurality of transmit, Tx, antenna elements and a plurality of receive, Rx, antenna elements in an antenna array of a remote transceiver, comprising:
- a communication interface;
- at least one processor; and
- memory comprising instructions executable by the at least one processor whereby the processing system is operable to:
  - obtain, from the transceiver via the communication interface, gain measurements, $G_{MTx_iRx_j}$, and phase measurements, $\phi_{MTx_iRx_j}$, for pairs of Tx and Rx antenna elements in the antenna array of the transceiver, where the gain measurement $G_{MTx_iRx_j}$ is a measured gain at an output of a receiver coupled to a j-th Rx antenna element during reception of a signal transmitted by a transmitter coupled to an i-th Tx antenna element;
  - process the gain measurements, $G_{MTx_iRx_j}$, and the phase measurements, $\phi_{MTx_iRx_j}$, based on combinations of Tx and Rx antenna elements having symmetrical coupling properties to obtain gain and phase calibration values for the plurality of Tx antenna elements and the plurality of Rx antenna elements in the antenna array; and
  - provide, via the communication interface, the gain and phase calibration values to the transceiver;
  - wherein, in order to process the gain measurements, $G_{MTx_iRx_j}$, and the phase measurements, $\phi_{MTx_iRx_j}$, the baseband processing system is further operable to:
  - select a pair of Rx antenna elements, $Rx_n$ and $Rx_m$, where n≠m;
  - determine a first pair of Tx antenna elements, $Tx_i$ and $Tx_k$, having symmetrical coupling properties with respect to the pair of Rx antenna elements, $Rx_n$ and $Rx_m$;
  - compute at least one relative gain value and at least one relative phase value for the Rx antenna element $Rx_n$ relative to the Rx antenna element $Rx_m$ based on at least two of:
    - the gain measurement, $G_{MTx_iRx_n}$, and the phase measurement, $\phi_{MTx_iRx_n}$, for the pair of Tx and Rx antenna elements $Tx_i$ and $Rx_n$;
    - the gain measurement, $G_{MTx_iRx_m}$, and the phase measurement, $\phi_{MTx_iRx_m}$, for the pair of Tx and Rx antenna elements $Tx_i$ and $Rx_m$;
    - the gain measurement, $G_{MTx_kRx_n}$, and the phase measurement, $\phi_{MTx_kRx_n}$, for the pair of Tx and Rx antenna elements $Tx_k$ and $Rx_n$; and
    - the gain measurement, $G_{MTx_kRx_m}$, and the phase measurement, $\phi_{MTx_kRx_m}$, for the pair of Tx and Rx antenna elements $Tx_k$ and $Rx_m$;
  - repeat the steps of determining and computing for at least one second pair of Tx antenna elements, $Tx_i$ and $Tx_k$, having symmetrical coupling properties with respect to the pair of Rx antenna elements, $Rx_n$ and $Rx_m$;
  - average the relative gain values and the relative phase values for the Rx antenna element $Rx_n$ relative to the Rx antenna element $Rx_m$ across the first pair of Tx antenna elements and the at least one second pair of Tx antenna elements to thereby provide an average relative gain value and an average relative phase value for the Rx antenna element $Rx_n$ relative to the Rx antenna element $Rx_m$;

repeat the steps of selecting, determining, computing, repeating, and averaging for at least one second pair of Rx antenna elements; and normalize the average relative gain values and the average relative phase values relative to a defined reference Rx antenna element to thereby provide gain and phase calibration values for the plurality of Rx antenna elements.

* * * * *

UNITED STATES PATENT AND TRADEMARK OFFICE
CERTIFICATE OF CORRECTION

PATENT NO. : 11,158,940 B2
APPLICATION NO. : 16/486416
DATED : October 26, 2021
INVENTOR(S) : Rafique et al.

It is certified that error appears in the above-identified patent and that said Letters Patent is hereby corrected as shown below:

In the Specification

In Column 1, Line 53, delete "Look Up Table" and insert -- Lookup Table --, therefor.

In Column 7, Line 22, delete "Rx elements antenna" and insert -- Rx antenna elements --, therefor.

In Column 13, Line 24, delete "User Equipment device (UE)" and insert -- User Equipment (UE) device --, therefor.

In Column 15, Line 11, delete "$(G_{MTx_iRx_j})$." and insert -- $(\phi_{MTx_iRx_j})$. --, therefor.

In Column 15, Line 23, delete "$\phi_{MTx_iRx_j}$," insert -- $\phi_{MTx_iRx_j}$. --, therefor.

In Column 15, Line 61, delete "Rx Polarization" and insert -- RX Polarization --, therefor.

In Column 15, Line 63, delete "Rx antenna element counter i" and insert -- Tx antenna element counter i --, therefor.

In Column 17, Line 6, delete "Look Up Table" and insert -- Lookup Table --, therefor.

In Column 17, Line 16, delete "CTx$_k$Rx$_m$" and insert -- CTx$_i$Rx$_m$ --, therefor.

In Column 17, Line 58, in Equation (1b), delete "$G_{MTx_iRx_m} = G_{Tx_i} + G_{CTx_iRx_m} + G_{Rx_n}$" and insert -- $G_{MTx_iRx_m} = G_{Tx_i} + G_{CTx_iRx_m} + G_{Rx_m}$ --, therefor.

Signed and Sealed this
Thirtieth Day of August, 2022

*Katherine Kelly Vidal*
Katherine Kelly Vidal
*Director of the United States Patent and Trademark Office*

CERTIFICATE OF CORRECTION (continued)

In Column 17, Line 62, delete "$G_{MTx_kRx_m} = G_{Tx_k} + G_{CTx_kRx_m} + G_{Rx_n}$" and insert -- $G_{MTx_kRx_m} = G_{Tx_k} + G_{CTx_kRx_m} + G_{Rx_m}$ --, therefor.

In Column 17, Line 62, after equation, insert -- (1d) --.

In Column 17, Line 65, delete "Tx$_i$," and insert -- Tx$_i$), --, therefor.

In Column 18, Line 1, delete "Tx$_k$," and insert -- Tx$_k$), --, therefor.

In Column 18, Line 3, delete "system 12," and insert -- system 12), --, therefor.

In Column 18, Line 6, delete "system 12," and insert -- system 12), --, therefor.

In Column 18, Line 6, delete "$G_{CTx_kRx_n}$" and insert -- $G_{CTx_iRx_n}$ --, therefor.

In Column 18, Lines 15-16, delete "(i.e., G$_d$g=20 log$_{10}$ (G$_{LINEAR}$) As" and insert -- (i.e., G$_{dB}$=20 log$_{10}$ (G$_{LINEAR}$)). As --, therefor.

In Column 18, Line 50, delete "$(G_{CTx_iRx_m} \quad G_{CTx_kRx_m})$" and insert -- $(G_{CTx_iRx_m} - G_{CTx_kRx_m})$ --, therefor.

In Column 19, Line 38, delete "Tx$_i$," and insert -- Tx$_i$), --, therefor.

In Column 19, Line 41, delete "Tx$_k$," and insert -- Tx$_k$), --, therefor.

In Column 19, Lines 43-44, delete "system 12," and insert -- system 12), --, therefor.

In Column 19, Line 46, delete "system 12," and insert -- system 12), --, therefor.

In Column 20, Line 21, delete "$(\Delta\phi_{Tx_iTx_n} - \Delta\phi_{Tx_kTx_n})$" and insert -- $(\phi_{CTx_iRx_n} - \phi_{CTx_kRx_n})$ --, therefor.

In Column 20, Line 22, delete "$(\Delta\phi_{Tx_iTx_m} - \Delta\phi_{Tx_kTx_m})$" and insert -- $(\phi_{CTx_iRx_m} - \phi_{CTx_kRx_m})$ --, therefor.

CERTIFICATE OF CORRECTION (continued)
U.S. Pat. No. 11,158,940 B2

In Column 20, Line 56, delete "$(\Delta\phi_{Tx_iTx_n} - \Delta\phi_{Tx_kTx_m})$" and insert -- $(\phi_{CTx_iRx_n} - \phi_{CTx_kRx_m})$ --, therefor.

In Column 20, Line 57, delete "$(\Delta\phi_{Tx_iTx_m} - \Delta\phi_{Tx_kTx_n})$" and insert -- $(\phi_{CTx_iRx_m} - \phi_{CTx_kRx_n})$ --, therefor.

In Column 21, Line 61, delete "TX" and insert -- Tx --, therefor.

In Column 22, Line 50, delete "$CTx_kRx_n$" and insert -- $CTx_iRx_n$ --, therefor.

In Column 22, Line 51, delete "$CTx_kRx_m$" and insert -- $CTx_iRx_m$ --, therefor.

In Column 23, Lines 19-26, in Equations (15a-15d), delete

"$G_{MTx_iRx_n=G}Tx_i + G_{CTx_iRx_n} + G_{Rx_n}$ $G_{MTx_iRx_m=G}Tx_i + G_{CTx_iRx_m} + G_{Rx_m}$ $G_{MTx_kRx_n=G}Tx_k + G_{CTx_kRx_n} + G_{Rx_n}$ $G_{MTx_kRx_m=G}Tx_k + G_{CTx_kRx_m} + G_{Rx_m}$" and insert --

$G_{MTx_iRx_n=}G_{Tx_i} + G_{CTx_iRx_n} + G_{Rx_n}$ $G_{MTx_iRx_m=}G_{Tx_i} + G_{CTx_iRx_m} + G_{Rx_m}$ $G_{MTx_kRx_n=}G_{Tx_k} + G_{CTx_kRx_n} + G_{Rx_n}$ $G_{MTx_kRx_m=}G_{Tx_k} + G_{CTx_kRx_m} + G_{Rx_m}$ --, therefor.

In Column 23, Line 29, delete "$Tx_i$," and insert -- $Tx_i$), --, therefor.

In Column 23, Line 32, delete "$Tx_k$," and insert -- $Tx_k$), --, therefor.

In Column 23, Line 34, delete "system 12," and insert -- system 12), --, therefor.

In Column 23, Line 37, delete "system 12," and insert -- system 12), --, therefor.

In Column 23, Line 37, delete "$G_{CTx_kRx_n}$" and insert -- $G_{CTx_iRx_n}$ --, therefor.

In Column 24, Line 11, delete "$(G_{CTx_kRx_n} - G_{CTx_iRx_m})$" and insert -- $(G_{CTx_kRx_n} - G_{CTx_kRx_m})$ --, therefor.

CERTIFICATE OF CORRECTION (continued)
U.S. Pat. No. 11,158,940 B2

In Column 24, Line 46, delete "CTx$_k$Rx$_n$ →CTx$_k$Rx$_m$," and insert -- CTx$_i$Rx$_n$ →CTx$_k$Rx$_m$, --, therefor.

In Column 24, Line 46, delete "$(G_{CTx_iRx_m} \  G_{CTx_kRx_n})$," and insert -- $(G_{CTx_iRx_m} - G_{CTx_kRx_n})$ --, therefor.

In Column 24, Line 47, delete "CTx$_k$Rx$_m$ →CTx$_k$Rx$_n$." and insert -- CTx$_i$Rx$_m$ →CTx$_k$Rx$_n$. --, therefor.

In Column 24, Line 56, in Equation (22a), delete "$\phi_{MTx_iRx_n} = \phi Tx_i + \phi_{CTx_iRx_n} + \phi_{Rx_n}$," and insert -- $\phi_{MTx_iRx_n} = \phi_{Tx_i} + \phi_{CTx_iRx_n} + \phi_{Rx_n}$ --, therefor.

In Column 24, Line 65, delete "$Tx_i, \phi_{Tx_i}$" and insert -- $Tx_i, \phi_{Tx_k}$ --, therefor.

In Column 26, Line 21, delete "CTx$_k$Rx$_m$ →CTx$_k$Rx$_n$." and insert -- CTx$_i$Rx$_m$ →CTx$_k$Rx$_n$. --, therefor.

In Column 27, Line 38, delete "$\Delta G_{Rx_n}Rx_m(3)$," and insert -- $\Delta G_{Rx_nRx_m}(3)$ --, therefor.

In Column 27, Line 45, delete "$\Delta G_{Rx_n}Rx_m$ and $\Delta\phi_{Rx_n}Rx_m(3)$," and insert -- $\Delta G_{Rx_nRx_m}(3)$ and $\Delta\phi_{Rx_nRx_m}(3)$ --, therefor.

In Column 27, Line 50, delete "$G_{Rx_nRx_m}(4)$," and insert -- $\Delta G_{Rx_nRx_m}(4)$ --, therefor.

In Column 28, Line 2, delete "φCTx$_i$Rx$_j$" and insert -- $\phi_{CTx_iRx_j}$ --, therefor.

In Column 29, Line 33, delete "CTx$_k$Rx$_n$ →CTx$_k$Rx$_n$ and CTx$_k$Rx$_m$ →CTx$_k$Rx$_m$" and insert -- CTx$_i$Rx$_n$ →CTx$_k$Rx$_n$ and CTx$_i$Rx$_m$ →CTx$_k$Rx$_m$ --, therefor.

In Column 29, Line 35, delete "CTx$_k$Rx$_n$ →CTx$_k$Rx$_m$ and CTx$_k$Rx$_m$ →CTx$_k$Rx$_n$" and insert -- CTx$_i$Rx$_n$ →CTx$_k$Rx$_m$ and CTx$_i$Rx$_m$ →CTx$_k$Rx$_n$ --, therefor.

In Column 29, Line 44, delete "$\Delta G_{Tx_iTx_k}(2)$," and insert -- $\Delta\phi_{Tx_iTx_k}(2)$ --, therefor.

In Column 30, Line 63, delete "CTx$_k$Rx$_n$ →CTx$_k$Rx$_m$" and insert -- CTx$_i$Rx$_n$ →CTx$_i$Rx$_m$ --, therefor.

CERTIFICATE OF CORRECTION (continued)
U.S. Pat. No. 11,158,940 B2

In Column 30, Line 66, delete "$CTx_kRx_n \rightarrow CTx_kRx_m$ and $CTx_kRx_m \rightarrow CTx_kRx_n$" and insert -- $CTx_iRx_n \rightarrow CTx_kRx_m$ and $CTx_iRx_m \rightarrow CTx_kRx_n$ --, therefor.

In Column 31, Line 7, delete "$\Delta_{Rx_nRx_m}(3)$," and insert -- $\Delta\phi_{Rx_nRx_m}(3)$ --, therefor.

In Column 31, Line 8, delete "$\Delta_{Rx_nRx_m}(4)$," and insert -- $\Delta\phi_{Rx_nRx_m}(4)$ --, therefor.

In Column 31, Line 39, delete "$\overline{\Delta\phi_{Rx_nRx_m}}$" and insert -- $\overline{\Delta G_{Rx_nRx_m}}$ --, therefor.

In Column 32, Line 17, delete "$\phi_{MTx_jRx_m}(1) = \phi_{Tx_j}(1) + \phi_{CTx_jRx_m} + \phi Rx_m$.," and insert -- $\phi_{MTx_jRx_m}(1) = \phi_{Tx_j}(1) + \phi_{CTx_jRx_m} + \phi Rx_m$. --, therefor.

In Column 32, Line 23, after Equation, insert -- . --.

In Column 32, Line 49, delete "steps 710 and 712 (step 708)." and insert -- steps 708 and 710 (step 706). --, therefor.

In Column 34, Line 24, delete "LUT Look Up Table" and insert -- LUT Lookup Table --, therefor.

In the Claims

In Column 35, Line 19, in Claim 1, delete "RXn, and" and insert -- RXn and --, therefor.

In Column 40, Line 55, in Claim 14, delete "Txi, and Rxj;" and insert -- Txi, and Rxj: --, therefor.

In Column 44, Line 32, in Claim 21, delete "The method of claim 15" and insert -- The method of claim 19 --, therefor.

In Column 44, Line 58, in Claim 22, delete "The method of claim 15" and insert -- The method of claim 19 --, therefor.

In Column 48, Line 18, in Claim 28, delete "$\phi_{MTx_jRx_j}$ for" and insert -- $\phi_{MTx_jRx_j}$, for --, therefor.

In Column 48, Line 36, in Claim 28, delete "$\phi_{MTx_jRx_j}$ the" and insert -- $\phi_{MTx_jRx_j}$, the --, therefor.